(12) United States Patent
Maeda et al.

(10) Patent No.: US 8,745,735 B2
(45) Date of Patent: Jun. 3, 2014

(54) MONITORING SYSTEM, PROGRAM-EXECUTING DEVICE, MONITORING PROGRAM, RECORDING MEDIUM AND INTEGRATED CIRCUIT

(75) Inventors: Manabu Maeda, Osaka (JP); Yuji Unagami, Osaka (JP); Yuichi Futa, Osaka (JP); Natsume Matsuzaki, Osaka (JP); Masao Nonaka, Osaka (JP); Hiroki Shizuya, Miyagi (JP); Masao Sakai, Miyagi (JP); Shuji Isobe, Miyagi (JP); Eisuke Koizumi, Miyagi (JP); Shingo Hasegawa, Miyagi (JP)

(73) Assignee: Panasonic Corporation, Osaka (JP)

(*) Notice: Subject to any disclaimer, the term of this patent is extended or adjusted under 35 U.S.C. 154(b) by 366 days.

(21) Appl. No.: 13/128,080

(22) PCT Filed: Nov. 20, 2009

(86) PCT No.: PCT/JP2009/006260
§ 371 (c)(1),
(2), (4) Date: May 6, 2011

(87) PCT Pub. No.: WO2010/061561
PCT Pub. Date: Jun. 3, 2010

(65) Prior Publication Data
US 2011/0225653 A1    Sep. 15, 2011

(30) Foreign Application Priority Data
Nov. 26, 2008    (JP) .................................. 2008-301308

(51) Int. Cl.
*H04L 29/06*    (2006.01)
*G06F 21/00*    (2013.01)

(52) U.S. Cl.
USPC ........................................... 726/22; 713/187

(58) Field of Classification Search
None
See application file for complete search history.

(56) References Cited

U.S. PATENT DOCUMENTS 6,266,697 B1    7/2001    Miyamoto
6,510,992 B2    1/2003    Wells et al.
(Continued)

FOREIGN PATENT DOCUMENTS

EP    0 902 369    3/1999
JP    3056732    4/2000
(Continued)

OTHER PUBLICATIONS

USPTO Office Action mailed Jan. 17, 2013 in U.S. Appl. No. 12/624,739.
(Continued)

*Primary Examiner* — Gilberto Barron, Jr.
*Assistant Examiner* — Simon Kanaan
(74) *Attorney, Agent, or Firm* — Wenderoth, Lind & Ponack, L.L.P.

(57) ABSTRACT

To aim to provide a monitoring system and a program execution apparatus that are capable of maintaining the security intensity even in the case where an unauthentic install module is invalidated. Install modules included in an apparatus each monitor an install module, which is a monitoring target indicated by a monitoring pattern included therein, as to whether the install module performs malicious operations. An install module that performs malicious operations is invalidated in accordance with an instruction from an update server. The monitoring patterns are restructured by the update server such that the install modules except the invalidated install module are each monitored by at least another one of the install modules. The restructured monitoring patterns are distributed to the install modules except the invalidated install module.

15 Claims, 62 Drawing Sheets

(56) References Cited

U.S. PATENT DOCUMENTS

| | | | |
|---|---|---|---|
| 6,539,266 | B1 | 3/2003 | Ishikawa |
| 7,594,267 | B2 * | 9/2009 | Gladstone et al. .............. 726/23 |
| 7,974,234 | B2 | 7/2011 | Gustave et al. |
| 8,230,415 | B1 | 7/2012 | Thomas |
| 8,281,118 | B2 | 10/2012 | Chen et al. |
| 2007/0136297 | A1 | 6/2007 | Choe |
| 2009/0328221 | A1 * | 12/2009 | Blumfield et al. .............. 726/24 |
| 2010/0235588 | A1 | 9/2010 | Maeda et al. |
| 2013/0061323 | A1 | 3/2013 | Liske |

FOREIGN PATENT DOCUMENTS

| | | |
|---|---|---|
| JP | 2000-293370 | 10/2000 |
| JP | 2008-123262 | 5/2008 |
| WO | 97/09667 | 3/1997 |
| WO | 2007/000703 | 1/2007 |
| WO | 2008/099682 | 8/2008 |

OTHER PUBLICATIONS

Efficient Content Authentication in Peer-to-peer Networks; Roberto Tamassia and Nikos Triandopoulos; year 2007.

Taojun Wu, Nathan Skirvin, Jan Werner, Brano Kusy, "Group-based Peer Authentication for Wireless Sensor Networks" I 27, Apr. 2006.

International Search Report issued Dec. 15, 2009 in International (PCT) Application No. PCT/JP2009/006260.

"Gendai Ango" (Modern Cryptography) by Tatsuaki Okamoto et al., Hirosuke, Sangyotosho, pp. 171-173, 1997, together with verified partial translation.

ITU-T-REC-X.509-199708-S, Series X: Data Networks and Open System Communications, Information technology—Open Systems Interconnection—The Directory: Authentication framework.

Office Action mailed Aug. 10, 2012 in related U.S. Appl. No. 12/624,739.

Chinese Office Action issued Apr. 28, 2013 in corresponding Chinese Patent Application No. 200980146433.5.

Intrusion Detection and Active Response in Mobile Ad Hoc Networks (3.3&3.4), together with English abstract and partial translation.

Notice of Allowance issued Apr. 22, 2013 in corresponding U.S. Appl. No. 12/624,739.

Extended European Search Report issued Nov. 29, 2013 in corresponding European Application No. 09828811.1.

* cited by examiner

MONITORING SYSTEM, PROGRAM-EXECUTING DEVICE, MONITORING PROGRAM, RECORDING MEDIUM AND INTEGRATED CIRCUIT

TECHNICAL FIELD

The present invention relates to a monitoring system and an execution apparatus that monitor whether or not a program operating on the execution apparatus performs malicious operations.

BACKGROUND ART

Recently, there are increasing attacks on programs executed on apparatuses such as personal computers and digital broadcast receivers. Such programs are tampered with for example, and perform malicious operations. This grows into a serious problem.

In order to solve this problem, Patent Literature 1 discloses an art of increasing the certainty of detecting whether one program has been tampered with by causing a large number of programs to perform mutual monitoring as to tampering. Specifically, as shown in FIG. 61, monitoring modules A and B are each composed of a program to be protected against attacker's tampering (main programs A and B), a program for detecting whether other module has been tampered with (check programs A and B), and information necessary for the corresponding check program to perform tampering detection (check information A and B), such as a hash value of a program that is a target of tampering detection.

The check program A detects whether the main program B and the check program B of the monitoring module B have been tampered with, using the check information A. On the other hand, the check program B detects whether the main program A and the check program A of the monitoring module A have been tampered with, using the check information B. According to this structure, unless the check programs A and B are tampered with at the same time, it is possible to detect whether the main programs A and B and the check programs A and B have been tampered with.

CITATION LIST

Patent Literature

[Patent Literature 1]
Japanese Patent No. 3056732 (pp. 4-6 and FIG. 2)
[Patent Literature 2]
WO2008/099682

Non-Patent Literature

[Non-Patent Literature 1]
Tatsuaki OKAMOTO, Hirosuke YAMAMOTO "Gendai Ango" (Modern Cryptography), Sangyotosho (1997)
[Non-Patent Literature 2]
ITU-T Recommendation X.509 (1997 E): Information Technology—Open Systems Interconnection—The Directory: Authentication Framework, 1997

SUMMARY OF INVENTION

Technical Problem

According to the above conventional structure, in the case where a monitoring module has been tampered with, this tampered monitoring module can be prevented from performing malicious operations by being invalidated. However, an install module that has been monitored by the tampered monitoring module will be no longer monitored by other module. This decreases the security intensity of the system.

Also, suppose that a structure is employed in which one monitoring module is monitored by a plurality of monitoring modules (10 monitoring modules, for example). In the case where any one of the plurality of monitoring modules is invalidated, the number of monitoring modules that monitor the one monitoring module decreases to nine. This remains the fact that the security intensity of the system decreases. As the number of invalidated monitoring modules further increases, the security intensity rapidly decreases.

Also, even in the case where a monitoring module is invalidated and a new monitoring module is added instead, the new monitoring module is not monitored by any monitoring module. This cannot maintain the security intensity.

In view of these problems, the present invention aims to provide a monitoring system, a program execution apparatus, a monitoring program, a recording medium, and an integrated circuit that are capable of maintaining the security intensity even in the case where an unauthentic install module is invalidated or a new install module is added.

Solution to Problem

In order to solve the above conventional problems, a monitoring system that is one aspect of the present invention is a monitoring system that includes a program execution apparatus and a server apparatus, the program execution apparatus comprising a plurality of modules including at least two monitoring modules, the monitoring modules each monitoring at least another one of the plurality of modules as to whether the at least another one module performs malicious operations, the each monitoring module comprising: a holding unit operable to hold therein a piece of monitoring target information indicating at least another one of the plurality of modules as a monitoring target; a monitoring unit operable to monitor the at least another one module indicated by the piece of monitoring target information; a transmission unit operable to transmit a result of the monitoring to the server apparatus; and an update unit operable, when acquiring a new piece of monitoring target information for update from the server apparatus, to update the held piece of monitoring target information with the new piece of monitoring target information, and the server apparatus comprising: an acquisition unit operable to acquire the results of the monitoring performed by the respective monitoring modules; a specification unit operable to specify, based on all the acquired results of the monitoring, which of the plurality of modules performs malicious operations; and a transmission unit operable to (i) hold therein pieces of monitoring target information that are the same as the pieces of monitoring target information held in the respective monitoring modules, (ii) restructure the pieces of monitoring target information held therein such that the plurality of modules except the specified module are each monitored by at least one of the monitoring modules, and (iii) transmit, to any of the monitoring modules whose piece of monitoring target information needs to be updated as a result of the restructuring, one of the restructured pieces of monitoring target information corresponding to the any monitoring module.

Advantageous Effects of Invention

According to the monitoring system having the above structure that is one aspect of the present invention, the following effect can be exhibited. In the case where a module that is being monitored or a module that monitors other module performs malicious operations and the module that performs malicious operations is invalidated for example, the monitoring target information is restructured and updated. This can prevent each module from not being monitored by any other module, and therefore prevent the security intensity of the system from decreasing.

BRIEF DESCRIPTION OF DRAWINGS

FIG. 51 shows an example where half or more of install modules relating to the third embodiment of the present invention are tampered with.

FIG. 52 shows an example where three of the install modules relating to the third embodiment of the present invention are tampered with.

FIG. 53 shows an example where both two install modules adjacent to an install module 131 relating to the third embodiment of the present invention are tampered with.

DESCRIPTION OF EMBODIMENTS

Figure 1:
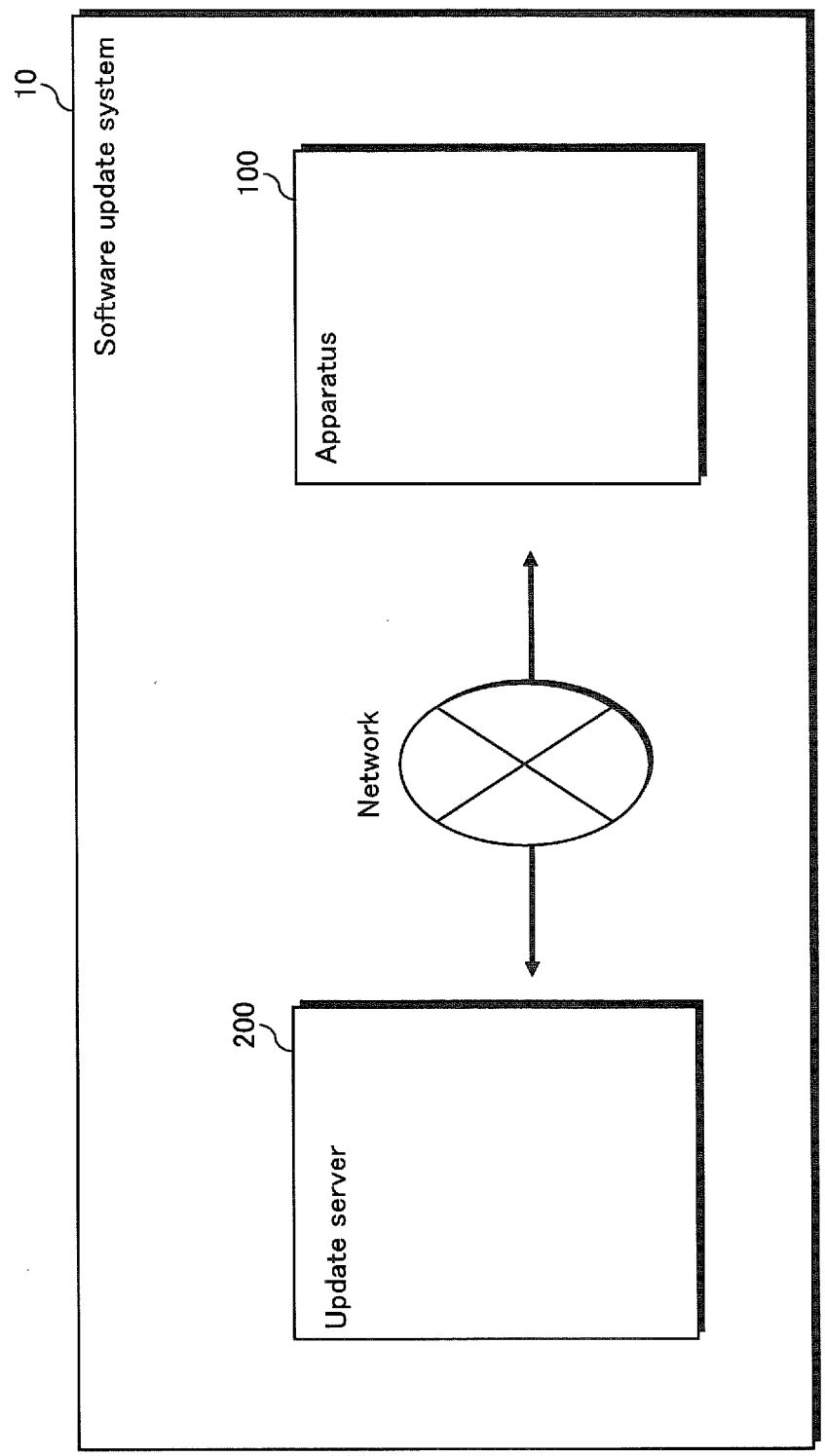
FIG. 1 shows the overall structure of a software update system 10 relating to a first embodiment of the present invention.

A program execution apparatus that is one aspect of the present invention is a program execution apparatus comprising a plurality of monitoring modules including a first monitoring module and a second monitoring module, the monitoring modules each monitoring at least another one of the monitoring modules, the first monitoring module comprising: a holding unit operable to hold therein monitoring target information indicating at least another one of the monitoring modules as a monitoring target; and an update unit operable, when acquiring new monitoring target information for update from a server apparatus, to update the monitoring target information held in the holding unit with the new monitoring target information, and the second monitoring module comprising: a check unit operable, when the first monitoring module performs the update of the monitoring target information, to check whether the update has been normally performed; and a transmission unit operable to transmit a result of the check to the server apparatus.

With this structure, when the first monitoring module updates the monitoring target information held therein, the second monitoring module checks whether the update been normally performed. Accordingly, in the case where the first monitoring module has been tampered with for example and does not normally update its monitoring target information on purpose, the program execution apparatus can surely recognize the situation that the monitoring target information has not been normally updated. Furthermore, since the result of the check is transmitted to the server apparatus, the server apparatus can also recognize that the monitoring target information has not been normally updated by the program execution apparatus. In the case where the monitoring target information has not been normally updated, the server apparatus re-transmits the new monitoring target information and the first monitoring module retries the update, or the first monitoring module is invalidated, which does not normally update the monitoring target information on purpose, for example. This can prevent the first monitoring module from operating in accordance with the monitoring target information that is unauthentic, and therefore prevent the security intensity of the system from decreasing.

Also, the check unit may hold therein beforehand an expected value of a summary value that is to be generated based on the monitoring target information held in the first monitoring module, generate a summary value based on the monitoring target information held in the first monitoring module, and perform the check by comparing the generated summary value with the expected value.

With this structure, comparison is performed by using not pieces of monitoring target information but summary values. This can reduce the processing load for performing comparison.

Also, when acquiring the new monitoring target information, the first monitoring module may stop monitoring the at least another one monitoring module indicated by the monitoring target information, and when receiving an execution instruction issued by the server apparatus based on a result of the check, the first monitoring module may monitor at least another one of the monitoring modules that is indicated by the new monitoring target information.

With this structure, it is possible to stop the monitoring operations performed by the first monitoring module until an execution instruction is received from the server apparatus. Then, it is possible to start again the monitoring operations after the server apparatus confirms that the monitoring target information has been normally updated.

Also, before performing the update, the first monitoring module may make a backup of the monitoring target information held in the holding unit, and when receiving the execution instruction, the first monitoring module may discard the backup.

Also, when not receiving the execution instruction, the first monitoring module may perform rollback processing using the backup.

With this structure, in the case where the server apparatus does not confirm that the monitoring target information has been normally updated, the program execution apparatus can perform monitoring as to malicious operations using the monitoring target information before update instead of the monitoring target information that has not been normally updated.

Also, the second monitoring module may further comprise: a holding unit operable to hold therein monitoring target information indicating at least another one of the monitoring modules that is to be monitored; and an update unit operable, when acquiring new monitoring target information for update from the server apparatus, to update the monitoring target information held in the holding unit of the second monitoring module with the new monitoring target information, and the first monitoring module may further comprise: a check unit operable, when the update unit of the second monitoring module performs the update of the monitoring target information, to check whether the update has been normally performed; and a transmission unit operable to transmit a result of the check to the server apparatus.

With this structure, the first monitoring module monitors whether the monitoring target information of the second monitoring module has been normally updated, and the second monitoring module monitors whether the monitoring target information of the first monitoring module has been normally updated. This can increase the security intensity of the system.

Also, the new monitoring target information may be structured such that the monitoring modules are each monitored by at least another one of the monitoring modules.

With this structure, in the case where a module that is being monitored or a module that monitors other module performs malicious operations and the module that performs malicious operations is invalidated for example, the monitoring target information is restructured and updated. This can prevent each module from not being monitored by any other module, and therefore prevent the security intensity of the system from decreasing.

Also, the update unit may acquire integrated monitoring target information that includes pieces of new monitoring target information for update one-to-one corresponding to the monitoring modules, and extract a corresponding one of the pieces of new monitoring target information from the integrated monitoring target information.

With this structure, it is possible to reduce the processing load on the server apparatus for dividing the integrated monitoring target information into pieces of monitoring target information one-to-one corresponding to the monitoring modules.

A monitoring program that is one aspect is a monitoring program comprising a plurality of monitoring modules including a first monitoring module and a second monitoring module, the monitoring modules each monitoring at least another one of the monitoring modules, the first monitoring module comprising: a holding step of holding monitoring target information indicating at least another one of the monitoring modules as a monitoring target; and an updating step of, when acquiring new monitoring target information for update from a server apparatus, updating the monitoring target information held in the holding step with the new monitoring target information, and the second monitoring module comprising: a checking step of, when the first monitoring module performs the update of the monitoring target information, checking whether the update has been normally performed; and a transmitting step of transmitting a result of the check to the server apparatus.

A recording medium that is one aspect of the present invention is a computer readable recording medium that records therein a monitoring program comprising a plurality of monitoring modules including a first monitoring module and a second monitoring module, the monitoring modules each monitoring at least another one of the monitoring modules, the first monitoring module comprising: a holding step of holding monitoring target information indicating at least another one of the monitoring modules as a monitoring target; and an updating step of, when acquiring new monitoring target information for update from a server apparatus, updating the monitoring target information held in the holding step with the new monitoring target information, and the second monitoring module comprising: a checking step of, when the first monitoring module performs the update of the monitoring target information, checking whether the update has been normally performed; and a transmitting step of transmitting a result of the check to the server apparatus.

An integrated circuit that is one aspect is an integrated circuit comprising a plurality of monitoring modules including a first monitoring module and a second monitoring module, the monitoring modules each monitoring at least another one of the monitoring modules, the first monitoring module comprising: a holding unit operable to hold therein monitoring target information indicating at least another one of the monitoring modules as a monitoring target; and an update unit operable, when acquiring new monitoring target information for update from a server apparatus, to update the monitoring target information held in the holding unit with the new monitoring target information, and the second monitoring module comprising: a check unit operable, when the first monitoring module performs the update of the monitoring target information, to check whether the update has been normally performed; and a transmission unit operable to transmit a result of the check to the server apparatus.

With this structure, when the first monitoring module updates the monitoring target information held therein, the second monitoring module checks whether the update been normally performed. Accordingly, in the case where the first monitoring module has been tampered with for example and does not normally update its monitoring target information on purpose, the program execution apparatus can surely recognize the situation that the monitoring target information has not been normally updated. Furthermore, since the result of the check is transmitted to the server apparatus, the server apparatus can also recognize that the monitoring target information has not been normally updated by the program execution apparatus. In the case where the monitoring target information has not been normally updated, the server apparatus re-transmits the new monitoring target information and the first monitoring module retries the update, or the first monitoring module is invalidated, which does not normally update the monitoring target information on purpose, for example. This can prevent the first monitoring module from operating in accordance with the monitoring target information that is unauthentic, and therefore prevent the security intensity of the system from decreasing.

The following describes a software update system that is one of embodiments of the present invention with reference to the drawings.

First Embodiment

1. Structure of Software Update System 10

FIG. 1 shows the overall structure of a software update system 10 relating to the first embodiment of the present invention.

The software update system 10 is, as shown in FIG. 1, composed of an apparatus 100 that is an information processing apparatus relating to the present invention and an update server 200 that is a management apparatus relating to the present invention, which are connected with each other via a network.

The apparatus 100 is an information processing apparatus that provides a user with various functions using the network. Specifically, the functions allow the users to purchase contents such as music and video and play back the purchased contents, and access a system of a financial institution and perform interne banking (balance inquiry and account transfer), for example.

2. Structure of Apparatus 100

Figure 2:
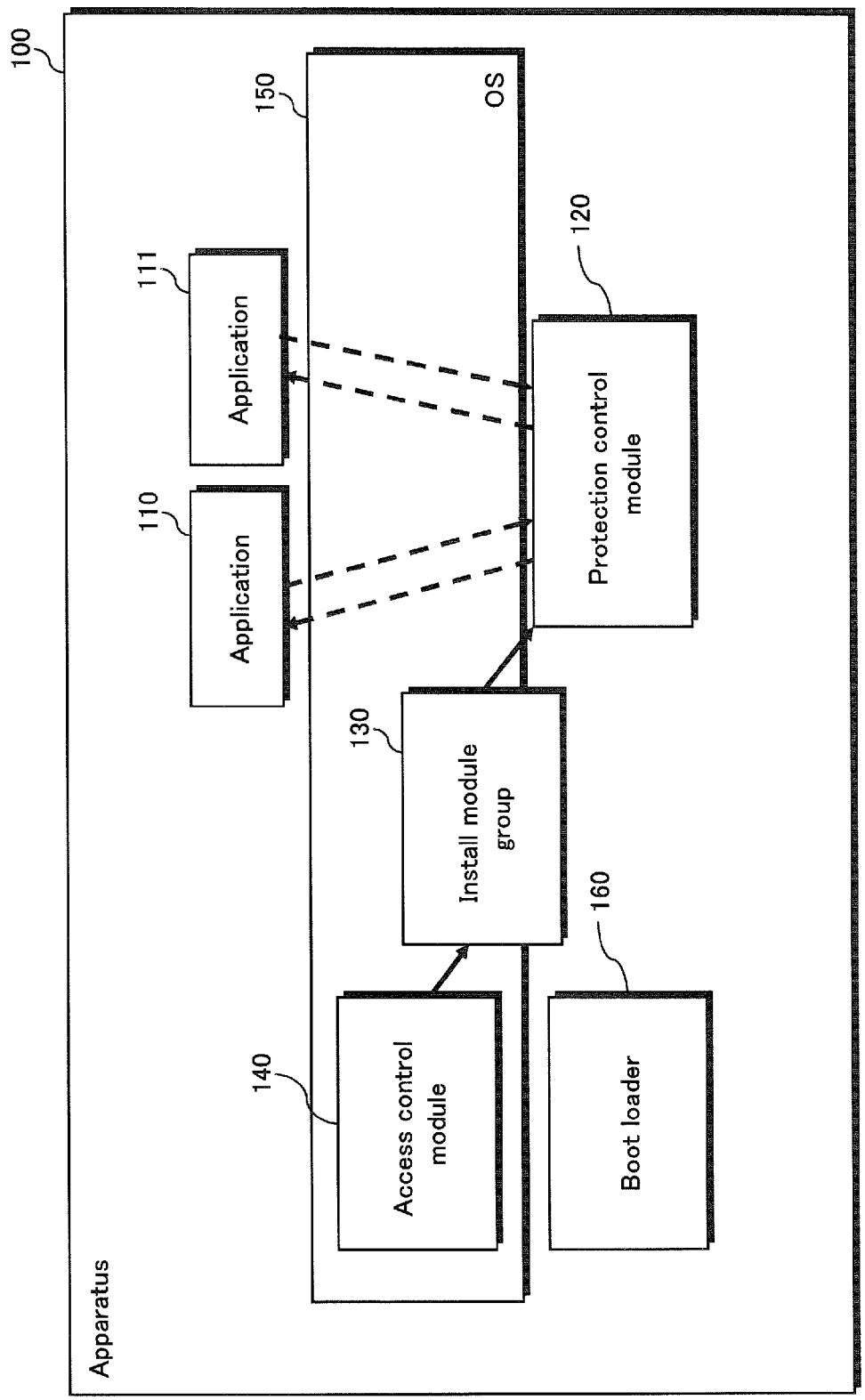
FIG. 2 shows the structure of an apparatus 100 relating to the first embodiment of the present invention.
Figure 3:
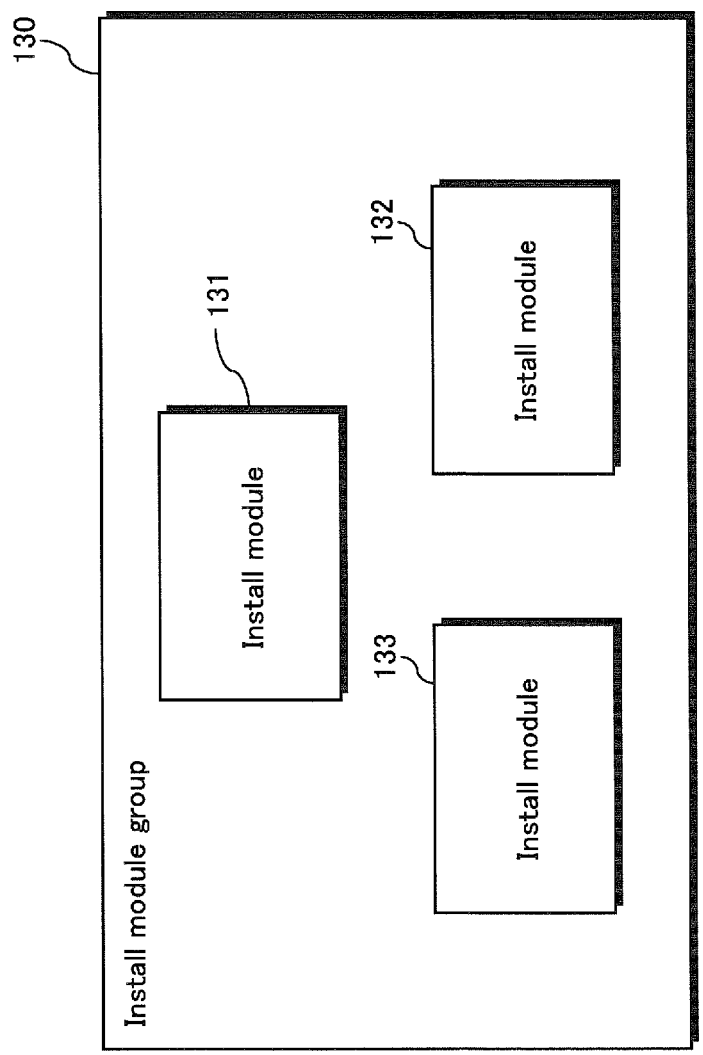
FIG. 3 shows the structure of an install module group 130 relating to the first embodiment of the present invention.
Figure 4:
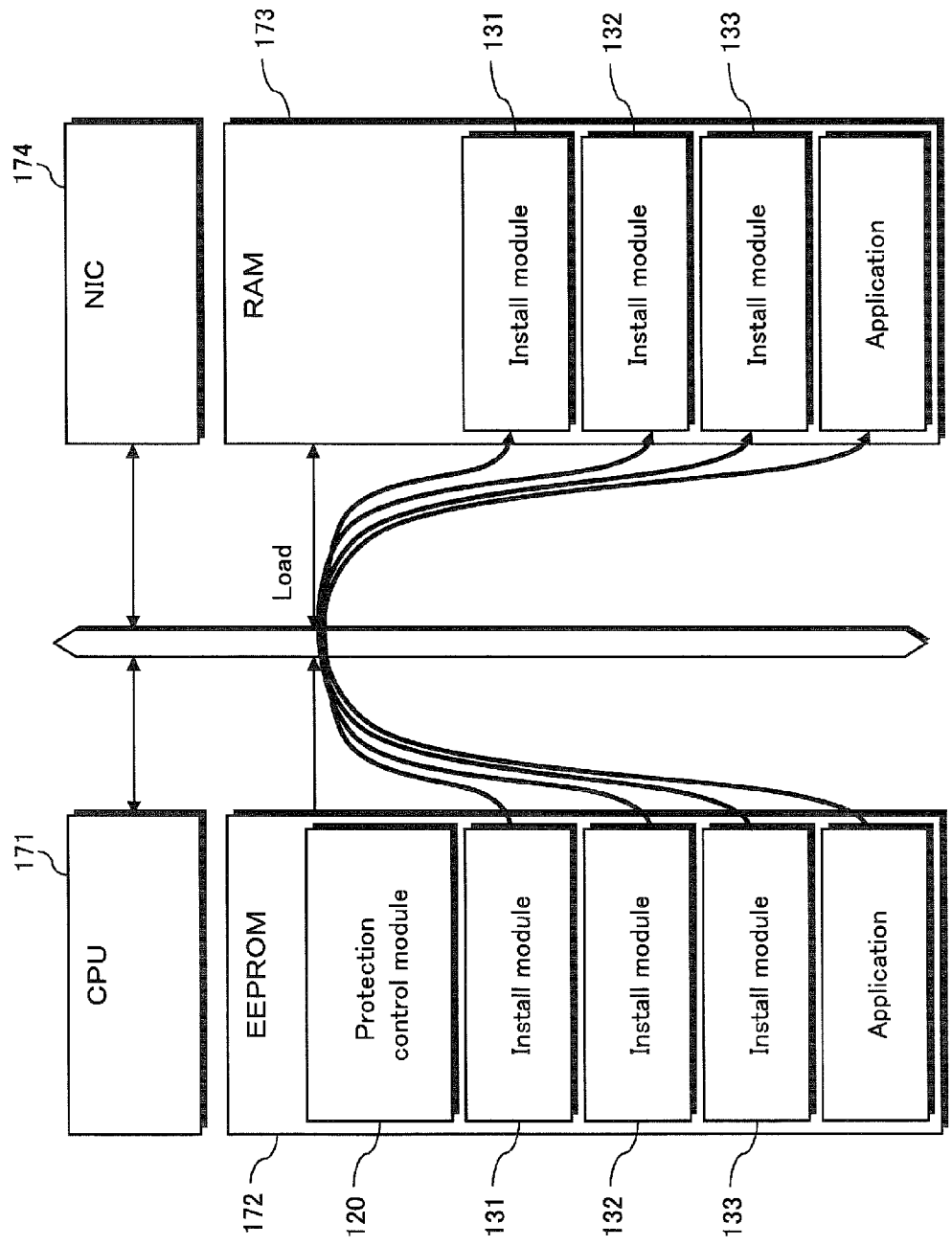
FIG. 4 shows the hardware structure relating to the first embodiment of the present invention.

The following describes the structure of the apparatus 100, with reference to FIG. 2 to FIG. 4.

The apparatus 100 is, as shown in FIG. 2, composed of applications 110 and 111, a protection control module 120, an install module group 130, and an access control module 140.

The applications 110 and 111 are each software that provides the user of the apparatus 100 with various functions using the network, and are each, for example, software for purchasing contents such as music and video from a contents provider server (not shown) and playing back the purchased contents, and software for accessing a system (not shown) of a financial institution and performing interne banking such as balance inquiry and account transfer.

The applications 110 and 111 each have secret data such as an authentication key for performing authentication with the contents provider server and the system of the financial institution. The secret data needs to be protected so as not to be extracted from the application and not to be used in an unauthorized manner by a malicious third party (hereinafter, "attacker").

The protection control module 120 has functions of protecting the applications (110 and 111) in order to prevent the applications (110 and 111) from being analyzed and secret data such as an authentication key from being extracted by an attacker. The functions of protecting the applications include: a decryption loading function of, when not used, encrypting an application and storing the encrypted application, and only when used, decrypting the application and loading the decrypted application onto a memory; a tampering detection function of checking whether an application has been tampered with; and an analysis tool detection function of checking whether an analysis tool such as a debugger operates.

The protection control module 120 controls the operations of these functions so as to check whether the applications (110 and 111) have been analyzed by the attacker. When detecting an attacker's attack, the protection control module 120 stops the operations of the applications (110 and 111), and performs clear processing on a memory region where the applications (110 and 111) have used, especially a memory region where secret data is stored, thereby to prevent leakage of secret data.

FIG. 3 shows the structure of the install module group 130 relating to the first embodiment. The install module group 130 is composed of install modules 131, 132, and 133.

The install modules 131, 132, and 133 each have a function of receiving a correction software from the update server 200 outside of the apparatus 100, and updating software included in the apparatus 100 (the applications 110 and 111, the protection control module 120, and the like).

Furthermore, in order to prevent each of the install modules included in the install module group 130 from being tampered with and being used in an unauthorized manner, the install modules perform mutual tampering detection. As a result, in the case where it is detected that some of the install modules included in the install module group 130 has been attacked and tampered with, it is possible to detect the attack and tampering, and react against the attack. The structure of the install modules (131, 132, and 133) is described later.

The access control module 140 stores therein access information necessary for the install modules (131, 132, and 133) to delete other install module. The access information is information necessary for deleting an install module that is a deletion target. The access information is, for example, an address of an install module that is to be deleted and a procedure manual in which a procedure necessary for deleting the install module are written. The access information is encrypted using an access information acquisition key for each install module that is to be deleted, and is stored in the access control module 140.

Here, returning to FIG. 2, the software hierarchy of the apparatus 100 is described. As shown in FIG. 2, the access control module 140 and the install module group 130 are mounted in an OS 150. The applications 110 and 111 operate on the OS 150, and the protection control module 120 and the boot loader 160 are out of control of the OS 150.

In order to boot up the apparatus 100, the protection control module 120 and the install module group 130 are firstly booted up, and then the applications are executed.

Next, the hardware structure of the apparatus 100 is described with reference to FIG. 4. As shown in FIG. 4, the apparatus 100 includes a CPU (Central Processing Unit) 171, a nonvolatile memory (for example, an EEPROM (Electrically Erasable and Programmable Read Only Memory)) 172, an RAM (Random Access Memory) 173, an NIC (Network Interface Card) 174, and so on, which are connected with one another for communication via a bus.

The EEPROM 172 stores therein the protection control module 120, the install modules (131, 132, and 133), the applications (110 and 111), and so on.

Function units of each control module stored in the EEPROM 172 are realized by the CPU 171 executing the control modules. Specifically, the function units of the modules are written by a computer program.

The RAM 173 is used as a work area of the CPU 171. The install modules (131, 132, and 133) and the applications (110 and 111) are loaded onto the RAM 173. An install module operating on the RAM 173 is a target of tampering detection and invalidation performed by the protection control module 120.

The NIC 174 is an expansion card for connecting to the network.

3. Structure of Update Server 200

The following describes the structure of the update server 200. The update server 200 is a software distribution apparatus that distributes, to the apparatus 100, correction software necessary for updating software of the apparatus 100.

Figure 5:
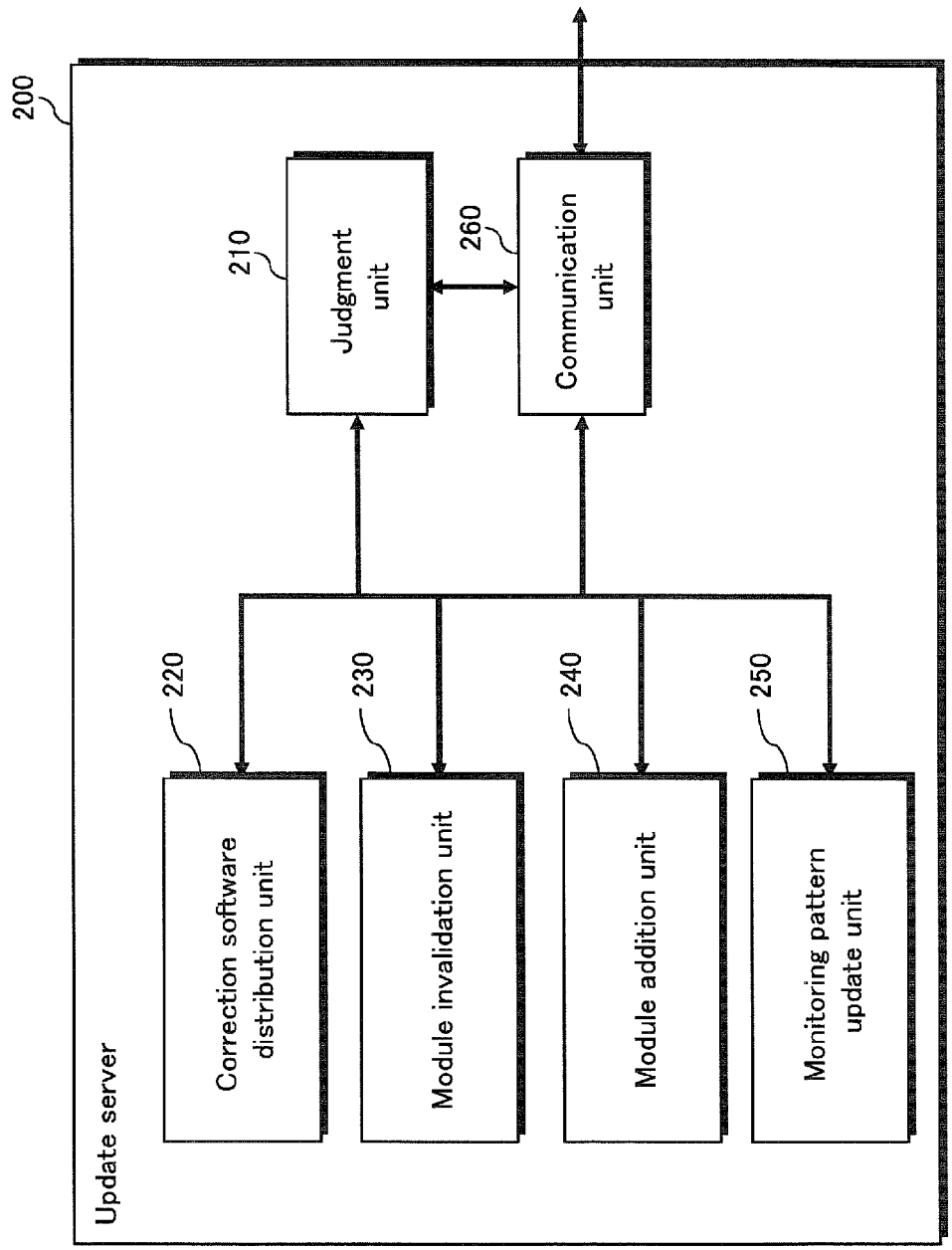
FIG. 5 shows the structure of an update server 200 relating to the first embodiment of the present invention.

FIG. 5 shows the structure of the update server 200 relating to the first embodiment. The update server 200 is composed of a judgment unit 210, a correction software distribution unit 220, a module invalidation unit 230, a module addition unit 240, a monitoring pattern update unit 250, and a communication unit 260.

The judgment unit 210 determines processing to be performed next by the apparatus 100 using a judgment criterion that has been given beforehand, depending on the status of the software included in the apparatus 100 (the applications 110 and 111, the protection control module 120, and the install module group 130). Then, the judgment unit 210 instructs each of the modules included in the update server 200 (the correction software distribution unit 220, the module invalidation unit 230, the module addition unit 240, and the monitoring pattern update unit 250) to perform processing.

In order to update the software included in the apparatus 100 (the applications 110 and 111 and the protection control module 120), the correction software distribution unit 220 operates in cooperation with the install module group 130 in accordance with an update processing start instruction, to safely transmit correction software to the apparatus 100.

In order to invalidate an install module included in the install module group 130 of the apparatus 100, the module invalidation unit 230 operates in cooperation with the install module group 130 in accordance with a module invalidation instruction output from the judgment unit 210, to distribute an access information acquisition key to an install module that is to perform invalidation processing on the install module that is an invalidation target.

In order to add an install module to the install module group 130 of the apparatus 100, the module addition unit 240 operates in cooperation with the install module group 130 in accordance with a module addition instruction output from the judgment unit 210, to safely transmit an additional install module to the apparatus 100.

In order to update a monitoring pattern of the install module group 130 of the apparatus 100, the monitoring pattern update unit 250 operates in cooperation with the install module group 130 in accordance with a monitoring pattern update instruction output from the judgment unit 210, to transmit data necessary for updating a monitoring pattern of each of the install modules included in the install module group 130 to the apparatus 100.

The communication unit 260 transmits/receives information to/from the apparatus 100. The communication unit 260 outputs information received from the apparatus 100 to the compositional units of the update server 200, depending on type of the received information. Also, the communication unit 260 receives instructions and information from the compositional units, and transmits the received instructions and information to the apparatus 100.

Specifically, in update processing, the communication unit 260 transmits an instruction and a notification received from the correction software distribution unit 220 to the apparatus 100, and transmits a result of tampering detection received from the apparatus 100 to the judgment unit 210.

Also, in invalidation processing, the communication unit 260 transmits/receives instructions and information to/from the module invalidation unit 230 and the apparatus 100. Also, in addition processing, the communication unit 260 transmits/receives instructions and information to/from the module addition unit 240 and the apparatus 100. In monitoring pattern update processing, the communication unit 260 transmits/receives instructions and information to/from the monitoring pattern update unit 250 and the apparatus 100.

The apparatus 100 is connected with the update server 200 via a network. In order to update the software included in the apparatus 100 (the applications 110 and 111 and the protection control module 120), the install module group 130 and the correction software distribution unit 220 operate in cooperation with each other, to install correction software for updating the software included in the apparatus 100.

Also, when the software included in the apparatus 100 (the applications 110 and 111, the protection control module 120, and the install modules 131, 132, and 133) is attacked and tampered with, an install module that has not been tampered with, the access control module 140, and the module invalidation unit 230 operate in cooperation with one another to delete the tampered software.

Also, when the number of install modules included in the install module group 130 is decreased as a result of deletion of an install module, an install module that has not been tampered with, and the module addition unit 240 operate in cooperation with each other to add an install module.

Also, when a monitoring pattern for mutual monitoring among install modules needs to be updated as a result of deletion or addition of an install module, the monitoring pattern update unit 250 and the install module group 130 operate in cooperation with each other to update the monitoring pattern.

Note that a secure communication path may be used for communication between the apparatus 100 and the update server 200. The secure communication path is realized by encrypting communication data, for example.

4. Structure of Install Modules 131, 132, and 133

Next, the structure of the install modules included in the install module group 130 is described. Although only the structure of the install module 131 is described here, the structure of other install modules is basically the same as the structure of the install module 131.

Figure 6:
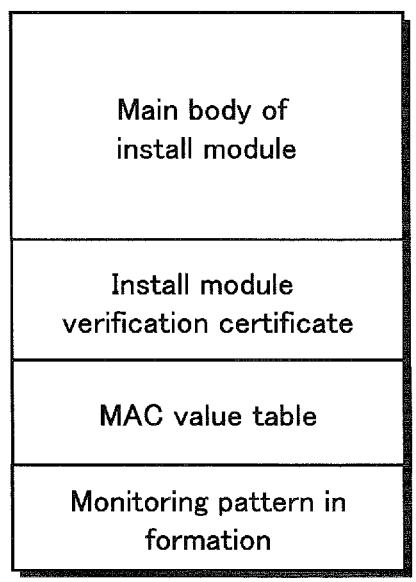
FIG. 6 shows the structure of an install module relating to the first embodiment of the present invention.

FIG. 6 shows the structure of the install module 131. The install module 131 is composed of a main body thereof, an install module verification certificate, a MAC (Message Authentication Code) value table, and monitoring pattern information.

The main body of the install module is a program of performing update processing on software, and is described in detail later.

The install module verification certificate is a certificate for verifying the main body of the install module has been tampered with. A module that is verify a main body of an install module acquires the main body of the install module and a verification certificate, and verifies whether the main body of the install module has been tampered with.

The MAC value table is a table used for the case where MAC values are used for verifying whether a module has been tampered with. The table stores therein module identifiers respectively for identifying modules and MAC values corresponding to the modules in one-to-one correspondence. Tampering detection of a module is performed by acquiring a module that is a tampering target, calculating a MAC value corresponding to the target module, and comparing the calculated MAC value with a MAC value of the target module stored in the MAC value table.

Figure 7:
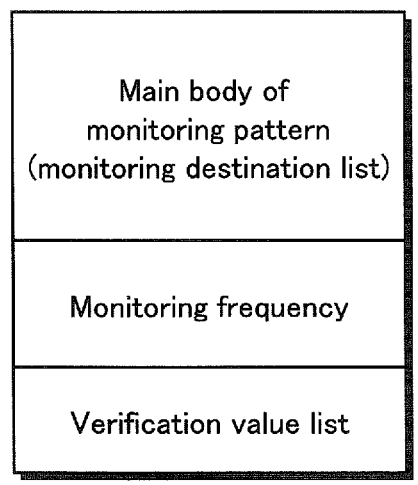
FIG. 7 shows the structure of monitoring pattern information relating to the first embodiment of the present invention.

The monitoring pattern information is information on a monitoring target to be used by an install module that is performing mutual monitoring. FIG. 7 shows the structure of a monitoring pattern information. The monitoring pattern information is composed of a main body of the monitoring pattern, monitoring frequency, and a verification value list.

The main body of the monitoring pattern includes information on a module that is a monitoring target (such as a module identifier, a position on the memory, the size, an address, and a file name). A plurality of monitoring patterns can be written in the main body of the monitoring pattern. In the case where a plurality of monitoring patterns are written, a monitoring pattern identifier is used for identifying each of the plurality of monitoring patterns. The main body of the monitoring pattern has the data structure in which the number of monitoring patterns and the size thereof are written as header information at the head, and pairs of a monitoring pattern identifier and a monitoring pattern are subsequently written.

The monitoring frequency is information on a timing of monitoring the monitoring target written in the main body of the monitoring pattern. By including the monitoring frequency in the monitoring pattern information, a frequency of monitoring can be arbitrarily adjusted, and accordingly verification on whether an install module has been tampered with can be appropriately performed.

The information on timing includes a time at which monitoring is performed, a time interval of repeatedly performing monitoring in the case where monitoring is repeatedly performed, or the like. Also, in the case where a plurality of monitoring patterns are written in the main body of the monitoring pattern, a monitoring frequency may be written for each of the plurality of monitoring patterns. In such a case, a monitoring frequency and a monitoring pattern identifier of a monitoring pattern that uses the monitoring frequency are written. Also, a timing of selecting a monitoring pattern to be used among the plurality of monitoring patterns may be written. The install modules 131, 132, and 133 each monitor a module written in the monitoring pattern in accordance with the information on timing.

The verification value list includes a verification value for surely acquiring the main body of the monitoring pattern and the monitoring frequency from the update server 200, and verifying whether update has been performed.

Figure 8:
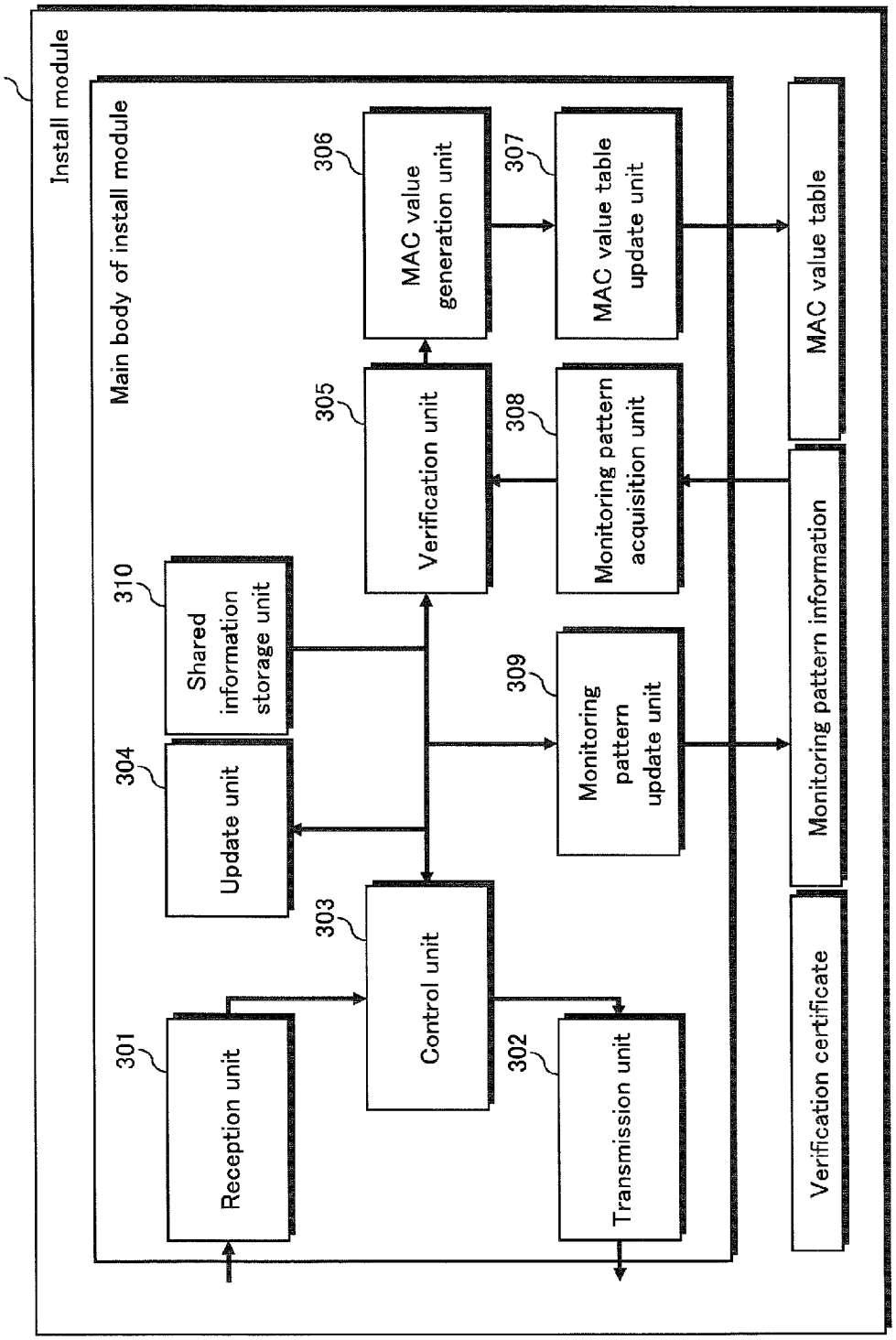
FIG. 8 shows the structure of a main body of the install module relating to the first embodiment of the present invention.

Next, the main body of the install module is described with reference to FIG. 8. FIG. 8 shows the structure of the main body of the install module 131. As shown in FIG. 8, the main body of the install module includes a reception unit 301, a transmission unit 302, a control unit 303, an update unit 304, a verification unit 305, a MAC value generation unit 306, a MAC value table update unit 307, a monitoring pattern acquisition unit 308, a monitoring pattern update unit 309, and a shared information storage unit 310.

The reception unit 301 receives various types of instructions and notifications and correction software from the update server 200. Also, the reception unit 301 receives a main body and a correction module verification certificate of other install module necessary for performing mutual monitoring. Furthermore, the reception unit 301 receives results of processing which the reception unit 301 has requested to other module and results of monitoring of the protection control module 120 performed by other install module.

The transmission unit 302 transmits data such as various types of processing results and certificates to the update server 200, the protection control module 120, other install module, and the access control module 140.

The control unit 303 controls the update unit 304, the verification unit 305, and the monitoring pattern update unit 309 based on various types of instructions and notifications received by the reception unit 301, so as to perform update processing and verification processing of the protection control module 120 and the install modules 132 and 133, and update processing of a monitoring pattern.

The update unit 304 operates in cooperation with the update server 200 to update the software included in the apparatus 100 (the applications 110 and 111, the protection control module 120, and the install modules 132 and 133).

The verification unit 305 verifies whether each of the protection control module 120 and the install modules 132 and 133 is authentic. The verification is performed using a verification certificate attached to each module, or using a Message Authentication Code (MAC) value which has been calculated beforehand.

A module on which and a timing at which the verification unit 305 is to perform verification are written in the monitoring pattern information. The verification unit 305 acquires a main body of a monitoring pattern and a monitoring frequency from the monitoring pattern information, and performs verification based on the acquired information. If there are a plurality of monitoring patterns, the verification unit 305 changes a monitoring pattern and a monitoring frequency to be used in accordance with an instruction output from the update server 200. For example, a monitoring pattern and a monitoring frequency to be used may be specified by the update server 200 for each time. Alternatively, a monitoring pattern and a monitoring frequency to be used may be specified with use of a time chart having written therein a time at which and which monitoring pattern and at which monitoring frequency a monitoring is to be performed. Further alternatively, a monitoring pattern and a monitoring frequency to be used may be specified with use of the correspondence among the status of the apparatus 100, monitoring patterns, and monitoring frequencies.

The status of the apparatus 100 includes, as specific examples, a "status in which protection control module is updated", a "status in which protection control module is not updated", a "during verification processing", a "during analysis/judgment processing", and a "during recovery processing". If the status of the apparatus 100 is the "status in which protection control module is not updated", a monitoring frequency may be decreased based on a monitoring pattern having rough regulations. If the status of the apparatus 100 is the "status in which protection control module is updated", a monitoring frequency may be increased based on a monitoring pattern having minute regulations.

By performing verification of an install module more strictly during recovery processing of the protection control module 120, it is possible to more effectively prevent tampering of the install module and interference of authorized operations of the install module.

The MAC value generation unit 306 generates a MAC value to be used by the verification unit 305. The MAC value generation unit 306 generates the MAC value using a verification key stored therein beforehand.

The MAC value table update unit 307 updates the MAC value table in which a MAC value of each module is stored.

The monitoring pattern acquisition unit 308 acquires a monitoring pattern in which a module that is a monitoring target is written, which is to be used by the verification unit 305. If there are a plurality of monitoring patterns, the verification unit 305 specifies an identifier of a monitoring pattern that is to be acquired. The monitoring pattern acquisition unit 308 acquires the monitoring pattern identified by the specified identifier from the monitoring pattern information.

Upon receiving an instruction of updating a monitoring pattern from the update server 200, the monitoring pattern update unit 309 performs processing of updating a monitoring pattern stored in the install module 131 to a new monitoring pattern received from the update server 200.

The shared information storage unit 310 stores therein shared information generated from an encryption/decryption key to be used by the protection control module 120 for encrypting/decrypting the applications (110 and 111) and arrangement information showing arrangement of shared information distributed by the protection control module 120. The arrangement information is information on an install module to which piece of the shared information has been distributed.

The signature scheme is described in detail in the Non-Patent Document 1. The certificate is described in detail in the Non-Patent Document 2. Also, shared information is described in detail in the Patent Document 2.

5. Structure of Protection Control Module 120

Figure 9:
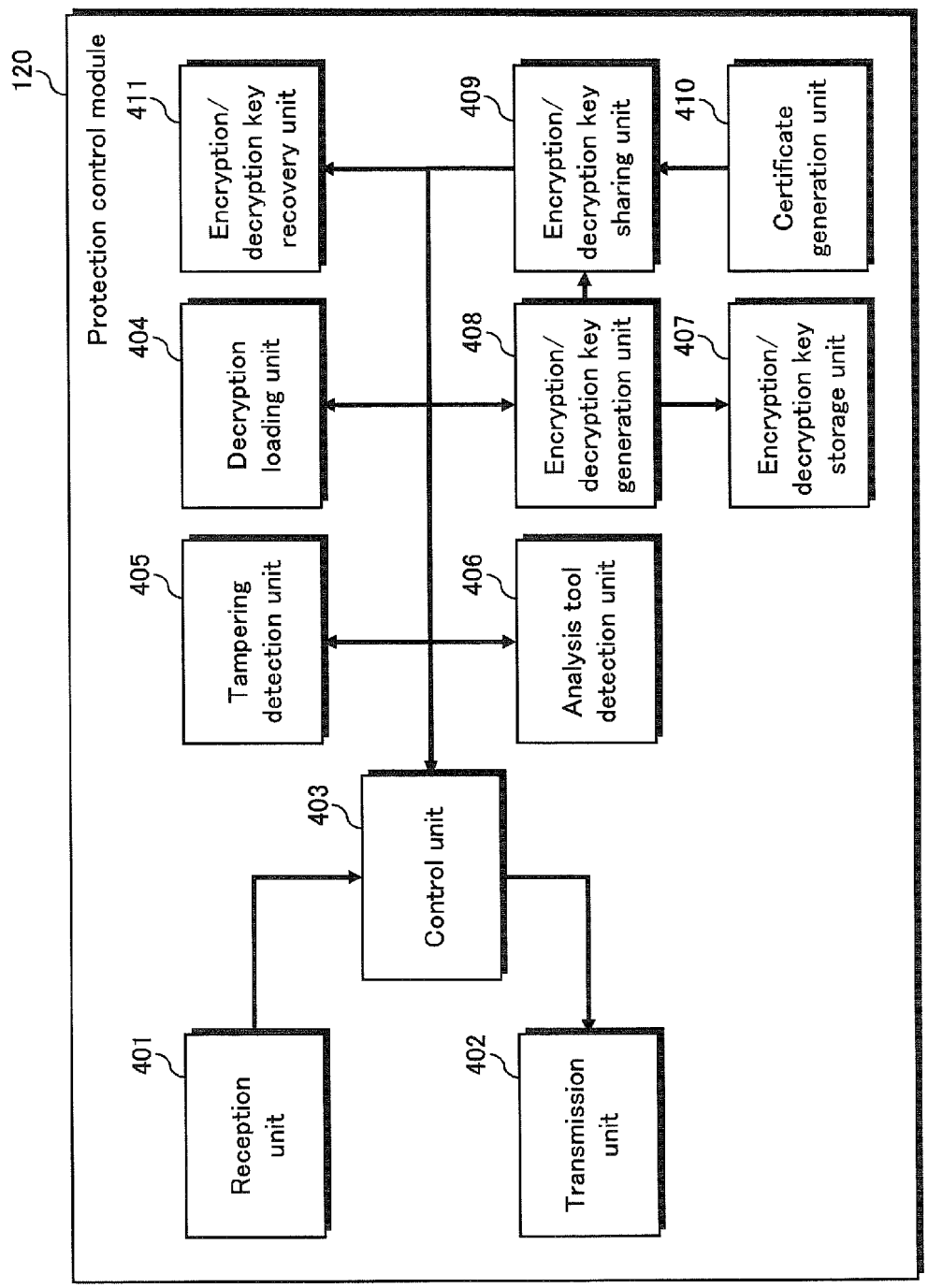
FIG. 9 shows the structure of a protection control module 120 relating to the first embodiment of the present invention.

FIG. 9 shows the structure of the protection control module 120 included in the apparatus 100. As shown in FIG. 9, the protection control module 120 is composed of a reception unit 401, a transmission unit 402, a control unit 403, a decryption loading unit 404, a tampering detection unit 405, an analysis tool detection unit 406, an encryption/decryption key storage unit 407, an encryption/decryption key generation unit 408, an encryption/decryption key sharing unit 409, a certificate generation unit 410, and an encryption/decryption key recovery unit 411.

The reception unit 401 receives shared information and various types of requests from the install modules 131, 132, and 133.

The transmission unit 402 transmits various types of requests and the like to the install modules 131, 132, and 133.

The control unit 403 controls the decryption loading unit 404, the tampering detection unit 405, and the analysis tool detection unit 406, to detect that the applications (110 and 111) are attacked by an attacker.

When the applications (110 and 111) that are encrypted and stored in the apparatus 100 are executed, the decryption loading unit 404 performs processing of decrypting the applications (110 and 111) using an encryption/decryption key, and loading the decrypted applications (110 and 111) onto the memory. Also, when a context switch to another application occurs during execution of the applications (110 and 111), the decryption loading unit 502 encrypts data stored on the memory using the encryption/decryption key. When a context switch to the applications (110 and 111) occurs, the decryption loading unit 502 decrypts the encrypted data.

Furthermore, in re-encryption processing which is described later, the decryption loading unit 404 decrypts the applications (110 and 111) using a recovered encryption/decryption key input from the encryption/decryption key recovery unit 411, and encrypts the applications (110 and 111) using a new encryption/decryption key stored in the encryption/decryption key storage unit 407.

The tampering detection unit 405 performs tampering detection processing of detecting whether the applications (110 and 111) have been tampered with. The tampering detection unit 405 may perform tampering detection processing by using a certificate for tampering detection attached to each of the applications (110 and 111) or by using a method of MAC values comparison.

When an analysis tool such as debugger is installed or operates, the analysis tool detection unit 406 detects the installation or operations. This is because there is a case where an attacker installs or operates the analysis tool in order to attack the applications (110 and 111). Detection is performed using a detection method such as a method of searching for a file name, a method of checking whether a special register for use by the debugger is used, and a method of detecting an interruption set by the debugger.

The encryption/decryption key storage unit 407 stores therein an encryption/decryption key for encrypting/decrypting the applications (110 and 111).

The encryption/decryption key generation unit 408 generates an encryption/decryption key for encrypting/decrypting the applications (110 and 111).

During initial design processing and next-round preparation processing, the encryption/decryption key sharing unit 409 generates pieces of shared information based on the encryption/decryption key using the secret sharing scheme.

The certificate generation unit 410 generates a certificate, which is used for verifying whether each of pieces of shared information generated based on the encryption/decryption key has been surely recovered.

The encryption/decryption key recovery unit 411 acquires a piece of shared information from each of the modules based on the structure of the install module, and recovers the encryption/decryption key based on the acquired pieces of shared information. Note that the structure of the install module is arrangement information of shared information of the install module group 130. The encryption/decryption key recovery unit 411 outputs the recovered encryption/decryption key to the decryption loading unit 404.

6. Structure of Access Control Module 140

Figure 10:
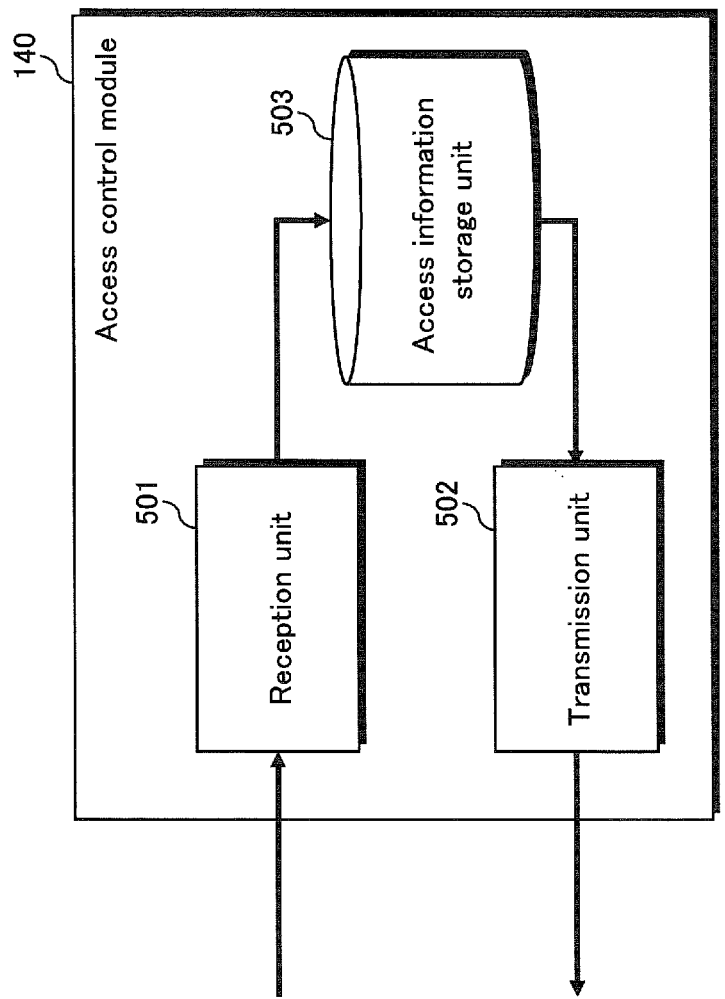
FIG. 10 shows the structure of an access control module 140 relating to the first embodiment of the present invention.

FIG. 10 shows the structure of the access control module 140 included in the apparatus 100. As shown in FIG. 10, the access control module 140 is composed of a reception unit 501, a transmission unit 502, and an access information storage unit 503.

The reception unit 501 receives an acquisition request of access information that is necessary for deleting an install module that has been tampered with, from the install modules (131, 132, and 133).

In response to the acquisition request, the transmission unit 502 transmits the access information to the install module that has issued the acquisition request.

The access information storage unit 503 stores therein, for each of the install modules 131, 132, and 133, access information for deleting the install module.

Each piece of access information has attached thereto an identifier of an install module that is a deletion target (install module identifier), and is associated with the install module. Each piece of the access information is encrypted using an access information acquisition key.

Upon receiving an acquisition request of access information from each of the install modules 131, 132, and 133, the access information storage unit 503 transmits a piece of access information having attached thereto an identifier of the install module that is the deletion target to each of the install modules 131, 132, and 133.

7. Structure of Judgment Unit 210

Figure 11:
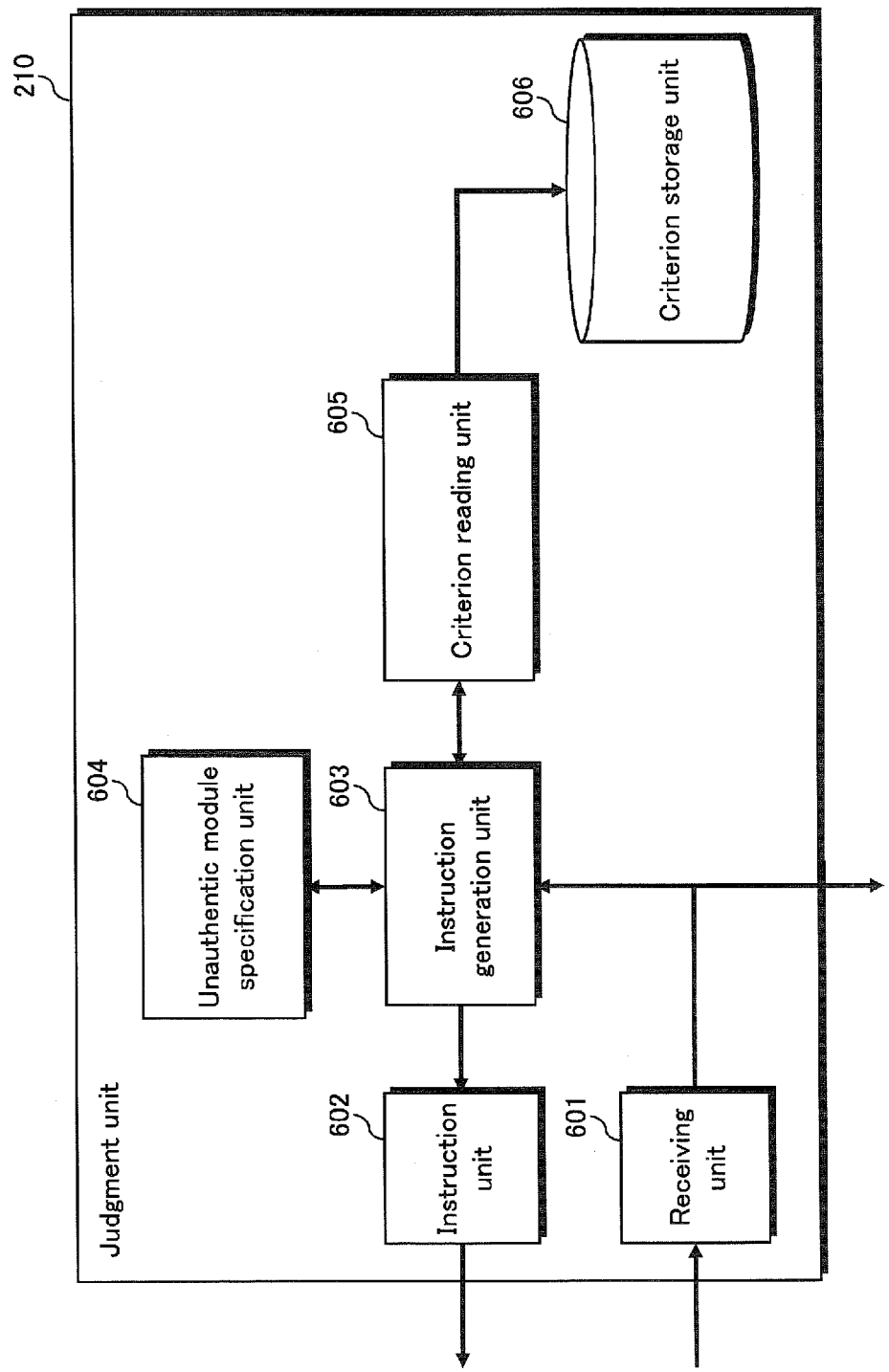
FIG. 11 shows the structure of a judgment unit 210 relating to the first embodiment of the present invention.

FIG. 11 shows the structure of the judgment unit 210 included in the update server 200. As shown in FIG. 11, the judgment unit 210 is composed of a receiving unit 601, an instruction unit 602, an instruction generation unit 603, an unauthentic module specification unit 604, a criterion reading unit 605, and a criterion storage unit 606.

The receiving unit 601 receives shared information, various types of requests, and the like from the install modules 131, 132, and 133, and outputs the received shared information, various types of requests, and the like to the instruction generation unit 603. Furthermore, upon receiving a processing completion notification from each of the compositional elements of the update server 200 (the correction software distribution unit 220, the module invalidation unit 230, the module addition unit 240, and the monitoring pattern update unit 250), the receiving unit 601 outputs the received processing completion notifications to the instruction generation unit 603.

The instruction unit 602 outputs instructions generated by the instruction generation unit 603 to each of the compositional elements of the update server 200.

The instruction generation unit 603 determines a priority order of processing of the apparatus 100 based on a judgment criterion received from the criterion reading unit 605, and generates an instruction to be output to each of the compositional elements of the update server 200.

Specifically, in the case where the protection control module 120 has not been tampered with, the instruction generation unit 603 instructs the module invalidation unit 230 to perform invalidation processing of an install module, and then instructs the module addition unit 240 to perform addition processing of an install module. Further then, the instruction generation unit 603 instructs the monitoring pattern update unit 250 to perform update processing of a monitoring pattern.

On the other hand, in the case where the protection control module 120 has been tampered with, the instruction generation unit 603 instructs the correction software distribution unit 220 to perform recovery processing of the protection control module 120, and then instructs the module invalidation unit 230 to perform invalidation processing of an install module. Further then, the instruction generation unit 603 instructs the module addition unit 240 to perform addition processing of an install module, and instructs the monitoring pattern update unit 250 to perform update processing of a monitoring pattern.

The unauthentic module specification unit 604 judges whether an install module has been tampered with based on a result of mutual monitoring (tampering detection) received from each of the install modules 131, 132, and 133. If judging that the install module has been tampered with, the unauthentic module specification unit 604 specifies which of the install modules has been tampered with. Furthermore, the unauthentic module specification unit 604 judges whether the protection control module 120 has been tampered with based on a result of tampering detection of the protection control module 120 received from each of the install modules 131, 132, and 133.

The criterion reading unit 605 loads a judgment criterion stored in the criterion storage unit 606, and outputs the loaded judgment criterion to the instruction generation unit 603.

The criterion storage unit 606 stores therein a judgment criterion which has been given beforehand. The judgment criterion shows the correspondence between the status of the apparatus 100 and the priority of processing.

8. Structure of Correction Software Distribution Unit 220

Figure 12:
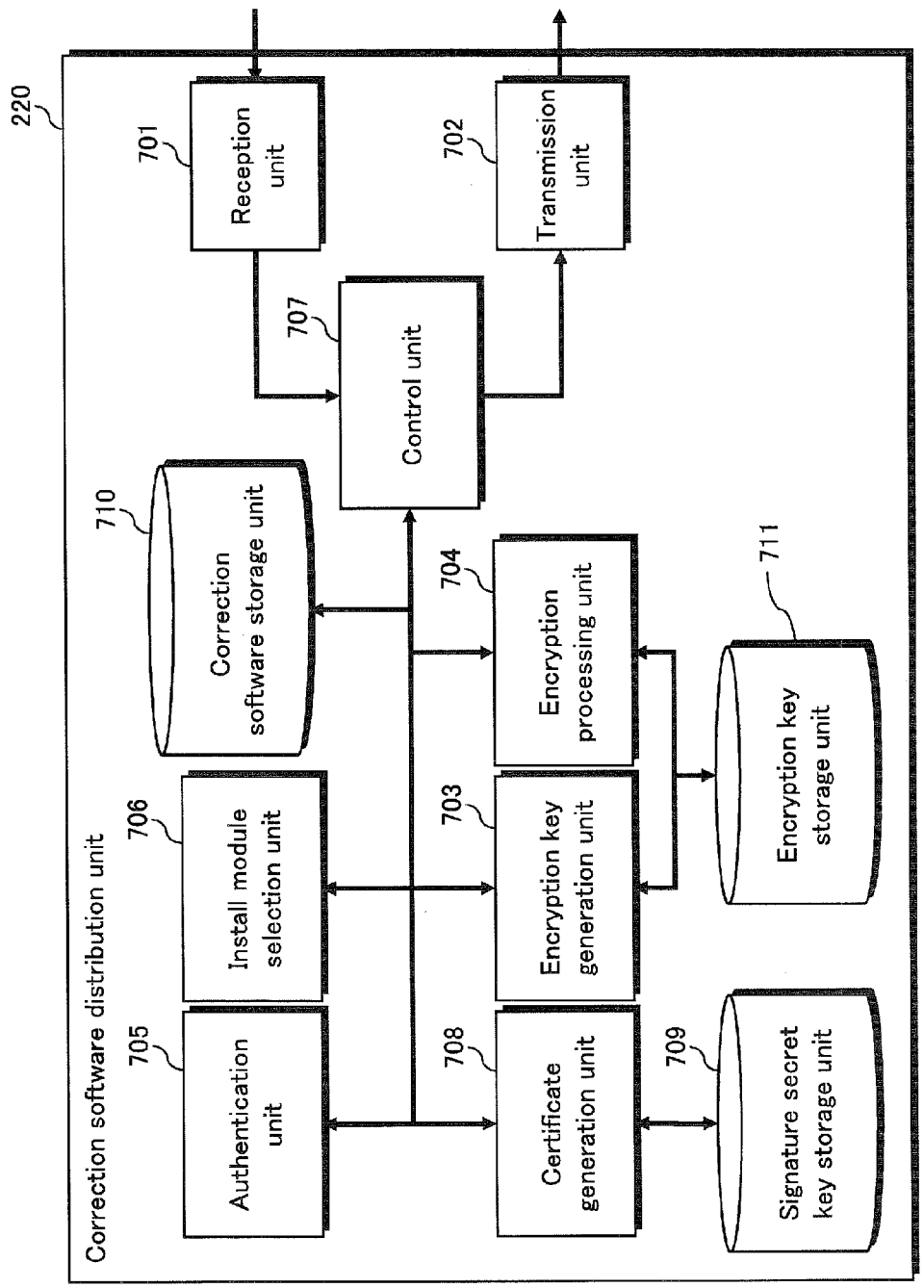
FIG. 12 shows the structure of a correction software distribution unit 220 relating to the first embodiment of the present invention.

FIG. 12 shows the structure of the correction software distribution unit 220 included in the update server 200. As shown in FIG. 12, the correction software distribution unit 220 is composed of a reception unit 701, a transmission unit 702, an encryption key generation unit 703, an encryption processing unit 704, an authentication unit 705, an install module selection unit 706, a control unit 707, a certificate generation unit 708, a signature secret key storage unit 709, a correction software storage unit 710, and an encryption key storage unit 711.

The reception unit 701 receives a result of tampering detection of the protection control module 120 and a result of mutual monitoring (tampering detection) of other install module from each of the install modules 131, 132, and 133.

When the software included in the apparatus 100 (the applications 110 and 111 and the protection control module 120) needs to be updated, the transmission unit 702 transmits a request for starting update processing, correction software, and data such as a key necessary for decryption to each of the install modules 131, 132, and 133.

The encryption key generation unit 703 generates an encryption key to be used for transmitting correction software to each of the install modules 131, 132, and 133.

The encryption processing unit 704 encrypts the correction software using an encryption key generated by the encryption key generation unit 703. Also, the encryption processing unit 704 encrypts an encryption key using a unique to each of the install module.

The authentication unit 705 performs mutual authentication with the install modules 131, 132, and 133 and the protection control module 120.

The install module selection unit 706 selects an install module that is to perform update processing of the protection control module 120. Then, the install module selection unit 706 encrypts an encryption key used for encrypting the correction protection control module, using a key unique to the selected install module, and transmits the encrypted encryption key to the selected install module.

The control unit 707 controls the compositional elements included in the correction software distribution unit 220. Specifically, the control unit 707 controls super-encryption of correction software using a plurality of encryption keys, encryption of the plurality of encryption keys used for the super-encryption, and transmission of the encrypted correction software and the encrypted encryption keys to the install module.

Here, an encryption key and correction software are not transmitted all at once to each of the install modules 131, 132, and 133. In accordance with a timing when each of the encryption key and the correction software is necessary during update processing, the encryption key and the correction software are separately transmitted to each of the install modules 131, 132, and 133.

The certificate generation unit 708 generates an authentication certificate for an authentication public key of each of the install modules 131, 132, and 133, using a signature secret key. Also, the certificate generation unit 708 generates an update verification certificate for a new correction protection control module. The update verification certificate is used for verifying whether the protection control module has been surely updated.

The signature secret key storage unit 709 stores therein a signature secret key to be used by the certificate generation unit 708 to generate a certificate.

The correction software storage unit 710 stores therein a correction protection control module to be used for updating the protection control module 120 when attacked.

The encryption key storage unit 711 stores therein an encryption key generated by the encryption key generation unit 703 and an encryption key encrypted by the encryption processing unit 704.

9. Structure of Module Invalidation Unit 230

Figure 13:
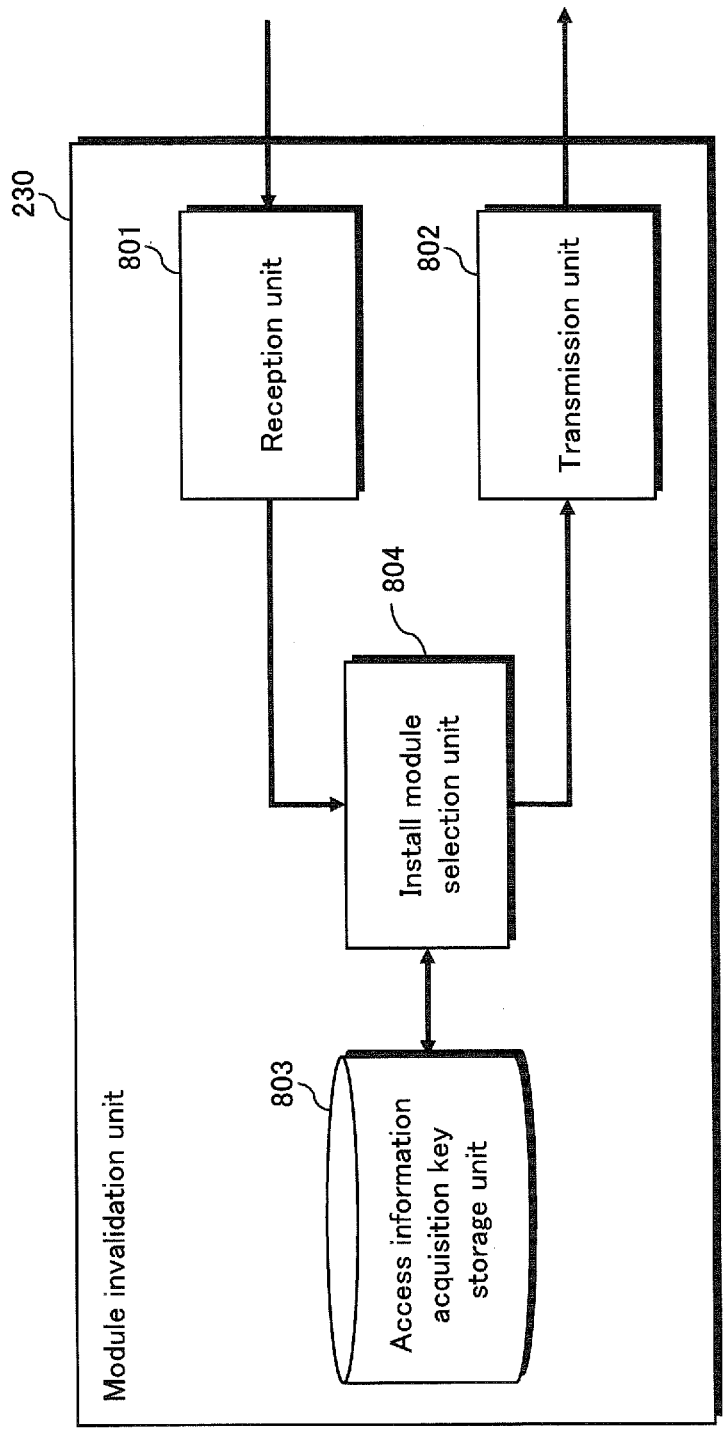
FIG. 13 shows the structure of a module invalidation unit 230 relating to the first embodiment of the present invention.

FIG. 13 shows the structure of the module invalidation unit 230 included in the update server 200. As shown in FIG. 13, the module invalidation unit 230 is composed of a reception unit 801, a transmission unit 802, an access information acquisition key storage unit 803, and an install module selection unit 804.

The reception unit 801 receives an instruction for deleting an install module that has been tampered with in an unauthorized manner from the judgment unit 210. Also, the reception unit 801 receives an acquisition request for an access information acquisition key from each of the install modules 131, 132, and 133 included in the apparatus 100.

In response to the acquisition request for the access information acquisition key, the transmission unit 802 transmits the access information acquisition key to the install module that has issued the acquisition request.

The access information acquisition key storage unit 803 stores therein an access information acquisition key for decrypting access information which is stored in the access control module 140.

The install module selection unit 804 selects an install module that is to perform invalidation processing, which is processing of deleting an install module that is an invalidation target (an install module judged to be tampered with), and instructs the selected install module to perform the invalidation processing. If receiving an acquisition request for an access information acquisition key from the selected install module (the install module that is to perform the invalidation processing), the install module selection unit 804 transmits an access information acquisition key having attached thereto an identifier of the install module that is the deletion target, to the install module that is to perform the invalidation processing.

10. Structure of Module Addition Unit 240

Figure 14:
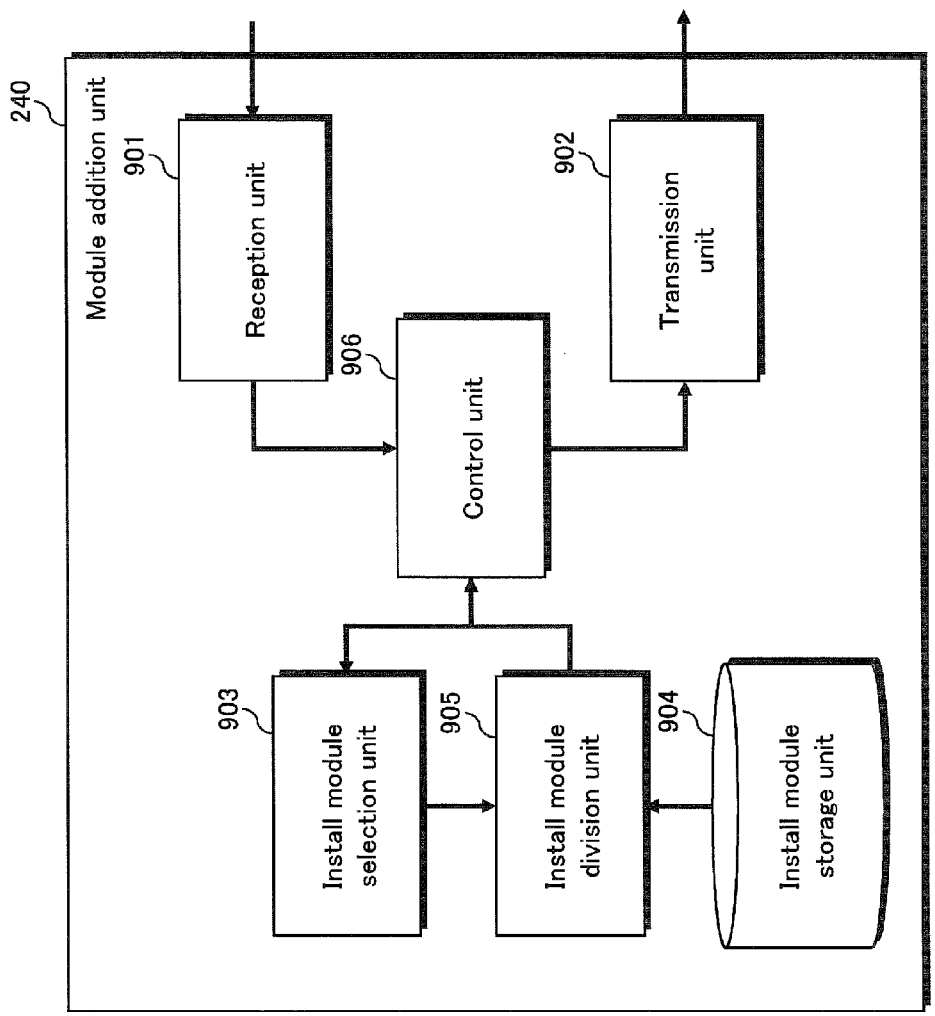
FIG. 14 shows the structure of a module addition unit 240 relating to the first embodiment of the present invention.

FIG. 14 shows the structure of the module addition unit 240 included in the update server 200. As shown in FIG. 14, the module addition unit 240 is composed of a reception unit 901, a transmission unit 902, an install module selection unit 903, an install module storage unit 904, an install module division unit 905, and a control unit 906.

The reception unit 901 receives, from the judgment unit 210, an instruction for adding an install module and a list of install modules that are included in the install module group 130 at the time of issuing the instruction.

The transmission unit 902 transmits, to the apparatus 100, an additional install module and a verification value for verifying the additional install module has been surely added. Also, the transmission unit 902 transmits a completion notification of the install module addition processing to the judgment unit 210.

The install module selection unit 903 selects an install module that is to perform install module addition processing from among the install modules included in the list received from the judgment unit 210.

The install module storage unit 904 stores therein an additional install module.

The install module division unit 905 acquires one additional install module from the install module storage unit 904, and divides the additional install module into pieces depending on the number of install modules selected by the install module selection unit 903. The install module division unit 905 transmits the divided pieces of the additional install module to the install modules selected by the install module selection unit 903, respectively.

The control unit 906 controls the install module addition processing in cooperation with the judgment unit 210 and the install modules 131, 132, and 133.

11. Structure of Monitoring Pattern Update Unit 250

Figure 15:
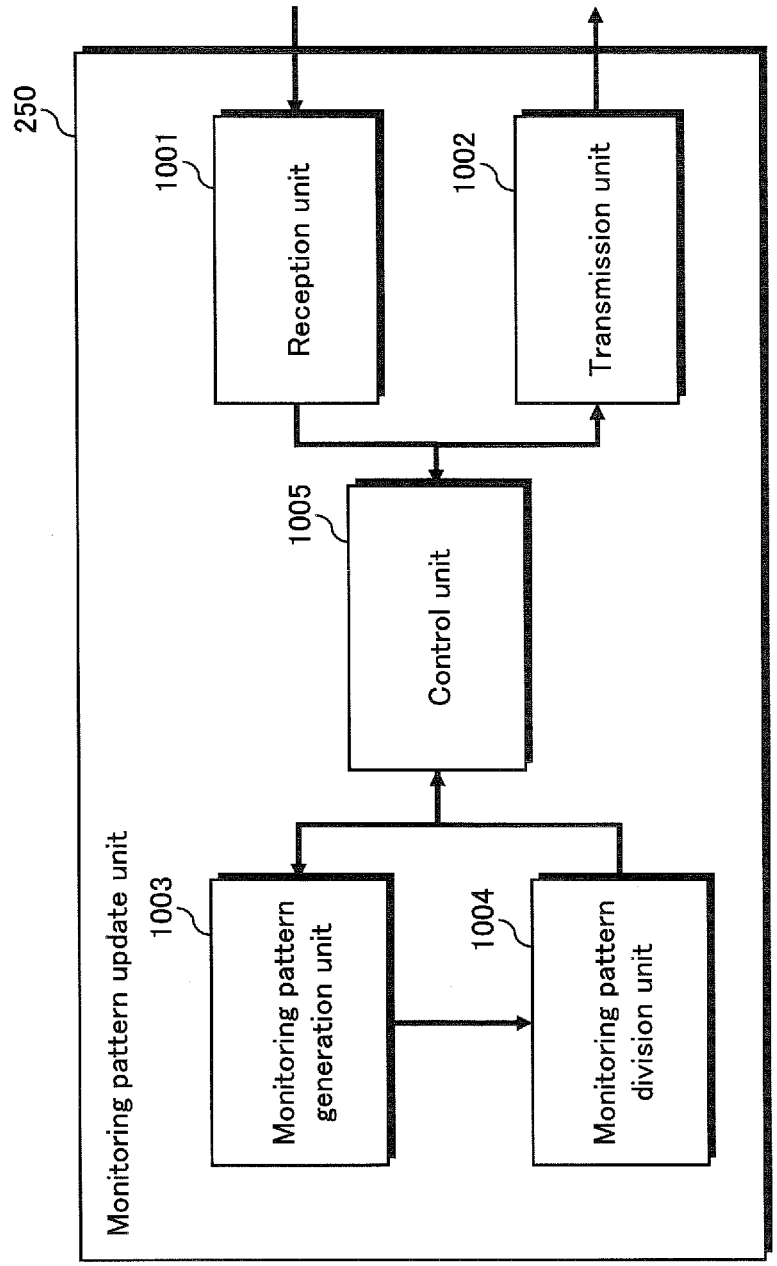
FIG. 15 shows the structure of a monitoring pattern update unit 250 relating to the first embodiment of the present invention.

FIG. 15 shows the structure of the monitoring pattern update unit 250 included in the update server 200. As shown in FIG. 15, the monitoring pattern update unit 250 is composed of a reception unit 1001, a transmission unit 1002, a monitoring pattern generation unit 1003, a monitoring pattern division unit 1004, and a control unit 1005.

The reception unit 1001 receives, from the judgment unit 210, an instruction for updating a monitoring pattern and a list of install modules that are included in the install module group 130 at the time of issuing the instruction.

The transmission unit 1002 transmits a correction monitoring pattern to the apparatus 100. Also, the transmission unit 1002 transmits a completion notification of monitoring pattern update processing to the judgment unit 210.

The monitoring pattern generation unit 1003 determines which install module is to monitor which install module based on the list of the install modules received from the judgment unit 210, and generates a monitoring pattern. An example of the monitoring pattern is a monitoring pattern in which each of the install modules monitors all other of the install modules.

The monitoring pattern division unit 1004 divides the monitoring pattern generated by the monitoring pattern generation unit 1003 into pieces respectively for the install modules. Then, the monitoring pattern division unit 1004 transmits the divided pieces of the monitoring pattern to the install modules, as correction monitoring patterns.

The control unit 1005 controls the monitoring pattern generation unit 1003 and the monitoring pattern division unit 1004 to perform monitoring pattern update processing.

12. Operations of Software Update System 10

Next, the operations of the software update system 10 are described with reference to FIG. 16.

Firstly, installation processing of the software update system 10 is described. The installation processing falls into the following nine processing.

The first processing is initial design processing in which shared information, which is generated from various types of key data necessary for updating software and data necessary after the update based on the secret sharing scheme, is embedded each of the install modules 131, 132, and 133.

The second processing is detection processing in which it is detected whether the software included in the apparatus 100 (the applications 110 and 111 and the protection control module 120) has been tampered with.

The third processing is analysis/judgment processing. In the analysis/judgment processing, if tampering is detected, it is judged which module has been tampered with, a cause of the tampering is analyzed, and it is judged on whether software including the tampered module needs to be updated. If it is judged that the software needs to be updated, correction software from which the cause of the tampering has been eliminated is generated, and each of the install modules 131, 132, and 133 is notified of that update processing is to be performed.

The fourth processing is mutual authentication processing in which each of the install modules 131, 132, and 133 and the correction software distribution unit 220 perform mutual authentication processing on one another for checking whether a party is authentic software.

The fifth processing is recovery processing in which correction software is installed on the apparatus 100, and furthermore, original data is recovered from shared information embedded in each of the install modules 131, 132, and 133.

The sixth processing is next-round preparation processing in which shared information for performing next update processing of software is generated, and the generated shared information is embedded in each of the install modules.

The seventh processing is invalidation processing in which if it is detected that any of the install modules 131, 132, and 133 and the protection control module 120 has been tampered with in the detection processing, the mutual authentication processing, or the recovery processing, the tampered module is deleted.

The eighth processing is addition processing in which if the number of install modules included in the install module group 130 is reduced as a result of performing invalidation processing, an install module is added in order to surely perform install processing in the case where the number of install modules needs to be increased, for example.

The ninth processing is monitoring pattern update processing in which in the case where the structure of the install module group 130 is changed as a result of performing invalidation processing or addition processing, a monitoring pattern is updated if necessary.

Figure 16:
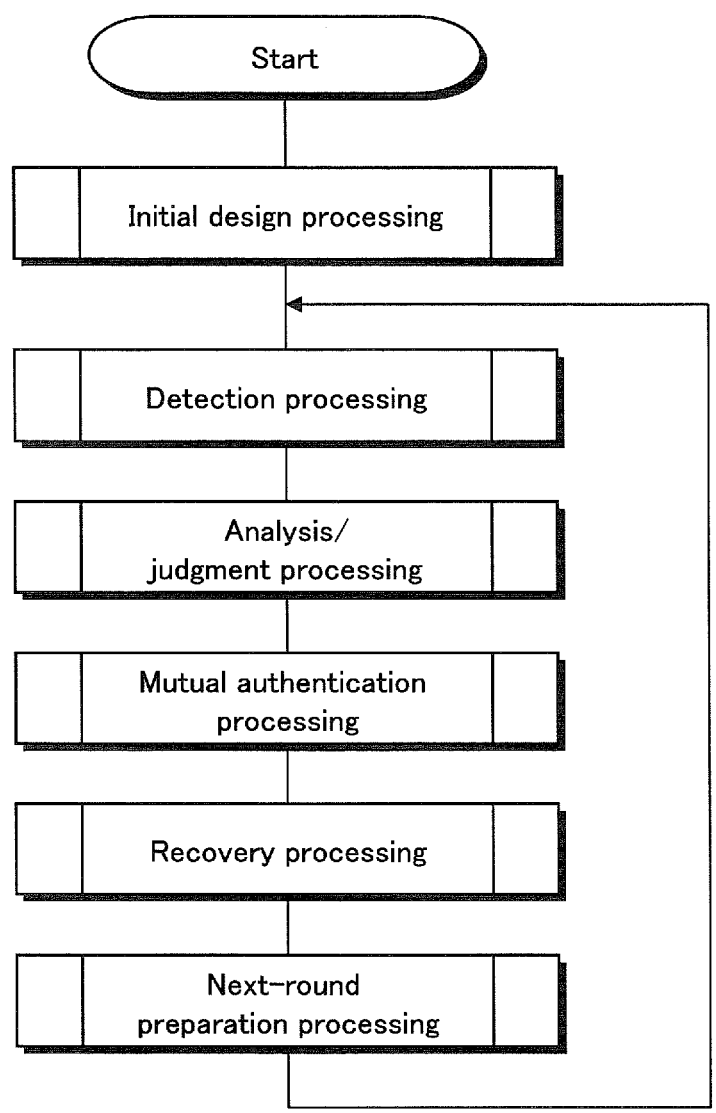
FIG. 16 is a flow chart of operations of the software update system 10 relating to the first embodiment of the present invention.

The initial design processing, the detection processing, the analysis/judgment processing, the mutual authentication processing, the recovery processing, and the next-round preparation processing among the above nine processing are performed in the order shown in FIG. 16. The invalidation processing, the addition processing, and the monitoring pattern update processing are each invoked during each of the processing shown in FIG. 16 as necessary.

FIG. 16 is a flow chart of the whole operations of the software update system 10.

When the apparatus 100 included in the software update system 10 is manufactured in the factory, the initial design processing is performed to embed shared information in each of the install modules 131, 132, and 133. Then, the apparatus 100 is shipped from the factory to be supplied to users.

When a user uses the apparatus 100, the apparatus 100 performs detection processing. Specifically, the protection control module 120 protects the applications (110 and 111)

against an attacker's attack. At the same time, the install modules 131, 132, and 133 each perform tampering detection of the protection control module 120 to check whether the protection control module 120 is attacked.

Upon receiving a notification that the protection control module has been tampered with from the install module that has performed the detection processing, the update server 200 performs analysis/judgment processing. If it is found that the protection control module 120 has been tampered with, the update server 200 performs mutual authentication processing, recovery processing, and next-round preparation processing, and then returns to detection processing.

Note that, in the software update system relating to the present invention, all the processing described above does not necessarily need to be performed. Alternatively, in the software update system relating to the present invention, it is only necessary to perform processing of performing updating in accordance with an update trigger given from outside (recovery processing).

The following describes the details of the above nine processing.

13. Operations of Initial Design Processing

Here, the initial design processing is described with reference to FIG. 17 to FIG. 19.

Figure 18:
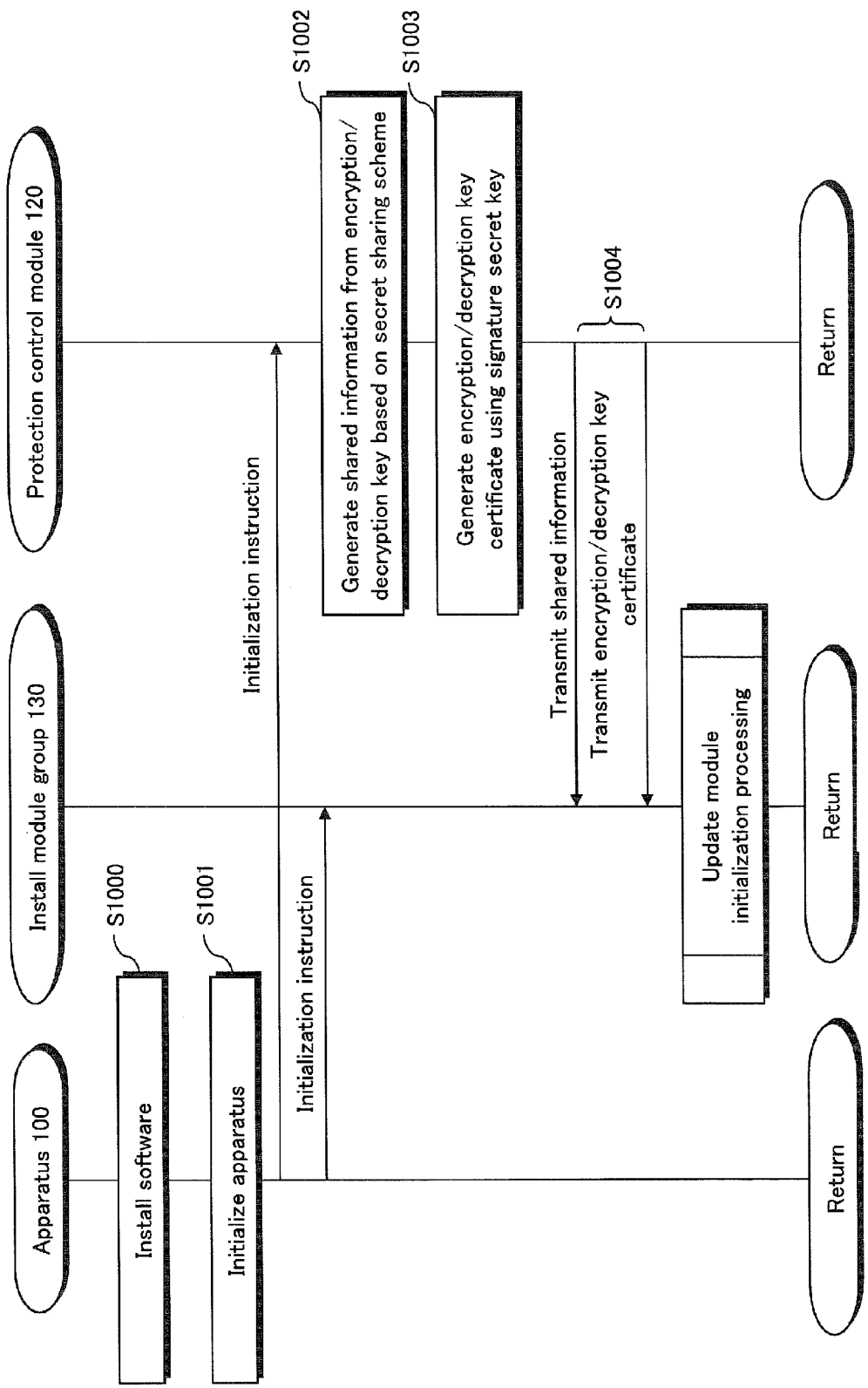
FIG. 18 is a sequence diagram of the initial design processing relating to the first embodiment of the present invention.

FIG. 18 is a sequence diagram showing the operations of the initial design processing in the software update system 10.

When the apparatus 100 is manufactured in the factory, the applications (110 and 111), the protection control module 120, the install modules (131, 132, and 133), and the like are installed on the nonvolatile memory of the apparatus 100 (S1000).

Each of these pieces of software has a tampering detection certificate attached thereto for verifying whether the software has been tampered with. This tampering detection certificate has a signature using the signature secret key stored in the correction software distribution unit 220 included in the update server 200. In S1000, in addition to the above software, software necessary for performing the operations of the apparatus 100 is installed.

Here, the following describes keys to be embedded in the apparatus 100 during the initialization processing. FIG. 17 is a pattern diagram of keys to be embedded in the apparatus 100. The description for only the install module 131 is given here, and the description for the install modules 132 and 133 is omitted.

Figure 17:
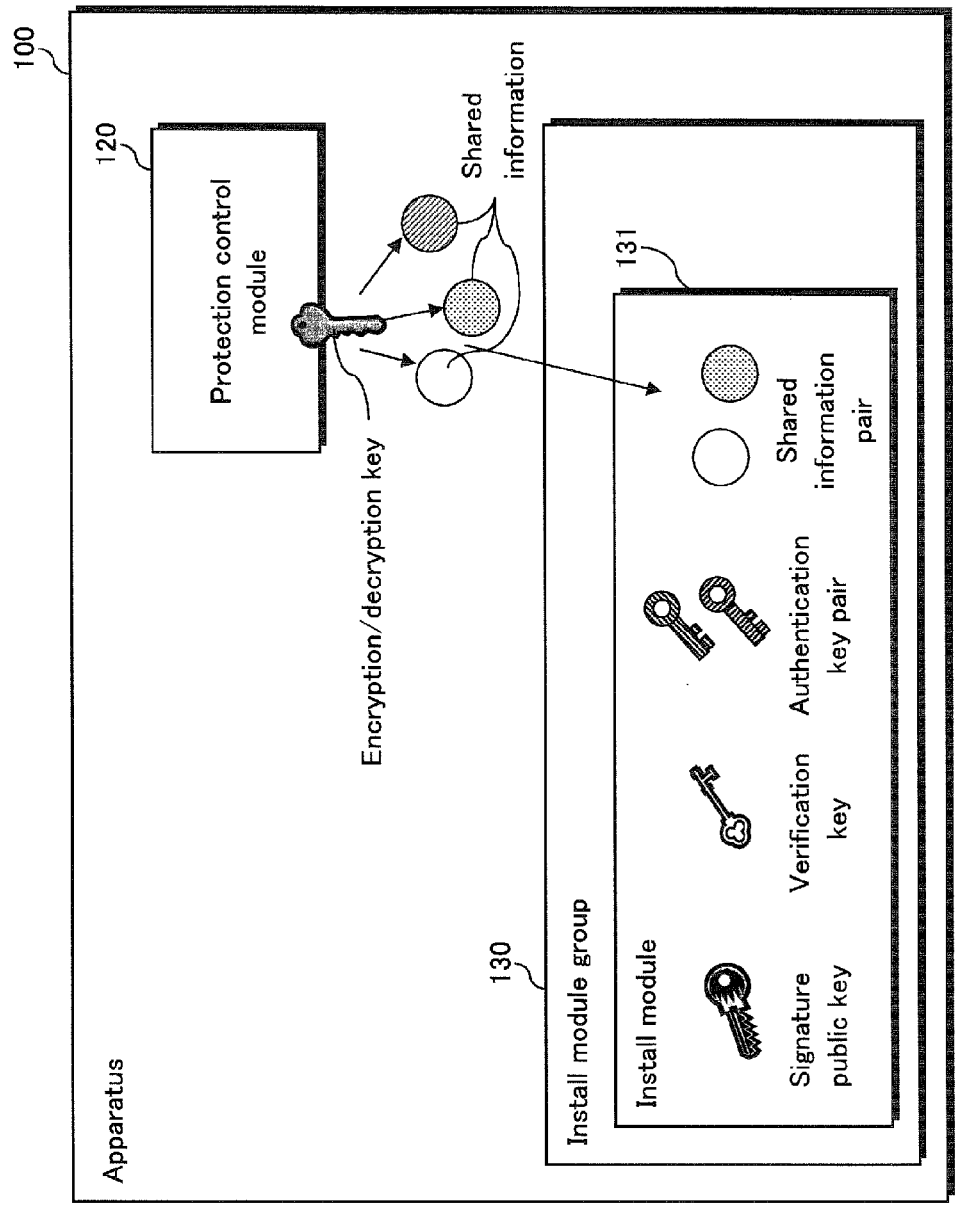
FIG. 17 shows the outline of initial design processing of the software update system 10 relating to the first embodiment of the present invention.

As shown in FIG. 17, the protection control module 120 has embedded therein an encryption/decryption key. The install modules 131, 132, and 133 each have embedded therein a signature public key, a verification key, and an authentication key pair (at this time, shared information pair has not been embedded in the install module yet). Furthermore, the install modules 131, 132, and 133 each have embedded therein an install module identifier for identifying itself, and then are installed.

The encryption/decryption key is a key for encrypting/decrypting the applications (110 and 111). The applications (110 and 111) are encrypted using the encryption/decryption key, and then stored in the nonvolatile memory. The applications (110 and 111) are decrypted by the protection control module 120 using the encryption/decryption key, and then executed. In order to execute a plurality of applications while performing context switching, data stored in the applications (110 and 111) is encrypted/decrypted using the encryption/decryption key in accordance with a timing of the context switching, thereby to prevent the data from being extracted by an analysis tool such as a debugger in execution of the applications (110 and 111).

Among the keys embedded in the install modules 131, 132, and 133, the signature public key is common among all the install modules. Each of the verification key and the authentication key pair are different for each install module.

Returning to FIG. 18, after each software is installed in S1000, the apparatus 100 is initialized by executing software for initializing the apparatus 100, software for testing whether the apparatus 100 normally operates, and so on (S1001).

In S1001, initial design processing is performed in each of the protection control module 120, the install modules 131, 132, and 133.

The protection control module 120 generates a piece of shared information from the encryption/decryption key based on the secret sharing scheme (S1002). Furthermore, the protection control module 120 generates a certificate (encryption/decryption key certificate) using the signature secret key for checking whether the encryption/decryption key has been surely recovered (S1003). The certificate is used for recovering the encryption/decryption key.

The protection control module 120 transmits the generated piece of shared information and encryption/decryption key certificate to each of the install modules 131, 132, and 133 (S1004). Here, pieces of shared information whose number is the same as the number of install modules each including the shared information storage unit 310 are generated. A different shared information pair is transmitted to each of the install modules 131, 132, and 133 for storage. Also, the protection control module 120 transmits arrangement information of the pieces of shared information that shows which piece has been transmitted to which install module. The same encryption/decryption key certificate and the same arrangement information are transmitted to all of the install modules 131, 132, and 133.

Regarding the method of generating shared information from an encryption/decryption key based on the secret sharing scheme and the method of transmitting shared information to an install module, the detailed descriptions are found in pages 47 to 49 of the Patent Document 2. By corresponding the secret key d, the authentication device, and the shared information storage apparatus relating to the Patent Document 2 respectively to the encryption/decryption key, the protection control module 120, and the install modules 131, 132, and 133 relating to the first embodiment, it is possible to use the same methods used in the Patent Document 2.

The install module group 130 receives the shared information, the arrangement information, and the encryption/decryption key certificate from the protection control module 120, and then proceeds to the install module initialization processing.

13.1. Install Module Initialization Processing

Figure 19:
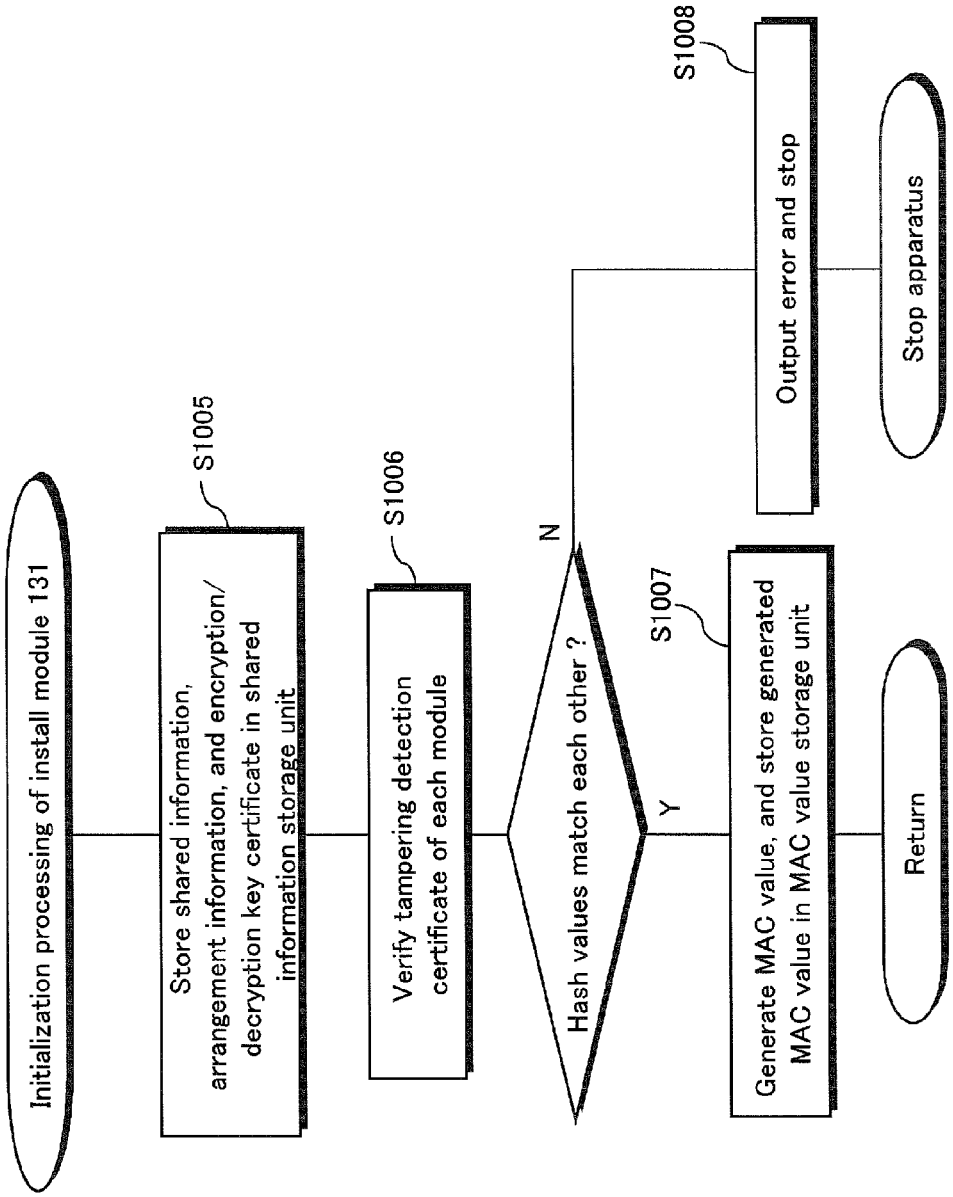
FIG. 19 is a flow chart of the initial design processing (install module initialization processing) relating to the first embodiment of the present invention.

FIG. 19 is a flow chart showing the install module initialization processing. In FIG. 19, only the operations of the install module 131 are shown as a representative of the install modules. The operations of other install modules are basically the same as the operations of the install module 131.

The install module 131 receives shared information pair, arrangement information, and an encryption/decryption key certificate from the protection control module 120, and stores the received pieces of information in the shared information storage unit 310 (S1005).

Furthermore, the install module 131 verifies each of tampering detection certificates of other install module 132 and 133 that are tampering detection targets and the protection control module 120 (S1006). This verification is performed by generating a hash value by each of the modules and comparing the generated hash value with a hash value written in the corresponding tampering detection certificate.

The install module 131 judges whether the generated hash value matches the hash value written in the corresponding tampering detection certificate. If the generated hash value matches the written hash value, the install module 131 generates MAC values respectively for the other install modules and the protection control module 120, and stores the generated MAC values as a MAC value table (S1007).

If at least any one of the hash values does not match the hash value written in the corresponding tampering detection certificate, the install module 131 outputs an error and stop the processing (S1008).

14. Operations of Detection Processing

After the initialization processing, the apparatus 100 is shipped from the factory to be supplied to users for use.

When a user uses the apparatus 100 to use the applications (110 and 111), the protection control module 120 of the apparatus 100 controls the functions such as the decryption loading function, the tampering detection function, and the analysis tool detection function, thereby to protect the applications (110 and 111) against an attacker's attack.

Here, the operations of the detection processing are described with reference to a sequence diagram shown in FIG. 20. The install modules 131, 132, and 133 each perform tampering detection of the protection control module 120 (S2000).

The tampering detection is performed by calculating a MAC value of the protection control module 120 using a verification key and comparing the calculated MAC value with a MAC value of the protection control module 120 stored in the MAC value table. If the calculated MAC value matches the stored MAC value, it is judged that the protection control module 120 has not been tampered with. If the calculated MAC value does not match the stored MAC value, it is judged that the protection control module 120 has been tampered with.

Figure 20:
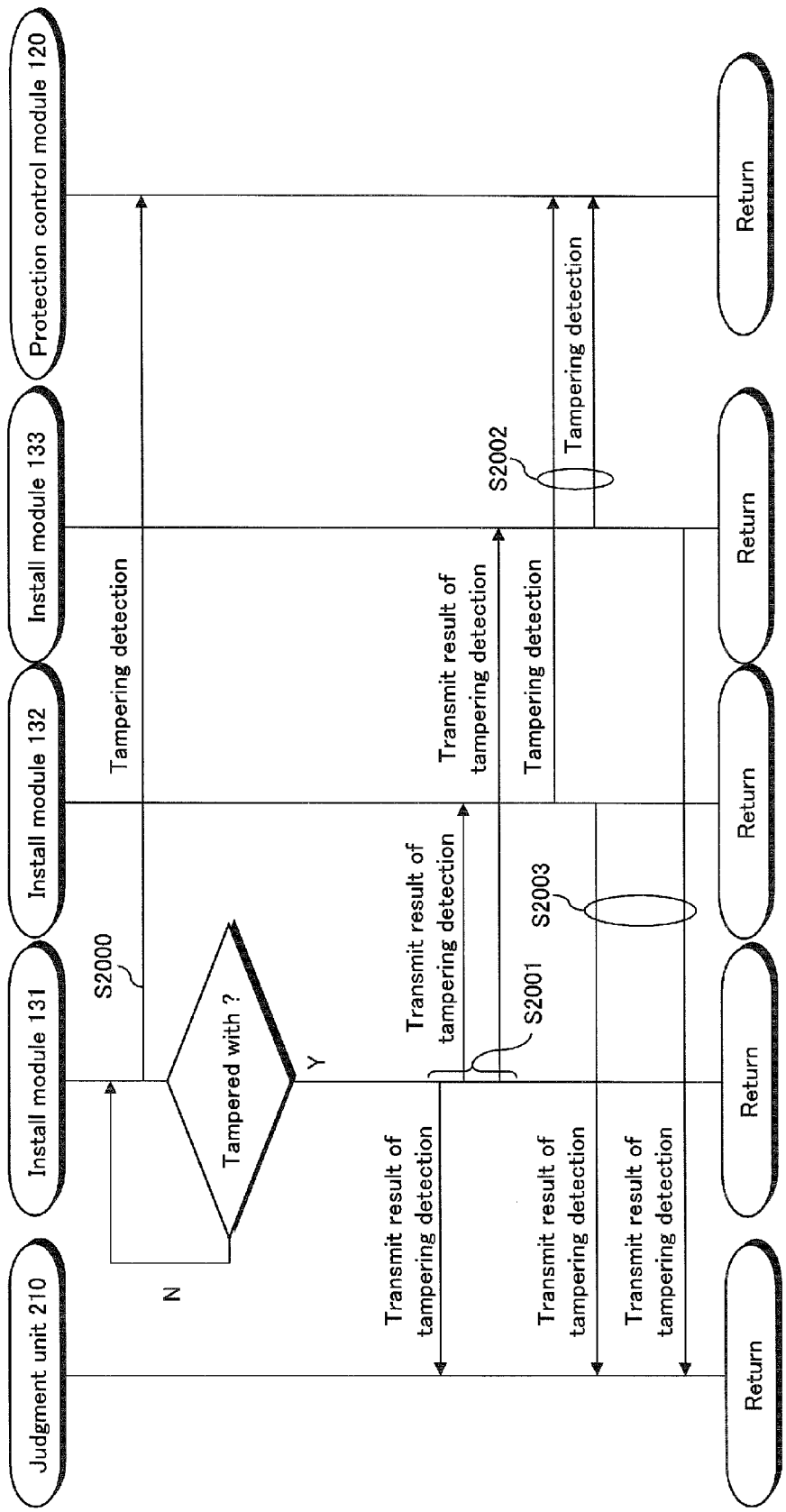
FIG. 20 is a sequence diagram of detection processing relating to the first embodiment of the present invention.

Note that the description in FIG. 20 is simplified in which as if only the install module 131 checks whether the protection control module has been tampered with. The install modules 132 and 133 of course each perform the same processing.

With respect to the subsequent processing, FIG. 13 mainly shows the case where the install module 131 detects that the protection control module has been tampered with. In the case where the install modules 132 and 133 each detect that the protection control module has been tampered with, the same processing is basically performed.

The install module 131 judges whether the protection control module 120 has been tampered with, that is, whether the calculated MAC value matches the stored MAC value. If judging that the protection control module 120 has been tampered with, the install module 131 transmits a tampering detection notification to the judgment unit 210 included in the update server 200 and other install module (S2001).

If judging that the protection control module 120 has not been tampered with, the install module 131 transmits no notification to the judgment unit 210 and other install module, and the flow returns to the tampering detection processing.

Upon receiving the tampering detection notification of the protection control module 120 from the install module 131, the install modules 132 and 133 each perform tampering check of the protection control module 120 using a verification key and a MAC value (S2002), and transmit a result of the tampering check to the judgment unit 210 (S2003).

The judgment unit 210 receives the results of the tampering check from the install modules 132 and 133.

15. Operations of Analysis/Judgment Processing

Figure 21:
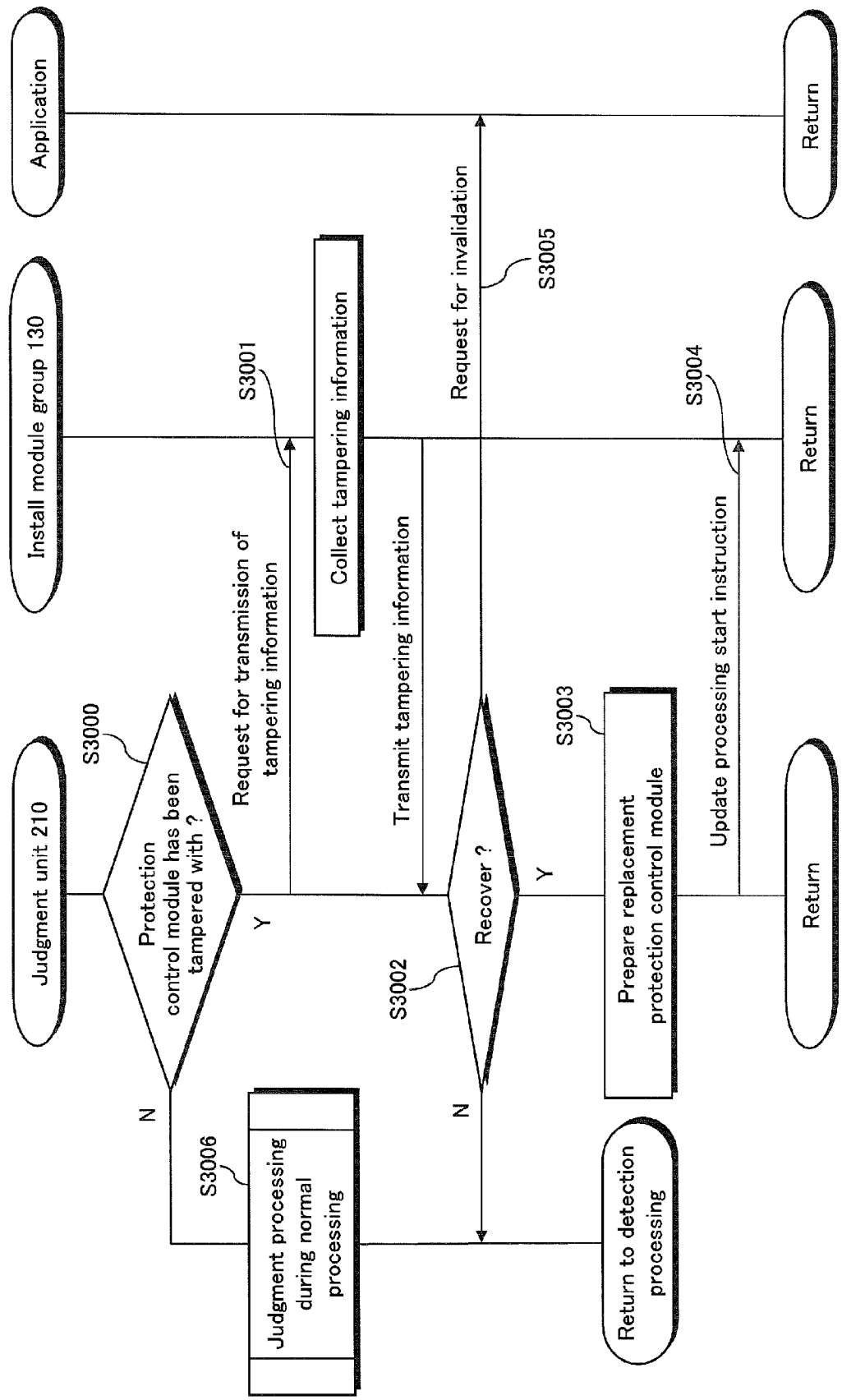
FIG. 21 is a sequence diagram of analysis/judgment processing relating to the first embodiment of the present invention.

The operations of the analysis/judgment processing are described with reference to FIG. 21. FIG. 21 is a sequence diagram showing the operations of the analysis/judgment processing. In FIG. 21, the processing performed separately by the install modules 131, 132, and 133 are collectively described as processing performed by the install module group 130.

In the detection processing, if receiving the tampering detection notification from each of the install modules (S2001 or S2003), the judgment unit 210 judges whether the protection control module 120 is authentic (whether tampered with) based on the results of the tampering check received from the install module (S3000).

The judgment is performed in the following manner. For example, if a predetermined number of install modules detect that the protection control module 120 has been tampered with, the judgment unit 210 judges that the protection control module 120 is unauthentic (tampered with). Conversely, if no less than the predetermined number of install modules detect that the protection control module 120 has been tampered with, the judgment unit 210 judges that the protection control module 120 is authentic (not tampered with). The predetermined number may be half or more of the install modules included in the install module group 130.

If judging that the protection control module 120 is unauthentic (tampered with), the judgment unit 210 requests each of the install modules to transmit tampering information indicating which part of the protection control module 120 has been tampered with, to the judgment unit 210 (S3001). This is in order to judge whether it is necessary to recover the protection control module 120. The judgment unit 210 judges whether it is necessary to recover the protection control module 120 based on the tampering information (S3002).

In S3002, the judgment on "whether it is necessary to recover" may be replaced with judgment on "whether it is necessary to revoke".

As a result of the judgment in S3002, if judging that is necessary to recover the protection control module 120, the judgment unit 210 prepares a correction protection control module 120 (S3003), and instructs the install module to start update processing (S3004). Also, if judging that is necessary to revoke the protection control module 120, the judgment unit 210 requests a server that supplies services to the applications (110 and 111) to revoke the apparatus 100 (S3005).

If judging that the protection control module 120 is authentic (not tampered with), the flow proceeds to judgment processing during normal processing in order to judge whether the install module group 130 needs to be updated (S3006).

15.1. Judgment Processing during Normal Processing

Figure 22:
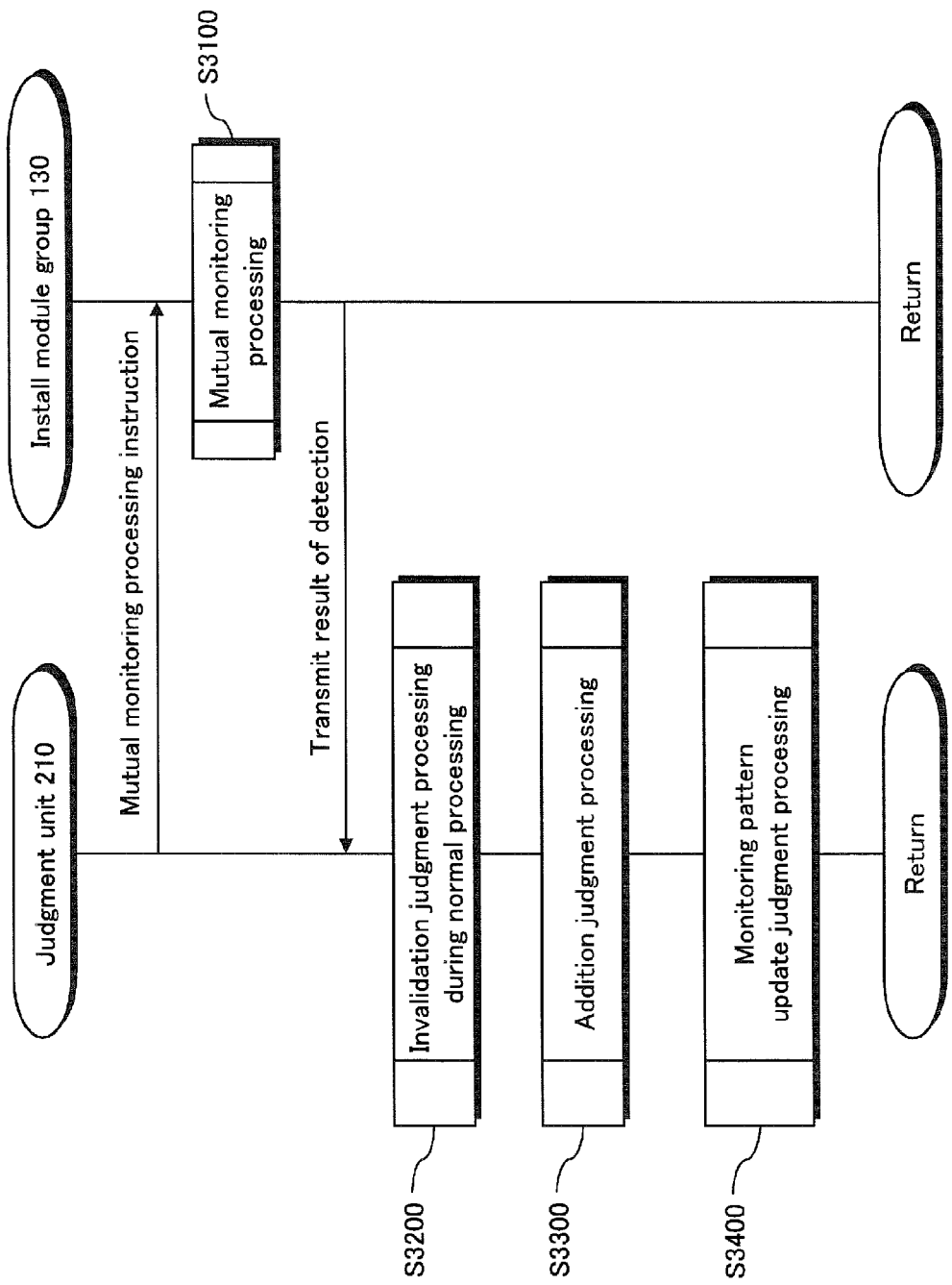
FIG. 22 is a sequence diagram of analysis/judgment processing (judgment processing during normal processing) relating to the first embodiment of the present invention.

FIG. 22 is a sequence diagram of judgment processing during normal processing (S3006) of the analysis/judgment processing.

The judgment unit 210 included in the update server 200 instructs the install module group 130 to perform mutual monitoring processing, and the install module group 130 performs the mutual monitoring processing (S3100). The install module group 130 transmits a result of the mutual monitoring processing to the judgment unit 210.

Upon receiving the result of the mutual monitoring processing, the judgment unit 210 performs invalidation judgment processing during normal processing (S3200), addition judgment processing (S3300), and monitoring pattern update judgment processing (S3400).

15.2. Mutual Monitoring Processing

Figure 23:
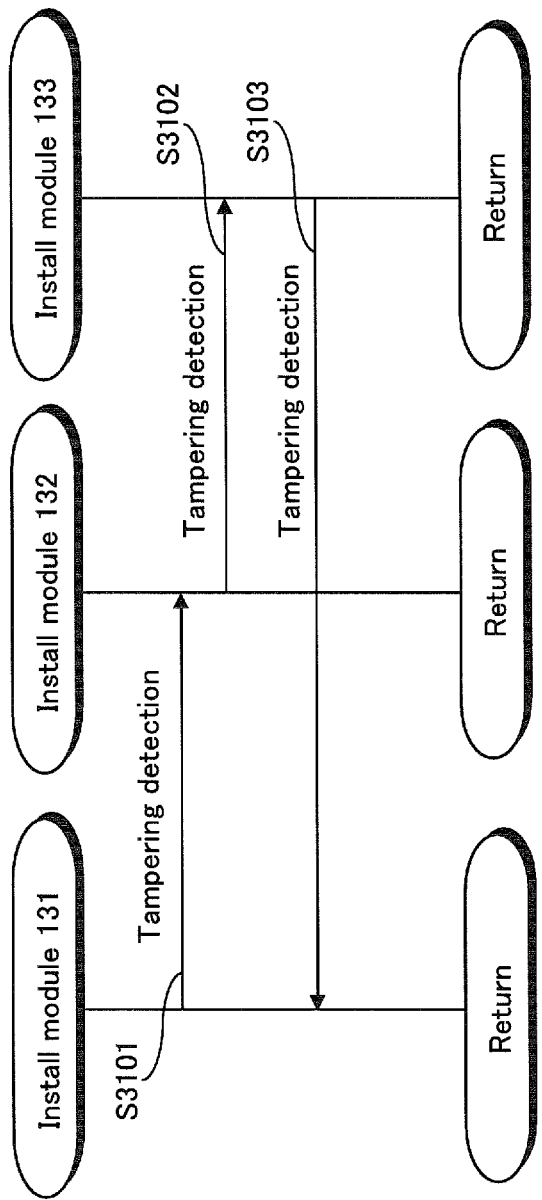
FIG. 23 is a sequence diagram of analysis/judgment processing (mutual monitoring processing) relating to the first embodiment of the present invention.

FIG. 23 is a detailed sequence diagram of the mutual monitoring processing (S3100).

The install modules 131, 132, and 133 included in the install module group 130 each perform tampering detection processing on at least another one of the install modules included in the install module group 130. When other install module has been tampered with by an attacker, the install modules 131, 132, and 133 each detect the tampering.

Specifically, the install module 131 performs tampering detection on the install module 132 (S3101), the install module 132 performs tampering detection on the install module 133 (S3102), and the install module 133 performs tampering detection on the install module 131 (S3103).

The tampering detection is performed by calculating a MAC value for each of the install modules using a verification key, and comparing the calculated MAC value with a MAC value of the install module stored in the MAC value table. Each of the install modules transmits a result of the tampering detection to the judgment unit 210 and other install module.

After tampering detection processing on each of the install modules completes, the flow returns to the judgment processing during normal processing.

15.3. Invalidation Judgment Processing during Normal Processing

Figure 24:
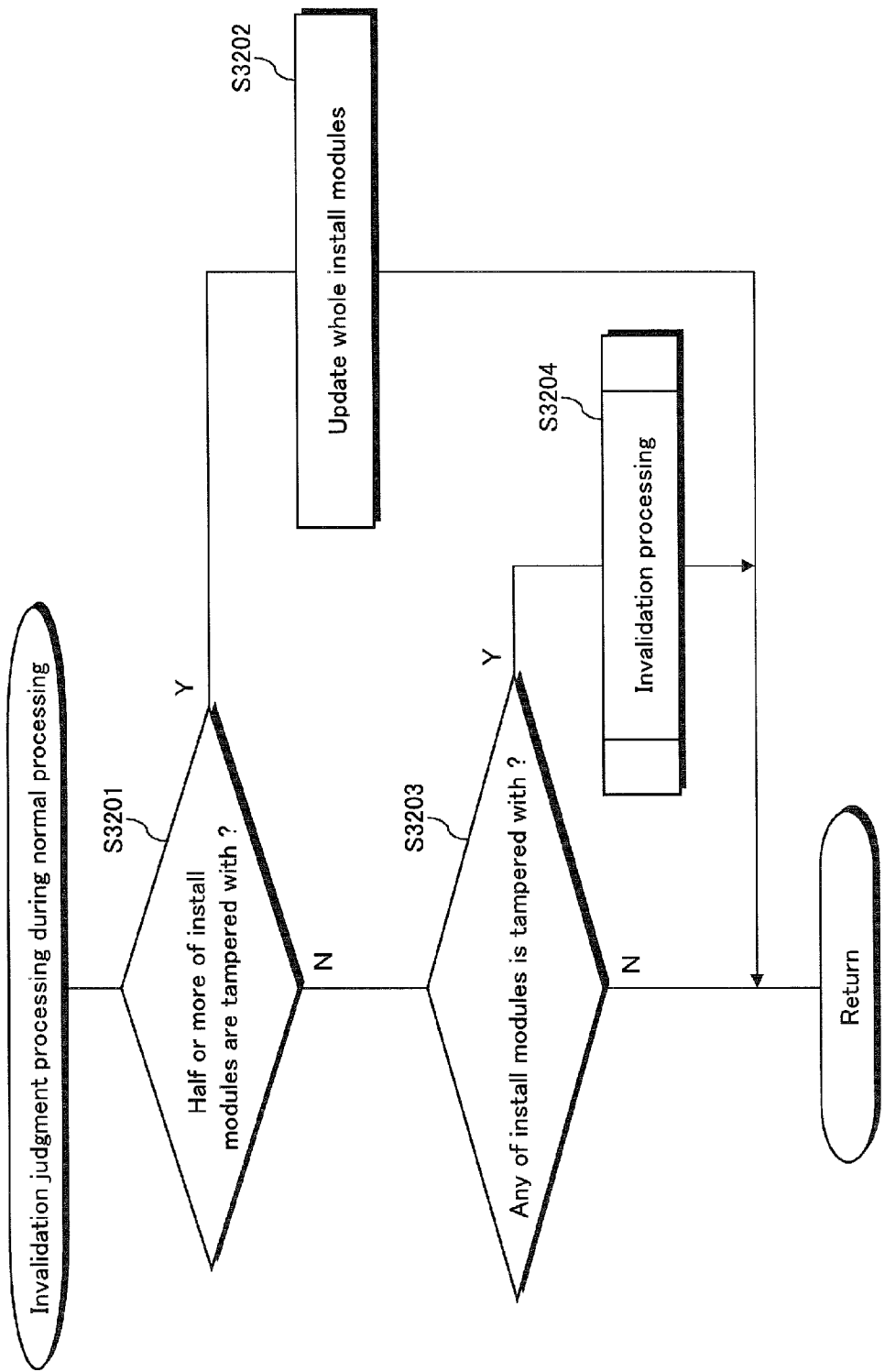
FIG. 24 is a flow chart of analysis/judgment processing (invalidation judgment processing during normal processing) relating to the first embodiment of the present invention.

FIG. 24 shows a detailed flow chart of the invalidation judgment processing during normal processing (S3200).

The following describes the invalidation judgment processing during normal processing with reference to FIG. 24.

If the number of install modules judged to be unauthentic by the unauthentic module specification unit 604 of the judgment unit 210 is half or more of the install modules included in the install module group 130 (S3201), the instruction generation unit 603 of the judgment unit 210 generates an instruction for updating the whole install module group 130, and updates the whole install module group 130 (S3202).

Updating of the whole install module group 130 can prevent authorized operations of the install modules from being hindered.

If the number of install modules judged to be unauthentic by the unauthentic module specification unit 604 of the judgment unit 210 is less than half of the install modules included in the install module group 130 (S3201), the unauthentic module specification unit 604 judges which install module among install modules included in the install module group 130 is tampered with (S3203), and performs invalidation processing on the install module judged to be tampered with (S3204). The invalidation processing is described in detail later.

In the invalidation judgment processing during normal processing, it is checked that the protection control module 120 has not been tampered with, and then, if an install module is tampered with, invalidation processing is performed on the tampered with install module. Accordingly, it is possible to prevent the applications (110 and 111) from being attacked via an unauthorized protection control module during the invalidation processing of the install module.

If judging that no install module is tampered with, or when invalidation processing completes, the flow returns to judgment processing during normal processing.

15.4. Addition Judgment Processing

Figure 26:
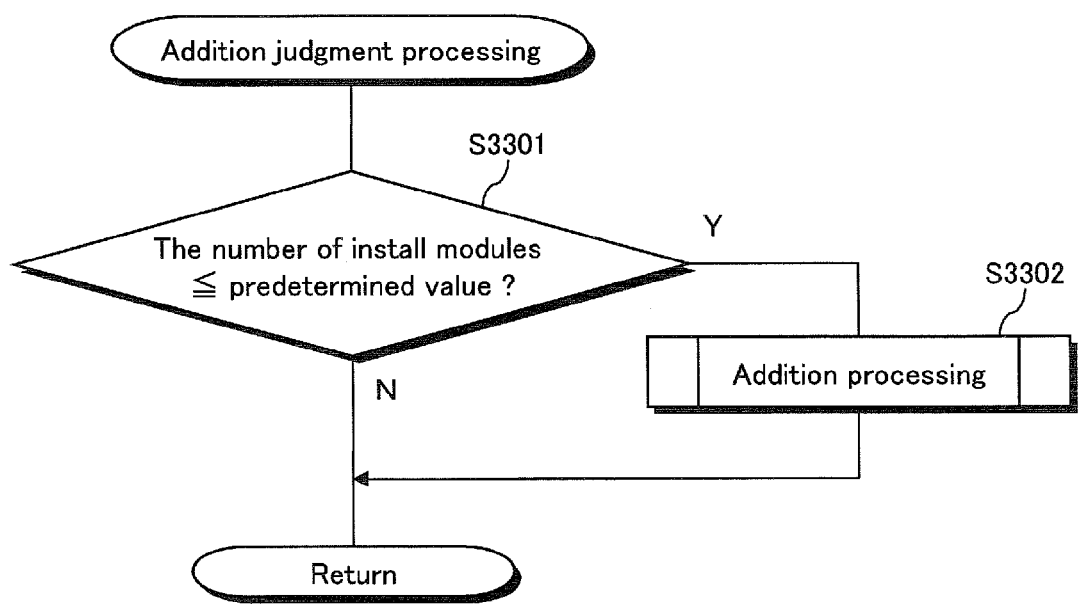
FIG. 26 is a flow chart of analysis/judgment processing (addition judgment processing) relating to the first embodiment of the present invention.

The following describes addition judgment processing. FIG. 26 is a detailed flow chart of addition judgment processing (S3300) of the judgment processing during normal processing.

The judgment unit 210 judges whether the number of install modules included in the install module group 130 is no more than a predetermined value (S3301). If judging that the number of install modules is no more than the predetermined value, the judgment unit 210 performs addition processing (S3302). The addition processing is described in detail later. If the judgment unit 210 judges that the number of install modules is greater than the predetermined value, or when the addition processing completes, the flow returns to judgment processing during normal processing.

By performing addition processing of adding an install module, it is possible to keep constant the number of install modules that perform mutual monitoring processing. As a result, it is possible to stably verify whether each of the install modules has been tampered with, within the install module group 130.

Also, after it is checked that the protection control module 120 has not been tampered with, addition processing is performed. This can prevent the applications (110 and 111) from being attacked via an unauthorized protection control module during addition processing of an install module.

Note that even if the number of install modules is greater than the predetermined value, addition processing may be performed in the case where the judgment unit 210 judges that addition of an install module is necessary.

Specifically, even if the number of install modules is greater than the predetermined value, in the case where several install modules sequentially become tampered with in a short period, the number of install modules might immediately become no more than the predetermined value. In such a case, in order to improve the security of the whole install modules, an install module may be added even if the number of install modules is greater than the predetermined value.

Here, the "predetermined value" is a value determined in the system design processing, and may be, for example, "over half of the number of install modules at the time of the system design processing" or a specific numerical value such as "4".

Also, instead of processing of adding a new install module to the install module group, the install module group itself may be updated. For example, the following processing may be performed. If the number of install modules is greater than the predetermined value, an install module is added to the install module group. If the number of install modules is no more than the predetermined value, the install module group itself is updated. By entirely updating the install module group, it is possible to prevent interference of authorized operations of each of the install modules.

15.5. Monitoring Pattern Update Judgment Processing

Figure 28:
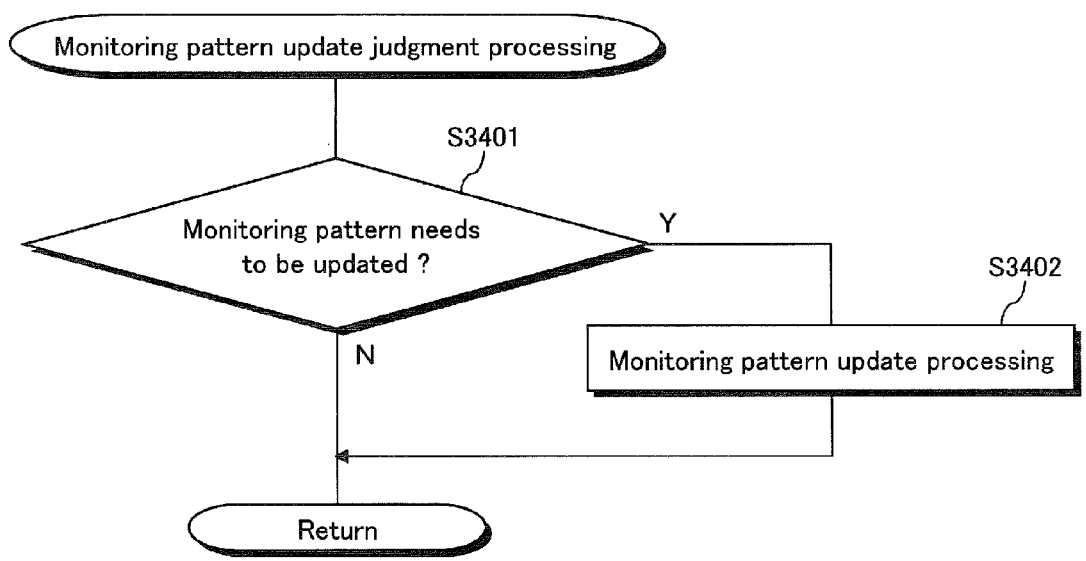
FIG. 28 is a flow chart of analysis/judgment processing (monitoring pattern update judgment processing) relating to the first embodiment of the present invention.

Next, monitoring pattern update judgment processing is described with reference to FIG. 28. FIG. 28 is a detailed flow chart of monitoring pattern update judgment processing (S3400) of judgment processing during normal processing.

When the structure of the install module group 130 is changed due to invalidation processing or addition processing, the judgment unit 210 judges whether a monitoring pattern needs to be updated (S3401). If judging that the monitoring pattern needs to be updated, the judgment unit 210 instructs the monitoring pattern update unit 250 to update the monitoring pattern. The monitoring pattern update unit 250 performs monitoring pattern update processing (S3402).

If judging that the monitoring pattern does not need to be updated, or when the monitoring pattern update processing completes, the flow returns to the judgment processing during normal processing.

In the monitoring pattern update processing (S3402), the current monitoring pattern is updated to a monitoring pattern such that each of the install modules is monitored by at least another one of the install modules. The following gives a specific description.

There is a possibility that if an install module A is invalidated while monitoring an install module B, the install module B might be monitored by no install module. Accordingly, a new monitoring pattern is generated such that the install module B is monitored by at least another one of the install modules, and a monitoring pattern of each of the install modules except the install module A is updated.

Also, according to a conventional monitoring pattern, in the case where an install module C is newly added to the install module group, the install module C is monitored by no install module. Accordingly, a new monitoring pattern is generated for the whole install module group including the install module C, and monitoring patterns of all of the install modules including the install module C are updated.

As a result, even after an install module is invalidated, or even after a new install module is added, it is possible to keep mutual monitoring, and prevent authorized operations of each of the install modules from being interfered.

16. Operations of Mutual Authentication Processing

Figure 29:
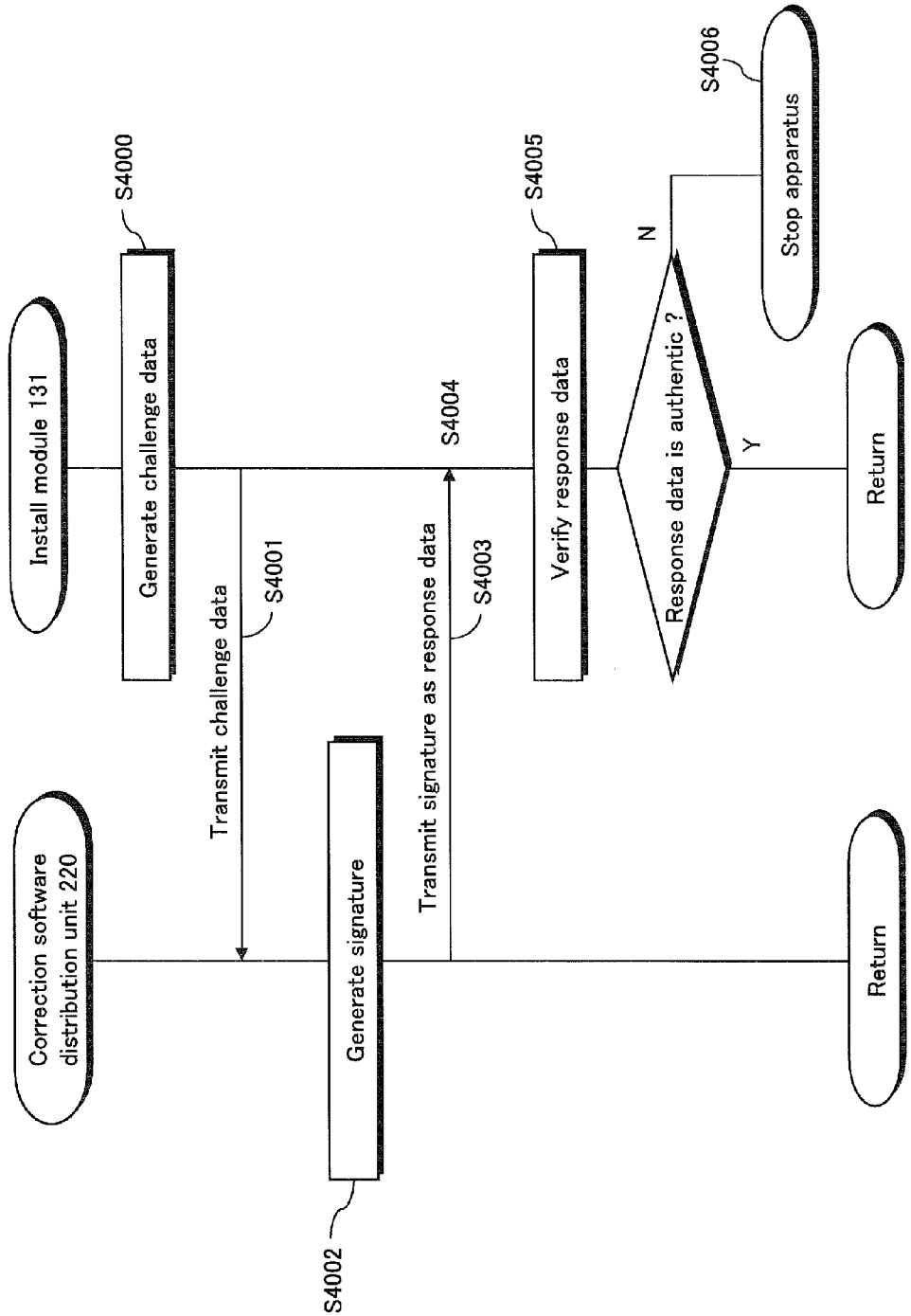
FIG. 29 shows is a sequence diagram of mutual authentication processing relating to the first embodiment of the present invention.
Figure 30:
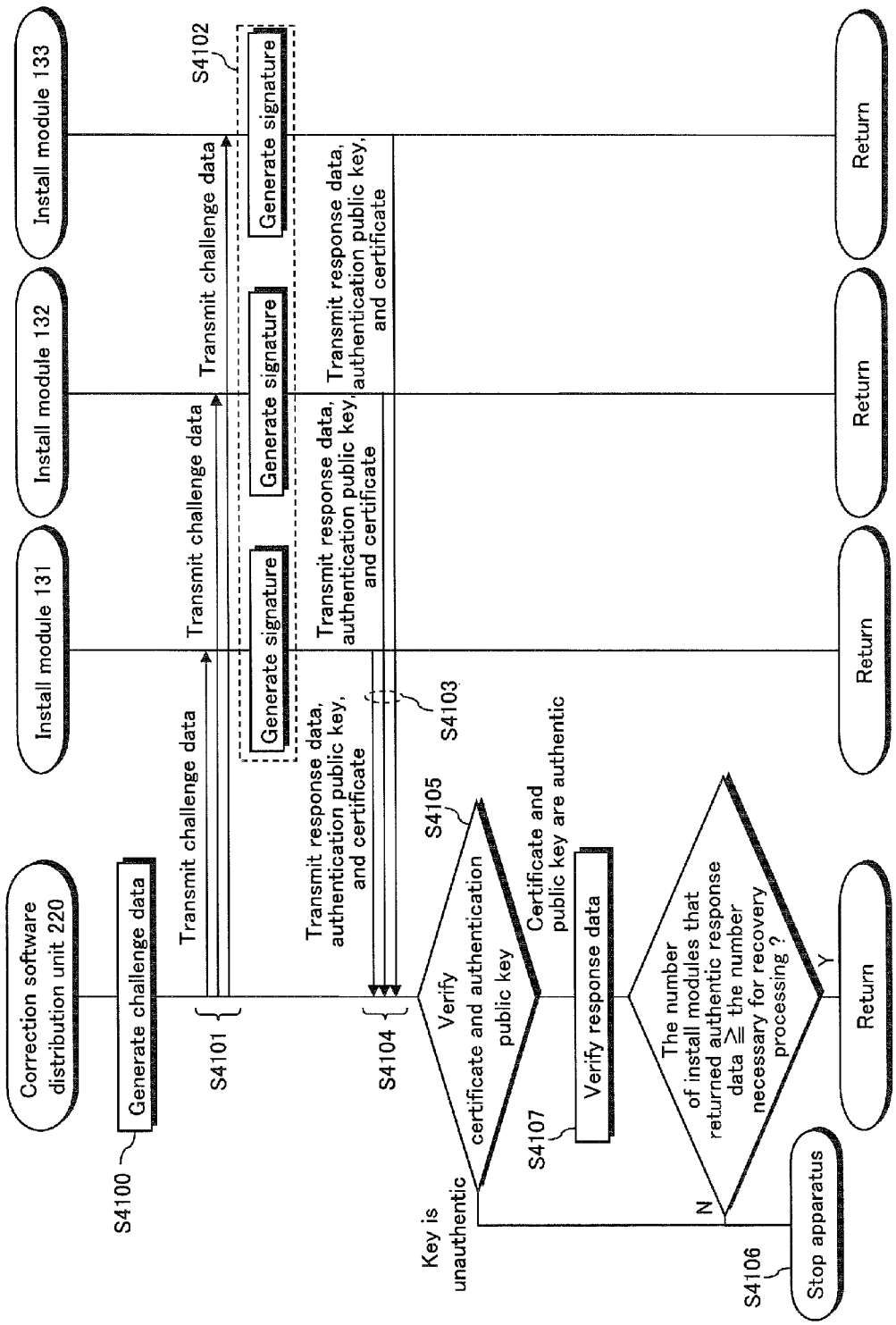
FIG. 30 is a sequence diagram of the mutual authentication processing relating to the first embodiment of the present invention.

The following describes the operations of mutual authentication processing performed by the software update system 10, with reference to FIG. 29 and FIG. 30.

If judging that the protection control module 120 needs to be recovered in analysis/judgment processing, the judgment unit 210 of the update server 200 instructs the correction software distribution unit 220 to recover the protection control module 120.

The correction software distribution unit 220 instructs each of the install modules 131, 132, and 133 to start update processing, and then performs mutual authentication processing with each of the install modules. This can prevent connection between the apparatus 100 and an unauthorized server and connection between the update server 200 and an unauthorized apparatus. Note that, in the mutual authentication processing, the update server 200 uses a signature secret key and a signature public key, and each of the install modules uses an authentication key pair (authentication secret key and authentication public key).

FIG. 29 is a sequence diagram in the case where the install module 131 performs authentication processing on the correction software distribution unit 220. Note that each of the install modules 132 and 133 operates in the same way as shown in FIG. 29, and performs authentication processing on the correction software distribution unit 220.

The install module 131 generates a random number using a random number generator (S4000), and transmits the generated random number as challenge data to the correction software distribution unit 220 (S4001). At this time, an install module identifier for identifying the install module 131 is transmitted together with the challenge data.

The correction software distribution unit 220 generates signature data for the received challenge data using a signature secret key (S4002), and transmits back the generated signature data as response data to the install module 131 (S4003).

Upon receiving the response data from the correction software distribution module 220 (S4004), the install module 131 verifies whether the received response data is the signature data for the challenge data, using a signature public key (S4005).

As a result of the verification, if the response data is signature data for the challenge data, that is, if the correction software distribution module 220 is an authentic module, the install module 131 continues to perform the processing. If the response data is not signature data for the challenge data, that is, if the correction software distribution module 220 is an unauthentic module, the install module 131 outputs an error, and stops the processing (S4006).

Then, the correction software distribution module 220 performs authentication processing on each of the install modules 131, 132, and 133.

FIG. 30 is a sequence diagram in the case where the correction software distribution unit 220 performs authentication processing on each of the install modules.

The correction software distribution module 220 generates, using a random number generator, a random number different for each of the install modules that have transmitted challenge data to the correction software distribution module 220 (S4100), and transmits the generated random number as challenge data to each of the install modules (S4101).

Each of the install modules generates signature data for the received challenged data using an authentication secret key (S4102), and transmits back the generated signature data as response data to the correction software distribution module 220 (S4103).

Here, the authentication public key and the authentication key certificate are transmitted together with the response data to the correction software distribution module 220.

The correction software distribution module 210 receives the response data, the authentication public key, and the authentication key certificate from each of the install modules (S4104). The correction software distribution module 220 verifies whether the received authentication key certificate is a certificate issued by the correction software distribution module 220 itself, and furthermore verifies whether the received authentication public key is authentic using the issued authentication key certificate (S4105).

If the received authentication key certificate and authentication public key are unauthentic, the correction software distribution module 220 stops the processing (S4106).

If the received authentication key certificate and authentication public key are authentic, the correction software distribution module 220 verifies whether the received response data is signature data for the challenged data, using the received authentication public key (S4107).

Next, the correction software distribution unit 220 judges whether the number of install modules that have transmitted back authentic response data (the number of authentic install modules) is no less than the number of install modules necessary for performing recovery processing, which has been determined beforehand. If judging that the number of authentic install modules is less than the number necessary for recovery processing, the correction software distribution unit 220 cannot perform recovery processing and accordingly stops the processing (S4106). If judging that the number of authentic install modules is no less than the number necessary for recovery processing, the correction software distribution unit 220 ends the mutual authentication processing and proceeds to recovery processing.

In the mutual authentication processing, the correction software distribution module 210 creates an authentication list composed of install module identifiers respectively identifying all of install modules that are verified as being authentic. The subsequent recovery processing is performed using only an install module whose identifier is included in the authentication list.

17. Operations of Recovery Processing

Here, the operations of the recovery processing performed in the software update system 10 are described, with reference to FIG. 31 to FIG. 38.

In the mutual authentication processing, if mutual authentication succeeds, recovery processing is performed in which the protection control module 120 that has been tampered with is updated to a new protection control module.

Figure 31:
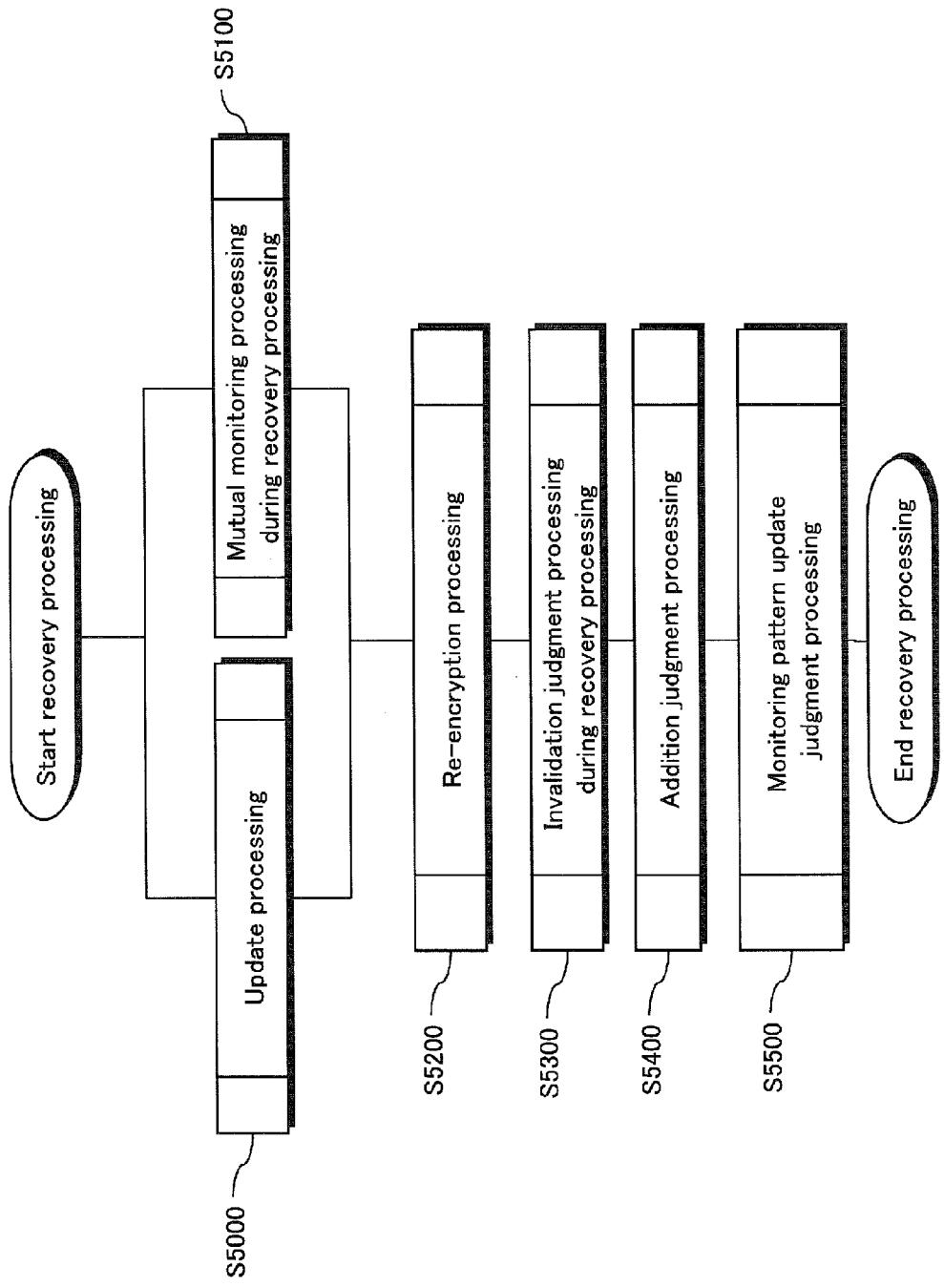
FIG. 31 is a flow chart of recovery processing relating to the first embodiment of the present invention.
Figure 32:
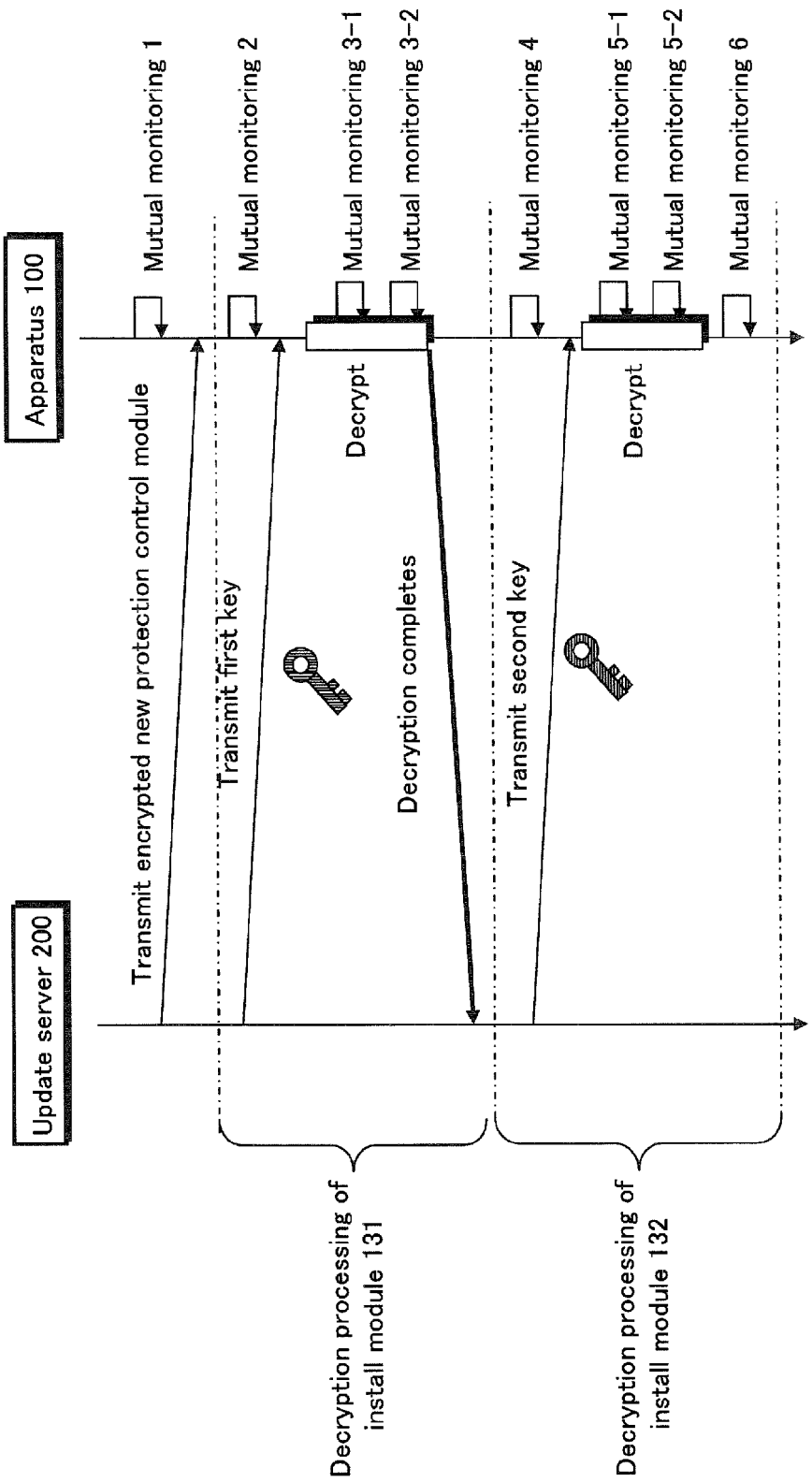
FIG. 32 is a sequence diagram of the recovery processing relating to the first embodiment of the present invention.

Firstly, the outline of the recovery processing is described with reference to FIG. 31. FIG. 31 is a flow chart of the whole flow of the recovery processing. As shown in FIG. 31, the recovery processing falls into the following six processing.

The first processing is update processing (S5000) in which the protection control module 120 that has been tampered with is updated using a new protection control module.

The second processing is mutual monitoring processing during recovery processing (S5100) in which the install modules 131, 132, and 133 perform mutual tampering detection processing.

The third processing is re-encryption processing (S5200) in which encrypted applications (110 and 111) are re-encrypted.

The fourth processing is invalidation judgment processing during recovery processing (S5300) in which when any of the install modules included in the install module group 130 is tampered with, it is judged on whether invalidation processing needs to be performed.

The fifth processing is addition judgment processing (S5400) in which it is judged on whether addition processing needs to be performed depending on the number of install modules included in the install module group 130 on which invalidation processing has been performed.

The sixth processing is monitoring pattern update judgment processing (S5500) in which when an install module is invalidated and/or added, it is judged on whether a monitoring pattern needs to be updated.

Note that all of the above processing does not necessarily need to be performed in the software update system relating to the present invention. Alternatively, it is only necessary, in the software update system relating to the present invention, to perform update processing of updating the protection control module 120 that has been tampered with using a new protection control module in accordance with an update trigger given from outside (S5000) and mutual monitoring processing during recovery processing in which the install modules alternately perform tampering detection (S5100).

The details of the above six processing are described in order.

17.1. Update Processing

Figure 33:
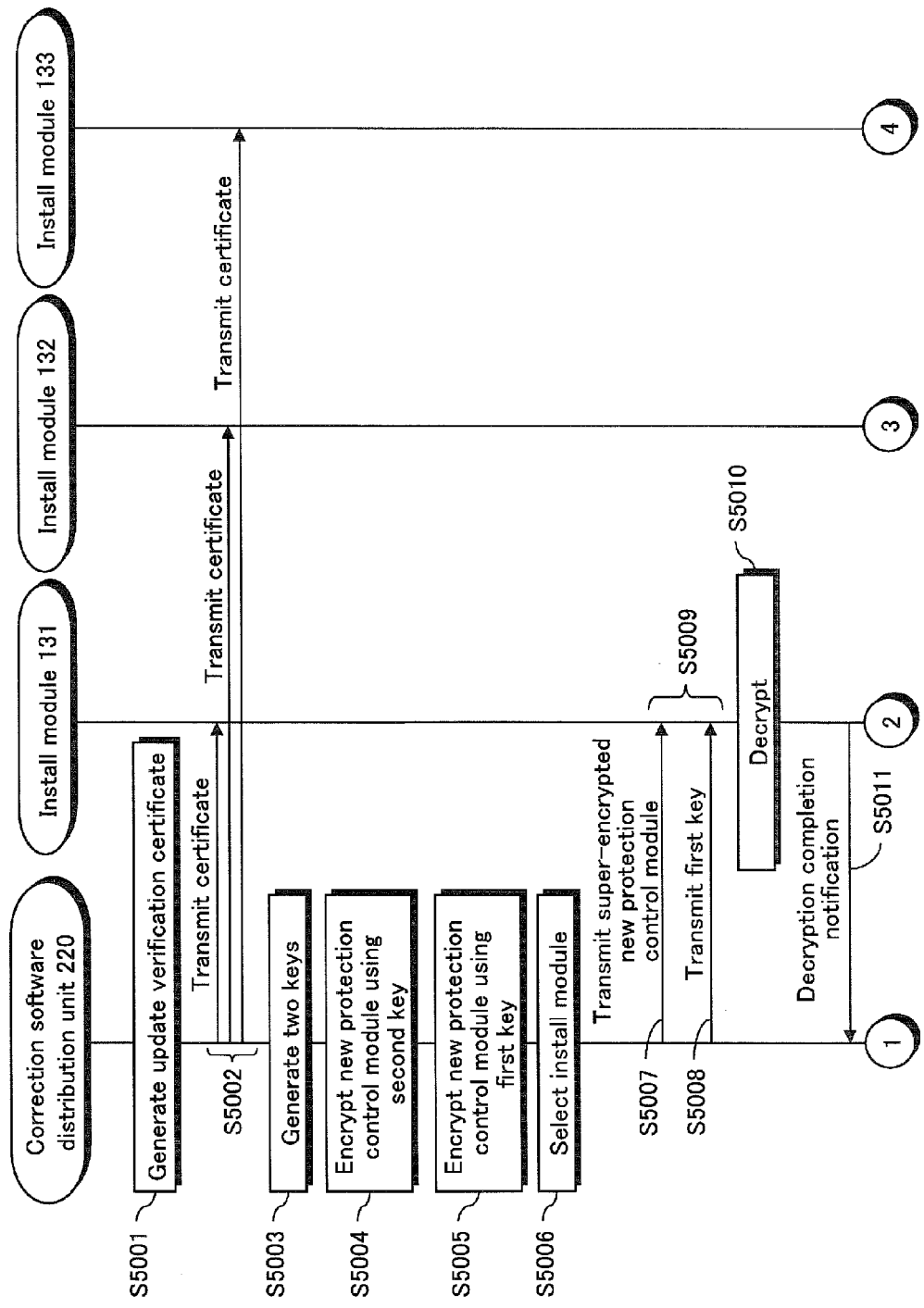
FIG. 33 is a sequence diagram of the recovery processing (update processing) relating to the first embodiment of the present invention.
Figure 34:
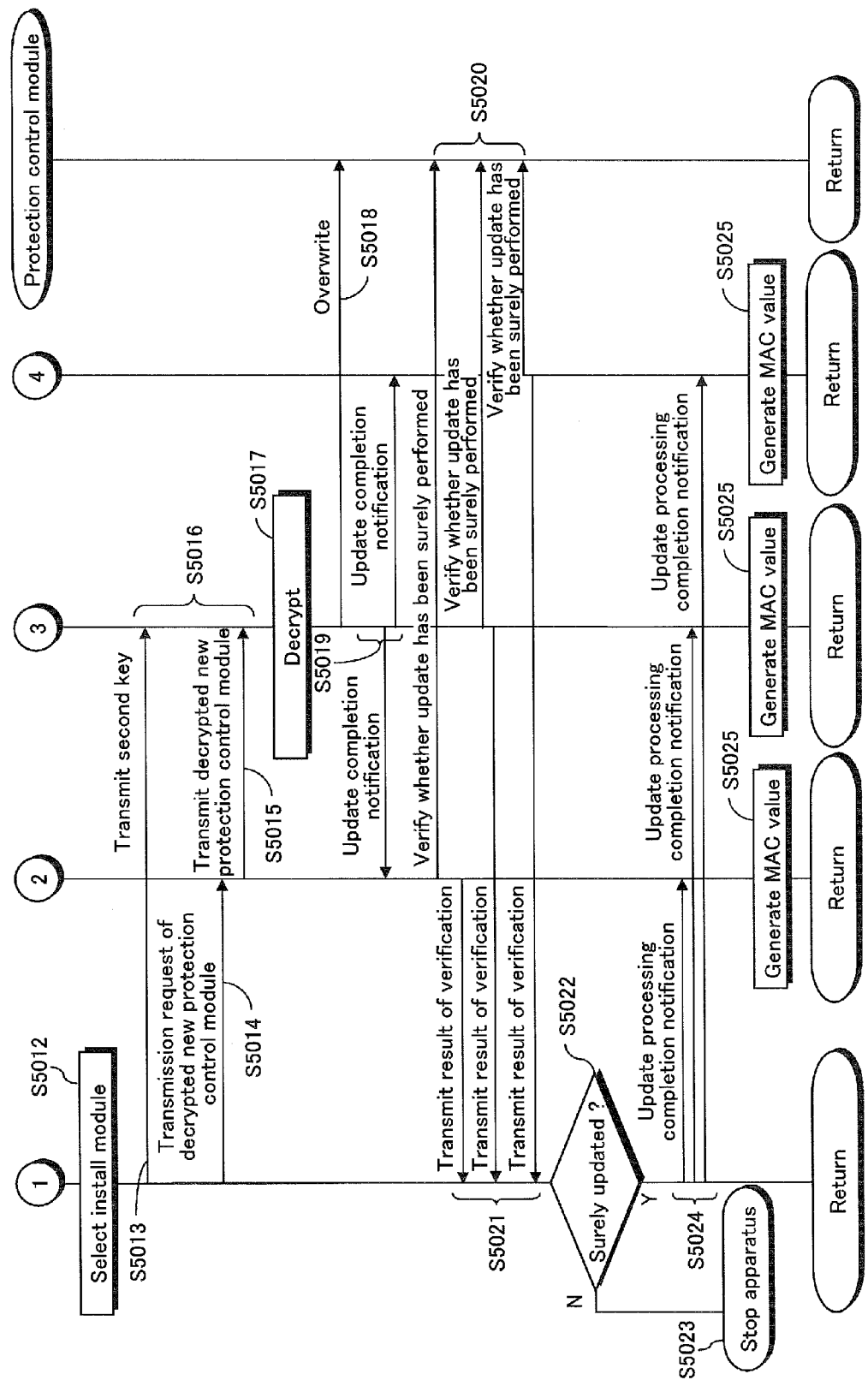
FIG. 34 is a sequence diagram of the recovery processing (update processing) relating to the first embodiment of the present invention.

Here, an example of the update processing (S5000) is described with reference to FIG. 33 and FIG. 34.

Firstly, the certificate generation unit 708 of the correction software distribution unit 220 generates an update verification certificate using a signature secret key (S5001). The update verification certificate is a certificate to be used by each of the install modules 131, 132, and 133 to verify whether a new protection control module has been surely installed. The correction software distribution unit 220 transmits the generated certificate to each of the install modules (S5002).

Next, the encryption key generation unit 703 of the correction software distribution unit 220 generates two encryption keys (first key and second key) for super-encrypting the new correction protection control module (S5003). The decryption loading unit 404 encrypts the new protection control module using the second key to generate an encrypted new protection control module (S5004). The decryption loading unit 404 further encrypts the encrypted new protection control module using the first key to generate a super-encrypted new protection control module (S5005).

The correction software distribution unit 220 selects one authentic install module from the install module group 130 (S5006), and notifies the judgment unit 210 of an identifier of the selected install module. The install module selected in S5006 is an install module other than a tampered with install module stored in the unauthentic module specification unit 604 of the judgment unit 210. Here, the install module 131 is selected as an example.

The correction software distribution unit 220 transmits the super-encrypted new protection control module to the selected install module 131 (S5007), and further transmits the first key to the selected install module 131 (S5008).

The install module 131 receives the super-encrypted new protection control module 121 and the first key (S5009). The install module 131 decrypts the super-encrypted new protection control module 121 using the first key to acquire an encrypted new protection control module 121 (S5010). After completing the decryption, the install module 131 transmits a decryption completion notification to the correction software distribution unit 220 (S5011).

Upon receiving the decryption completion notification, the correction software distribution unit 220 selects one authentic install module from the install module group 130 except the install module selected in S5006 (S5012). Here, the install module 132 is selected as an example.

In the same way as described above, the install module selected in S5012 is an install module other than the tampered with install module stored in the unauthentic module specification unit 604 of the judgment unit 210.

The correction software distribution unit 220 transmits the second key to the selected install module 132 (S5013). Furthermore, the correction software distribution unit 220 requests the install module 131 to transmit the encrypted new protection control module acquired in S5010 to the install module 132 (S5014).

Upon being requested by the correction software distribution unit 220, the install module 131 transmits the encrypted new protection control module to the install module 132 (S5015).

The install module 132 receives the second key from the correction software distribution unit 220, and receives the encrypted new protection control module 121 from the install module 131 (S5016). Then, the install module 132 decrypts the encrypted new protection control module 121 using the second key to acquire a new protection control module (S5017).

The install module 132 overwrites the protection control module 120 with the acquired new protection control module, thereby to update the protection control module 120 (S5018). Then, the install module 132 transmits an update completion notification to other install modules (S5019).

Then, each of the install modules 131, 132, and 133 verifies whether the protection control module 121 has been surely updated using the update verification certificate received beforehand (S5020), and transmits a result of the verification to the correction software distribution module 210 (S5021).

Upon receiving the results of the verifications transmitted from the install modules, the correction software distribution unit 220 judges whether the protection control module 121 has been surely updated (S5022). If judging that the protection control module 121 has not been surely updated, the correction software distribution unit 220 stops the apparatus 100 (S5023).

If judging that the protection control module 121 has been surely updated, the correction software distribution unit 220 transmits an update processing completion notification to the install modules (S5024).

Upon receiving the update processing completion notification, each of the install modules 131, 132, and 133 generates a MAC value of the new protection control module 121, and stores a pair of an identifier of the protection control module 121 and the generated MAC value in the MAC value table (S5025).

In the update processing as described above, the correction software distribution unit 220 super-encrypts a new correction protection control module using a plurality of keys, and transmits the super-encrypted new correction protection control module to the install module group 130. The install module group 130 updates the protection control module 120 with the received new correction protection control module.

Here, the correction software distribution unit 220 controls a timing of transmitting a plurality of keys for decrypting the super-encrypted new correction install module to the install module group 130. This makes it impossible for an attacker to obtain the new correction install module that has not been encrypted.

17.2. Mutual Monitoring Processing during Recovery Processing

Figure 35:
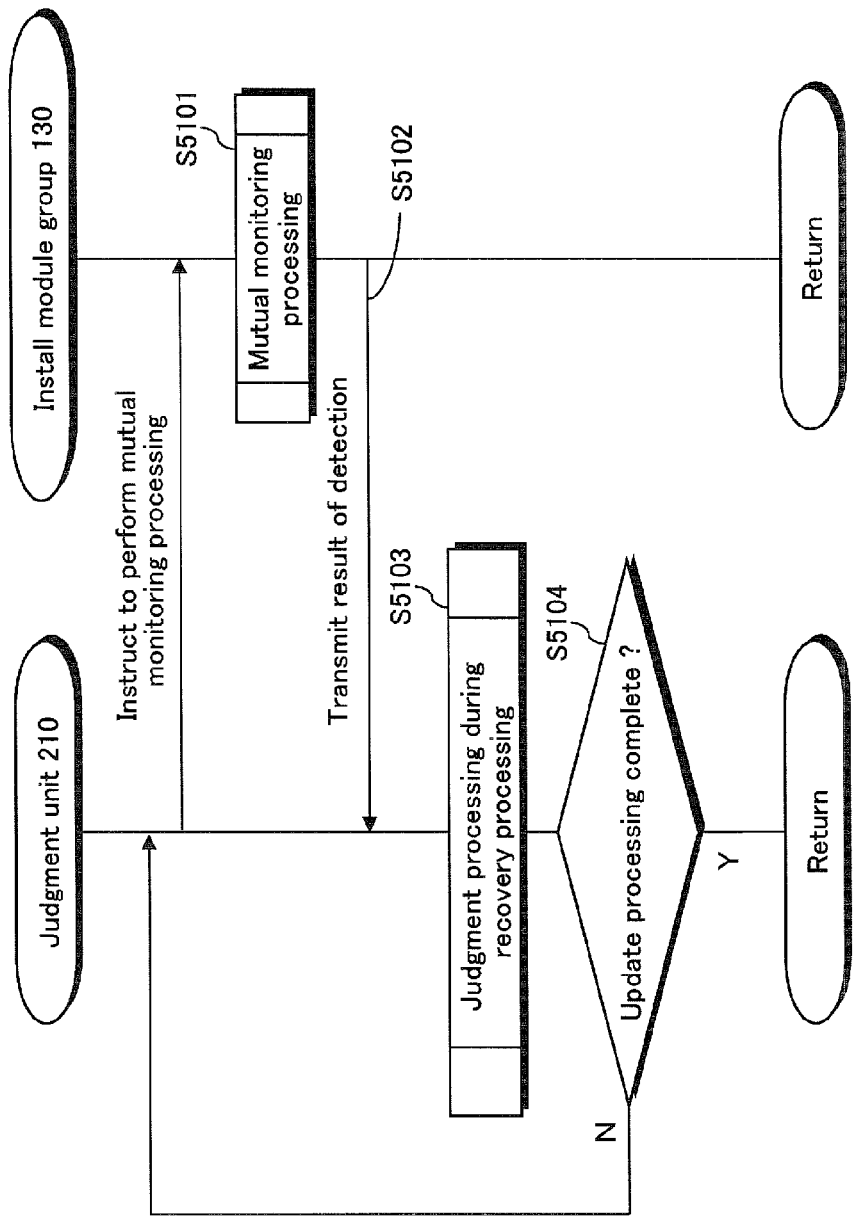
FIG. 35 is a sequence diagram of the recovery processing (mutual monitoring processing during recovery processing) relating to the first embodiment of the present invention.
Figure 36:
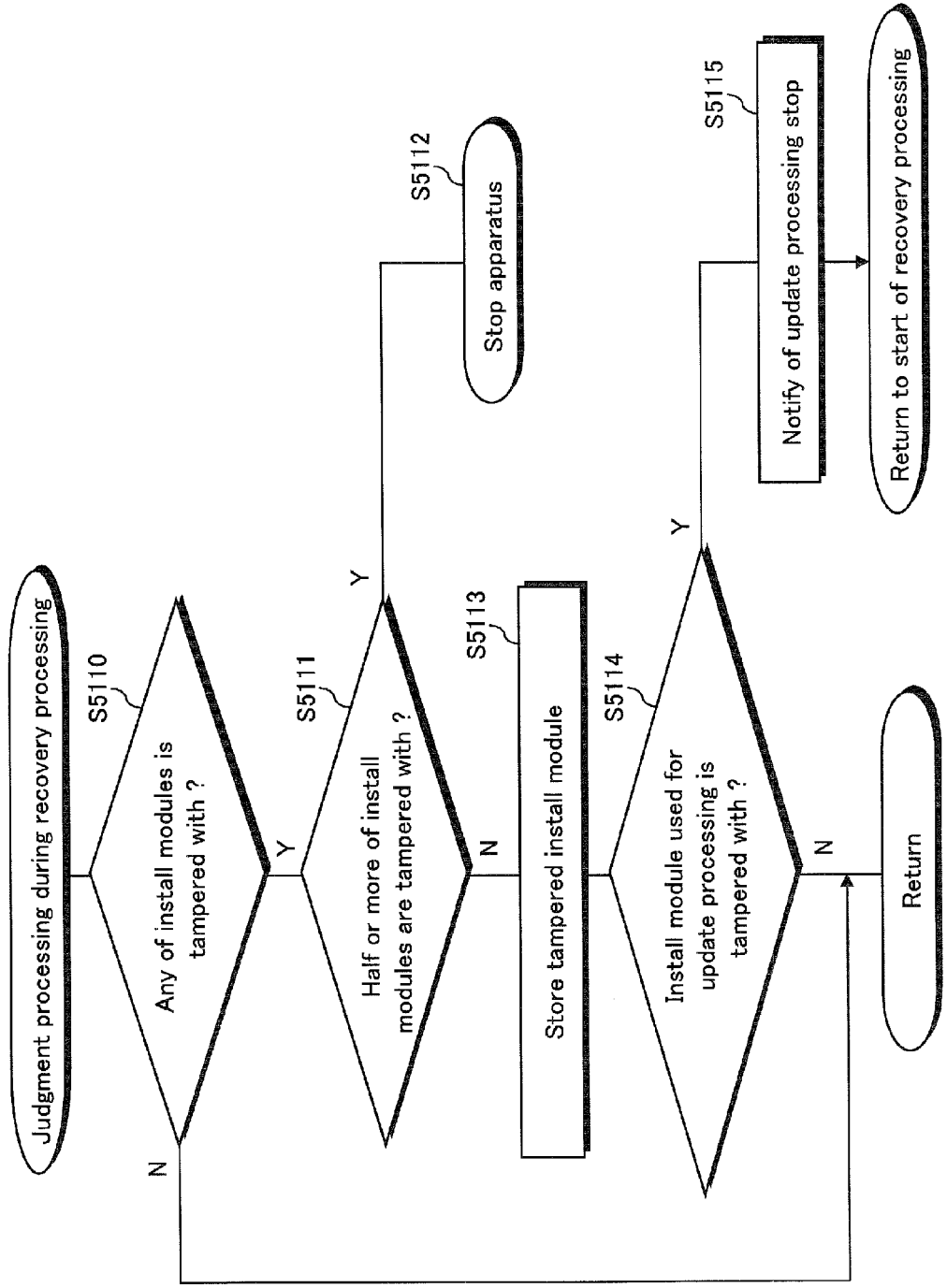
FIG. 36 is a flow chart of the recovery processing (judgment processing during recovery processing) relating to the first embodiment of the present invention.

The following describes an example of the mutual monitoring processing during recovery processing (S5100) with reference to FIG. 35 and FIG. 36.

The judgment unit 210 instructs the install module group 130 to perform mutual monitoring processing, and the install module group 130 performs the mutual monitoring processing (S5101). The details of S5101 are the same as those of the mutual monitoring processing (S3100) shown in FIG. 23, and accordingly the description thereof is omitted here.

Each of the install modules performs tampering detection, and transmits a result of the tampering detection to the judgment unit 210 (S5102). Note that if there is no tampered install module as a result of performing the mutual monitoring processing, notification does not need to be transmitted to the judgment unit 210. The judgment unit 210 performs judgment processing during recovery processing based on the result of the detection (S5103).

As described above, in the mutual monitoring processing during recovery processing, the install module group 130 performs mutual monitoring processing. As a result, even if part of the install modules becomes tampered with during recovery processing, it is possible to detect the tampered part. Furthermore, by periodically performing mutual monitoring processing during recovery processing, it is possible to detect tampering before all parts of a new protection control module are leaked, and prevent all parts of the new protection control module from being leaked.

17.3. Judgment Processing during Recovery Processing

The following describes the details of the judgment processing during recovery processing (S5103) with reference to FIG. 36.

Firstly, the judgment unit 210 judges whether any of the install modules is tampered with (S5110). If judging that no install module is tampered with, the judgment unit 210 ends the judgment processing during recovery processing, and the flow returns to the mutual monitoring processing during recovery processing shown in FIG. 35.

If judging that any of the install modules is tampered with, the judgment unit 210 judges whether half or more of the install modules included in the install module group are tampered with (S5111). If judging that half or more of the install modules are tampered with, the judgment unit 210 stops the apparatus 100 (S5112).

By stopping the apparatus 100, it is possible to prevent the apparatus 100 from being tampered with, operating in an unauthorized manner, and affecting other apparatus connected with the apparatus 100 via the network. Also, in the case where the protection control module 120 is also tampered with, there is a high possibility that the applications (110 and 111) might have been attacked. In such a case, it is possible to prevent the attack against the applications (110 and 111) from affecting other apparatus.

If less than half of the install modules is tampered with, the unauthentic module specification unit 604 specifies which install module is tampered with, and stores an identifier of the specified install module in the unauthentic module specification unit 604 (S5113).

Next, the unauthentic module specification unit 604 judges whether an install module selected in update processing is tampered with (S5114). If judging that the install module selected in update processing is tampered with, the tampered with install module might perform malicious operations during update processing. Accordingly, the unauthentic module specification unit 604 transmits an update processing stop notification to the correction software distribution unit 220 and the install module group 130 (S5115). After the transmission of the notification to the correction software distribution unit 220 and the install module group 130, the flow returns to the start of recovery processing.

By returning the flow to the start of recovery processing, the flow does not proceed to the invalidation judgment processing during recovery processing (S5300) and the addition judgment processing (S5400). As a result, it is possible to perform update processing of the protection control module in preference to invalidation processing of the tampered with install module and addition processing. By preferentially performing update processing of the protection control module, it is possible to prevent the applications (110 and 111) from being attacked by an unauthorized protection control module.

If judging that the install module selected in update processing is not tampered with, the unauthentic module specification unit 604 ends the mutual monitoring processing during recovery processing.

17.4. Relationship between Update Processing and Mutual Monitoring Processing during Recovery Processing The following describes in detail the linked operations of the update processing and the mutual monitoring processing during recovery processing, with reference to FIG. 32. The time intervals for periodically performing mutual monitoring processing during recovery processing are, for example, shorter than a time period necessary for the new protection control module to be completely output outward via the network. If it takes one second for the correction protection control module 121 to be completely output outward, mutual monitoring processing during recovery processing is performed at shorter intervals such as 500 millisecond intervals. The detailed description is given below.

Firstly, before the super-encrypted new protection control module is transmitted from the update server 200 to the apparatus 100, the apparatus 100 performs mutual monitoring processing during recovery processing (Mutual Monitoring 1). This is in order to avoid selection of an unauthentic install module and performance of update processing by the unauthentic install module.

Then, before the install module 131 receives the first key transmitted from the update server 200, the apparatus 100 performs mutual monitoring processing during recovery processing (Mutual Monitoring 2). This is in order to confirm that when the apparatus 100 receives the key, no unauthentic install module is selected.

Furthermore, while the install module 131 receives the first key and decrypts the super-encrypted new protection control module using the first key, the apparatus 100 periodically decryption performed by the install module 131 to perform mutual monitoring processing during recovery processing (Mutual Monitoring 3-1 and 3-2). As a result, even if any one of the install modules 131, 132, and 133 is attacked during the decryption processing, it is possible to detect the attack performed by an attacker before all parts of the encrypted new protection control module are leaked. This can prevent the leakage of the encrypted new protection control module.

In the subsequent processing, in the same way as in the above processing, before the install module 132 receives the second key transmitted from the update server 200 to the apparatus 100, the apparatus 100 performs mutual monitoring processing during recovery processing (Mutual Monitoring 4). It is confirmed that when the apparatus 100 receives the key, no unauthentic install module is selected in update processing.

Furthermore, while the install module 132 receives the second key and decrypts the encrypted new protection control module using the second key, the apparatus 100 periodically interrupts the decryption processing performed by the install module 132 to perform mutual monitoring processing during recovery processing (Mutual Monitoring 5-1 and 5-2). Finally, the apparatus 100 performs mutual monitoring processing during recovery processing (Mutual Monitoring 6).

As a result, it is possible to detect an attack performed by an attacker before all parts of the encrypted new protection control module are leaked. This can prevent the leakage of the encrypted new protection control module.

Here, in the mutual monitoring processing during recovery processing, if it is detected that an install module has been tampered with, the judgment unit 210 of the update server 200 performs judgment processing during recovery processing (S5103). As a result, the update server 200 can stop transmitting the first key and the second key, and the attacker cannot acquire a key for decrypting the super-encrypted new protection control module.

17.5. Re-Encryption Processing

Figure 37:
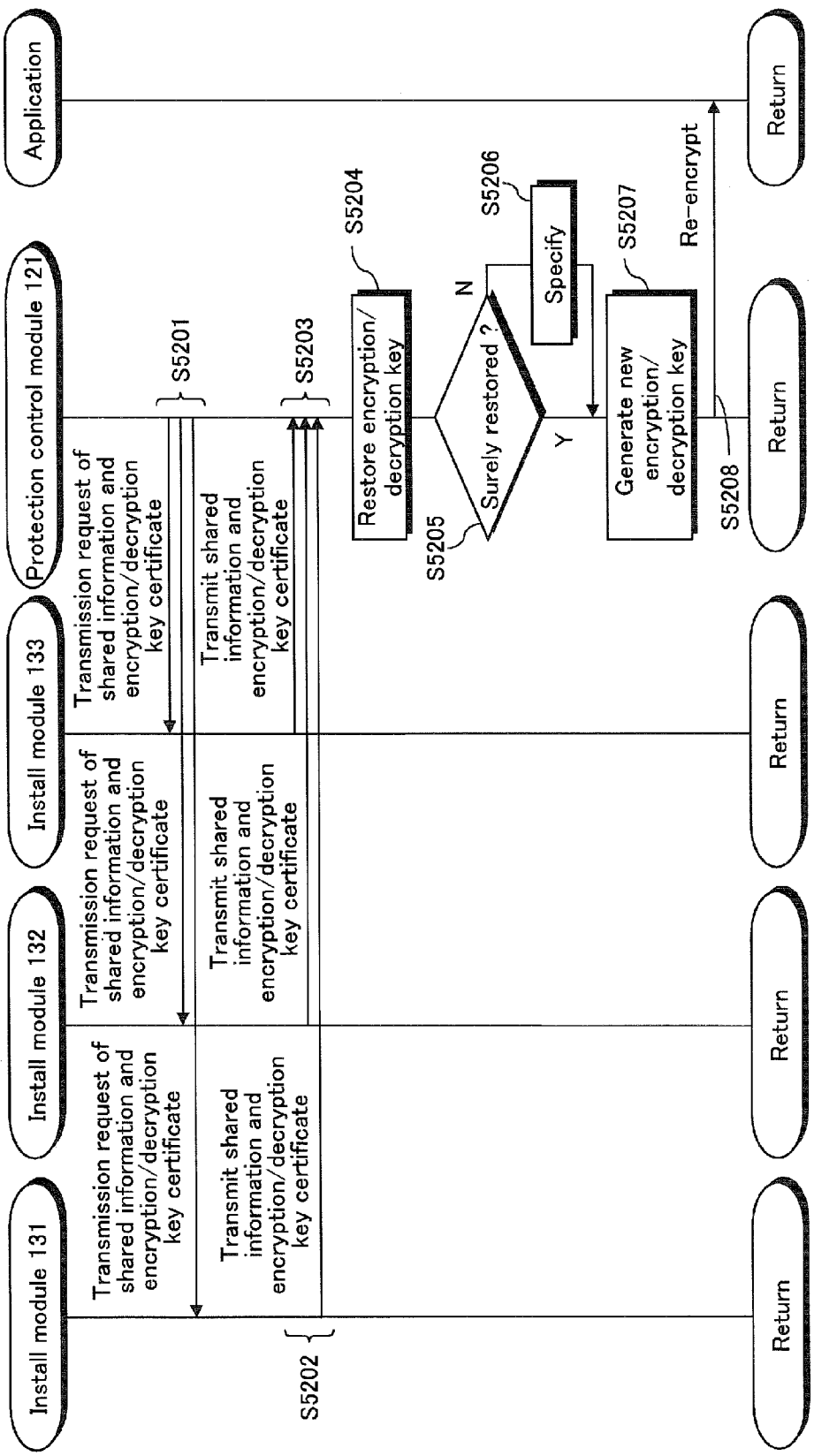
FIG. 37 is a sequence diagram of the recovery processing (re-encryption processing) relating to the first embodiment of the present invention.

Next, an example of the re-encryption processing (S5200) of the recovery processing is described with reference to FIG. 37.

Firstly, a protection control module that has been updated (hereinafter, "protection control module 121") requests each of the install modules 131, 132, and 133 to transmit shared information and an encryption/decryption key certificate stored therein to the protection control module 121 (S5201).

Upon receiving the request, each of the install modules 131, 132, and 133 transmits the shared information and the encryption/decryption key certificate (S5202).

The protection control module 121 receives the shared information and the encryption/decryption key certificate from each of the install modules 131, 132, and 133 (S5203), and recovers an encryption/decryption key which has been used by the protection control module 120 before update (old encryption/decryption key) based on the received shared information (S5204). Furthermore, the protection control module 121 verifies whether the old encryption/decryption key has been surely recovered, using the encryption/decryption key certificate (S5205).

If the old encryption/decryption key has not been surely recovered, the protection control module 121 specifies an unauthentic install module (specifies which install module has transmitted unauthentic shared information) (S5206). The protection control module 121 notifies the update server 200 of the specified unauthentic install module.

If the old encryption/decryption key has been surely recovered, the encryption/decryption key generation unit 408 of the protection control module 121 generates a new encryption/decryption key (S5207). Then, the decryption loading unit 404 decrypts the applications (110 and 111), which have been encrypted using the old encryption/decryption key, and re-encrypts the applications (110 and 111) using the new encryption/decryption key (S5208).

Here, the following describes methods for specifying an unauthentic install module in S5206. Firstly, the protection control module 121 collects shared information pairs from the install modules respectively, and attaches, to each of the acquired shared information pairs, a piece of identification information for identifying from which install module the shared information pair has been acquired.

Then, the protection control module 121 classifies, into groups, pieces of shared information having the same value set and distributed in the initial design processing. The protection control module 121 compares values of pieces of the shared information classified into each group with one another, and further classifies, into subgroups, pieces of the shared information that should have the same value.

Then, the protection control module 121 generates an old encryption/decryption key for each of all the combinations of the subgroup selected from all the groups, and verifies whether an authentic old encryption/decryption key has been generated. As a result of the verification, if an authentic old encryption/decryption key has been generated, the protection control module 121 attaches, to a subgroup selected from the combination, verification success identification information that indicates the subgroup selected among the combinations has succeeded in the verification.

After performing generation of an old encryption/decryption key and verification on whether the old encryption/decryption key is authentic for each of all the combinations, the protection control module 121 removes a piece of shared information included in a subgroup to which the verification success identification information is attached.

A remaining piece of shared information that has not been removed has an unauthentic value. Accordingly, the protection control module 121 can identify an install module that has transmitted an unauthentic piece of shared information, based on identification information of the remaining piece of shared information. The install module identified based on the identification information is identified as an unauthentic install module.

Regarding the details of a method of recovering an old encryption/decryption key from shared information and a method of specifying an unauthentic install module, the detailed descriptions are found in pages 50 to 52 of the Patent Document 2. By corresponding the secret key d, the authentication device, and the shared information storage apparatus in the Patent Document 2 respectively to the encryption/decryption key, the protection control module 121, and the install modules 131, 132, and 133 in the present embodiment, it is possible to use the same methods used in the Patent Document 2.

17.6. Invalidation Judgment Processing during Recovery Processing

Figure 38:
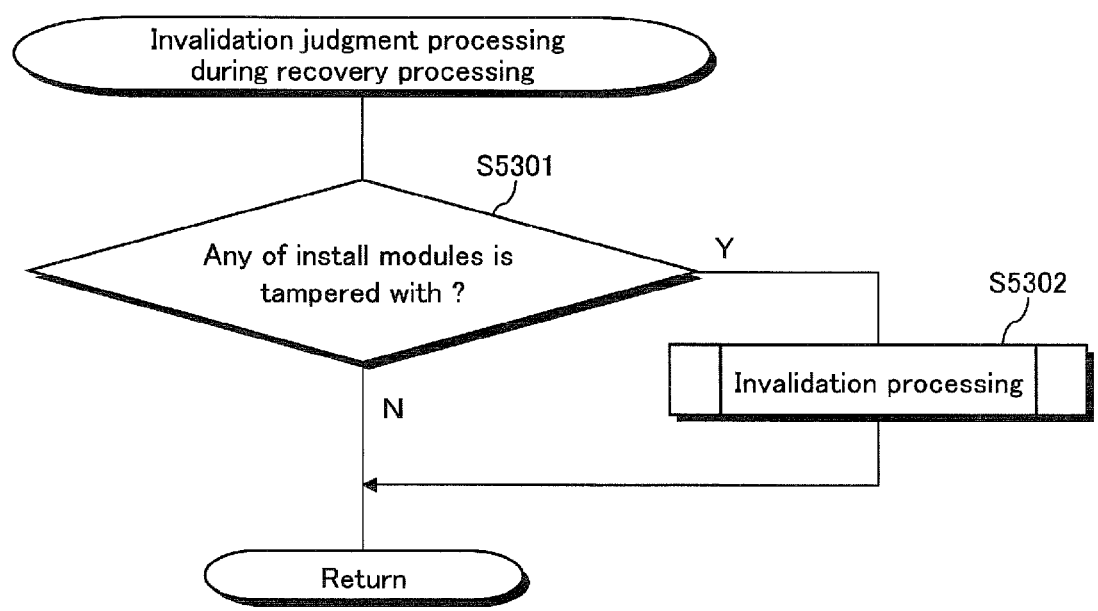
FIG. 38 is a flow chart of the recovery processing (invalidation judgment processing during recovery processing) relating to the first embodiment of the present invention.

Next, invalidation judgment processing during recovery processing (S5300) of the recovery processing is described, with reference to FIG. 38.

In the invalidation judgment processing during recovery processing (S5300), if tampering is detected in the mutual monitoring processing during recovery processing (S5100) and a tampered with install module is stored in S5113 shown in FIG. 36, it is judged which install module is tampered with (S5301). Then, invalidation processing is performed on the install module judged to be tampered with (S5302). The invalidation processing is described in detail later.

17.7. Addition Judgment Processing

The addition judgment processing (S5400) is the same as the addition judgment processing (S3300 in FIG. 22) included in the judgment processing during normal processing (S3006 in FIG. 21), and accordingly the description thereof is omitted here.

17.8. Monitoring Pattern Update Judgment Processing

The monitoring pattern update judgment processing (S5500) is the same as the monitoring pattern update judgment processing (S3400 in FIG. 22) included in the judgment processing during normal processing (S3006 in FIG. 21), and accordingly the description thereof is omitted here.

18. Operations of Next-Round Preparation Processing

Figure 39:
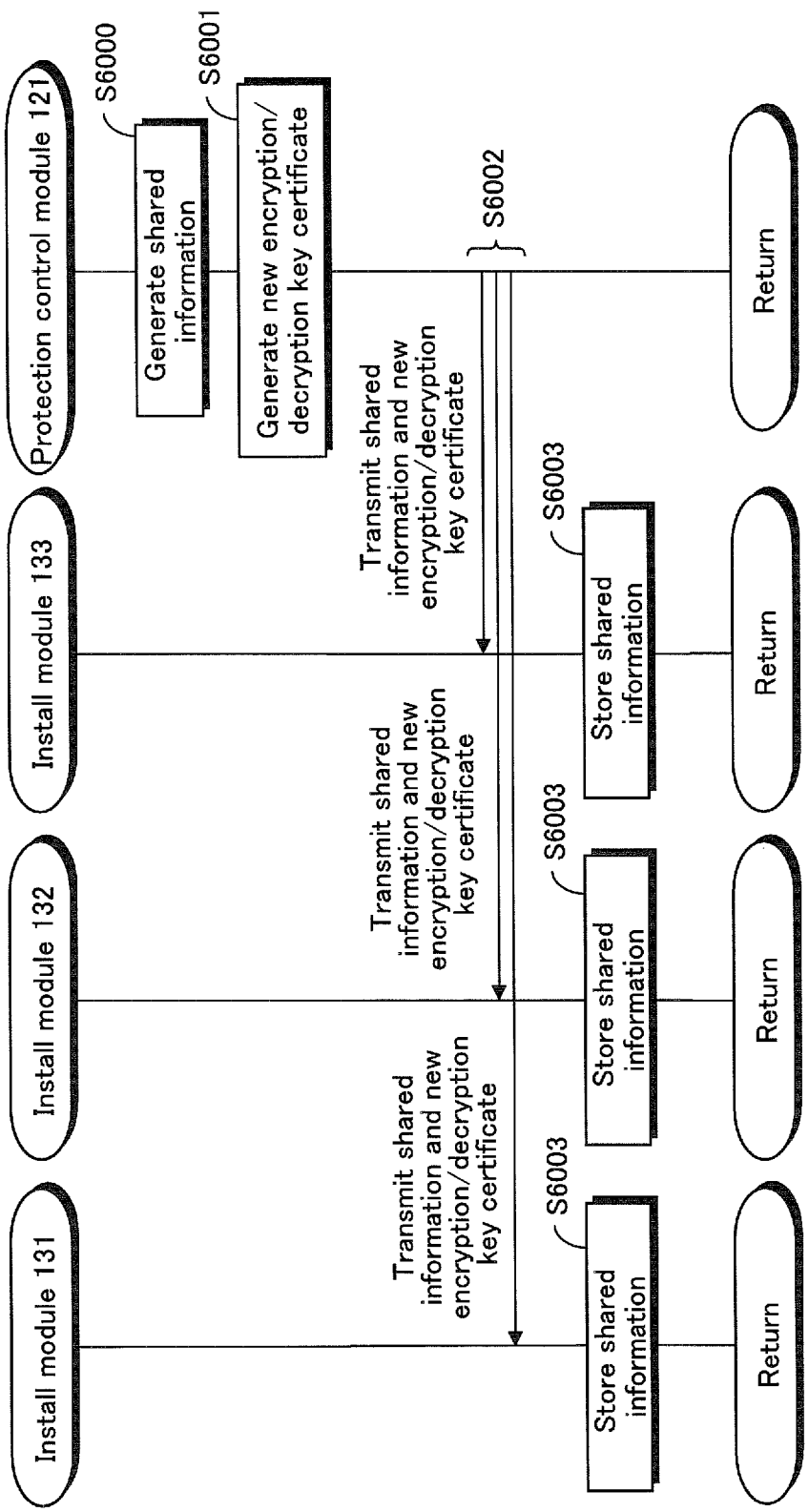
FIG. 39 is a sequence diagram of next-round preparation processing relating to the first embodiment of the present invention.

Here, the operations of the next-round preparation processing are described with reference to the flow chart shown in FIG. 39. In the next-round preparation processing, after recovery processing completes, preparation is performed for next recovery processing. The following specifically describes the processing.

Firstly, the protection control module 121 generates pieces of shared information from a new encryption/decryption key by the secret sharing scheme (S6000), and further generates a new encryption/decryption key certificate using a signature secret key (S6001). Then, the protection control module 121 transmits the generated pieces of shared information and encryption/decryption key certificate to each of the install modules 131, 132, and 133 (S6002).

Here, in the same way as in the initial design processing, pieces of shared information whose number is the same with the number of install modules are generated. A different shared information pair is transmitted to each of the install modules 131, 132, and 133. The same encryption/decryption key certificate is transmitted to the install modules 131, 132, and 133.

The install modules 131, 132, and 133 each receive the piece of shared information and the new encryption/decryption key certificate from the protection control module 121, and stores the received piece of shared information and new encryption/decryption key certificate in the shared information storage unit 310 (S6003).

19. Operations of Invalidation Processing

Figure 25:
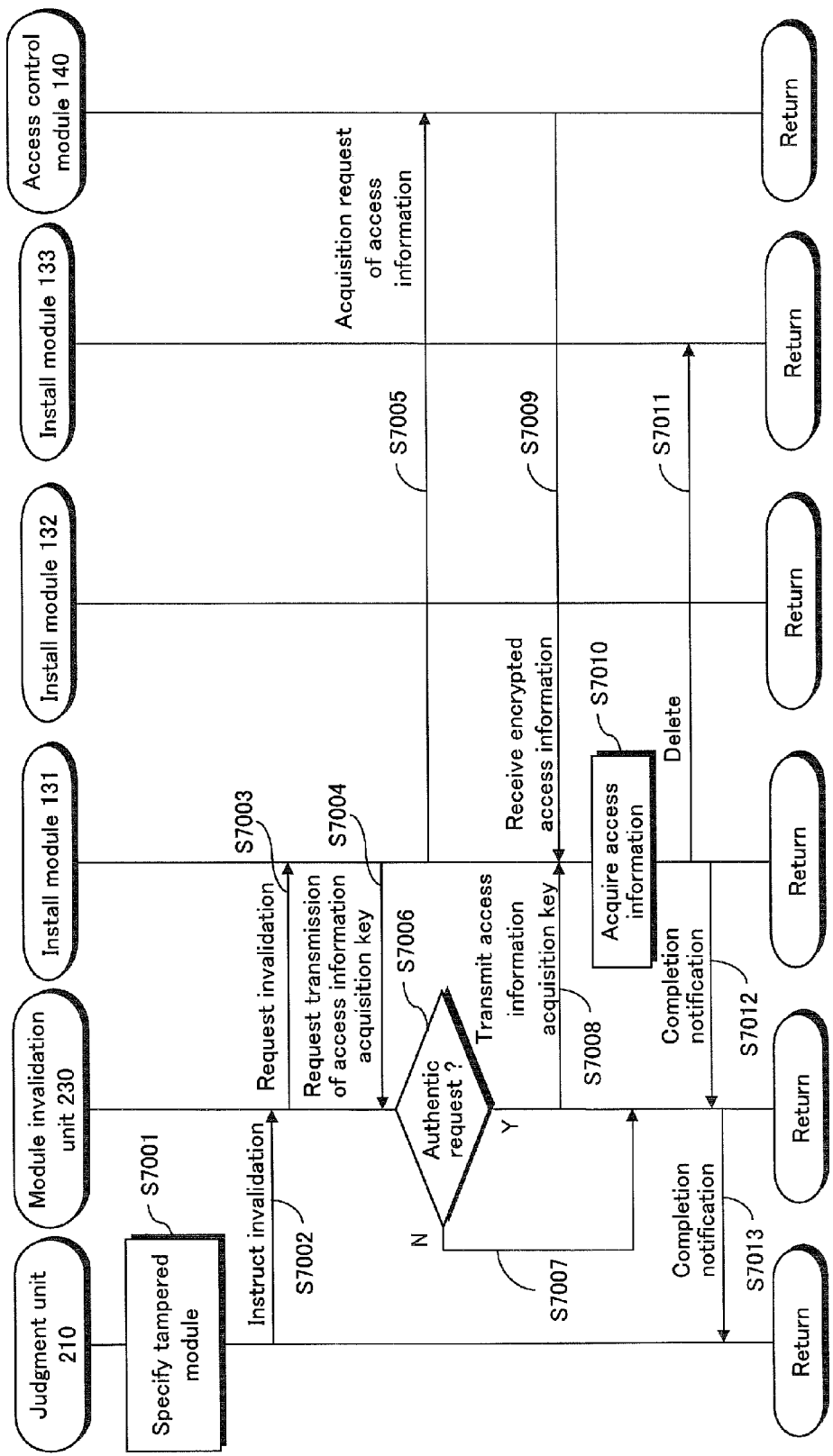
FIG. 25 is a sequence diagram of invalidation processing relating to the first embodiment of the present invention.

Here, the operations of the invalidation processing performed in the software update system 10 are described, with reference to the flow chart shown in FIG. 25.

The invalidation processing is processing of invalidating an unauthentic (tampered) module included in the apparatus 100 in the case where an install module that has failed in authentication in the mutual authentication processing, in the case where a tampered install module is detected in the judgment processing during normal processing, in the case tampering of the protection control module 120 is detected, and so on.

Here, as an example, the following describes invalidation processing in the case where the install modules 131 and 132 detects that the install module 133 has been tampered with during judgment processing during normal processing.

The judgment unit 210 judges which install module has been tampered with, based on the results of the mutual monitoring received from the install modules 131, 132, and 133 (S7001). The judgment is performed in the following manner For example, if it is judged that a predetermined number of install modules judges that a certain install module has been tampered with, the judgment unit 210 judges that the certain install module has been tampered with.

The judgment unit 210 transmits an invalidation instruction to the module invalidation unit 230 together with identification information of the tampered install module (S7002).

The module invalidation unit 230 requests either of the install modules 131 and 132, which have been judged not to be tampered with, to invalidate the tampered install module 133 (S7003).

Upon receiving the invalidation request of the install module 133 from the module invalidation unit 230, the install module 131 requests the module invalidation unit 230 to transmit an access information acquisition key for invalidating the install module 133 to the install module 131 (S7004). Furthermore, the install module 131 transmits an acquisition request of access information for invalidating the install module 133 to the access control module 140 (S7005).

Upon receiving the transmission request of the access information acquisition key, the module invalidation unit 230 checks whether the install module 131 is an authentic install module (an install that has not been tampered with) and whether the requested access information acquisition key is an access information acquisition key for invalidating the unauthentic (tampered) install module 133 (S7006). This check is performed using information on an install module, which is transmitted from the judgment unit 210 to the module invalidation unit 230.

As a result of the check, if judging that the transmission request is issued by the tampered install module 133 or the transmission request is for requesting for transmission of an access information acquisition key corresponding to either of the install modules (131 and 132) that have not been tampered with, the access information acquisition key distribution module 220 stops the invalidation processing (S7007). As a result of the check, if judging that the transmission request is an authentic request, the access information acquisition key distribution module 220 transmits the access information acquisition key for invalidating the install module 133 to the install module 131 that has issued the transmission request (S7008).

Upon receiving the access information acquisition key from the module invalidation unit 230, and further receiving the encrypted access information from the access control module 140 (S7009), the install module 131 acquires access information using the access information acquisition key and the encrypted access information (S7010). The acquired access information is a driver exclusively for deleting the install module 133. The install module 131 deletes the unauthentic install module 133 tampered with, using the driver (S7011).

After the invalidation processing completes, the install module 131 deletes the access information acquisition key, the encrypted access information, the access information, and so on. Then, the install module 131 transmits a completion notification to the module invalidation unit 230 (S7012). Upon receiving the completion notification from the install module 131, the module invalidation unit 230 transmits an invalidation completion notification to the judgment unit 210 (S7013).

Note that in the case where an install module including the shared information storage unit 310 is invalidated in invalidation processing, shared information stored in the invalidated install module is also deleted. In view of this, it is necessary to perform invalidation processing of an install module including the shared information storage unit 310 in consideration of deletion of shared information.

Regarding invalidation processing in consideration of deletion of shared information, the detailed description is found in pages 56 to 64 of the Patent Document 2 as "withdrawal processing". By corresponding the secret key d and the shared information storage apparatus in the Patent Document 2 respectively to the encryption/decryption key and the install modules 131, 132, and 133 in the present embodiment, it is possible to use the same methods used in the Patent Document 2. In order to perform invalidation processing in consideration of deletion of shared information, at least three install modules are necessary except an unauthentic install module that needs to be invalidated. In the case where the protection control module 120 is used for invalidation processing, shared information is generated again by the same method as in the initial design processing, and the generated shared information is distributed.

As described above, since a plurality of install modules included in the install module group 130 perform mutual monitoring processing, an install module that has been tampered with can be detected. This can increase the reliability of the software update system. Also, by invalidating a tampered install module, it is possible to prevent the tampered install module from operating in an unauthorized manner.

20. Operations of Addition Processing

Figure 27:
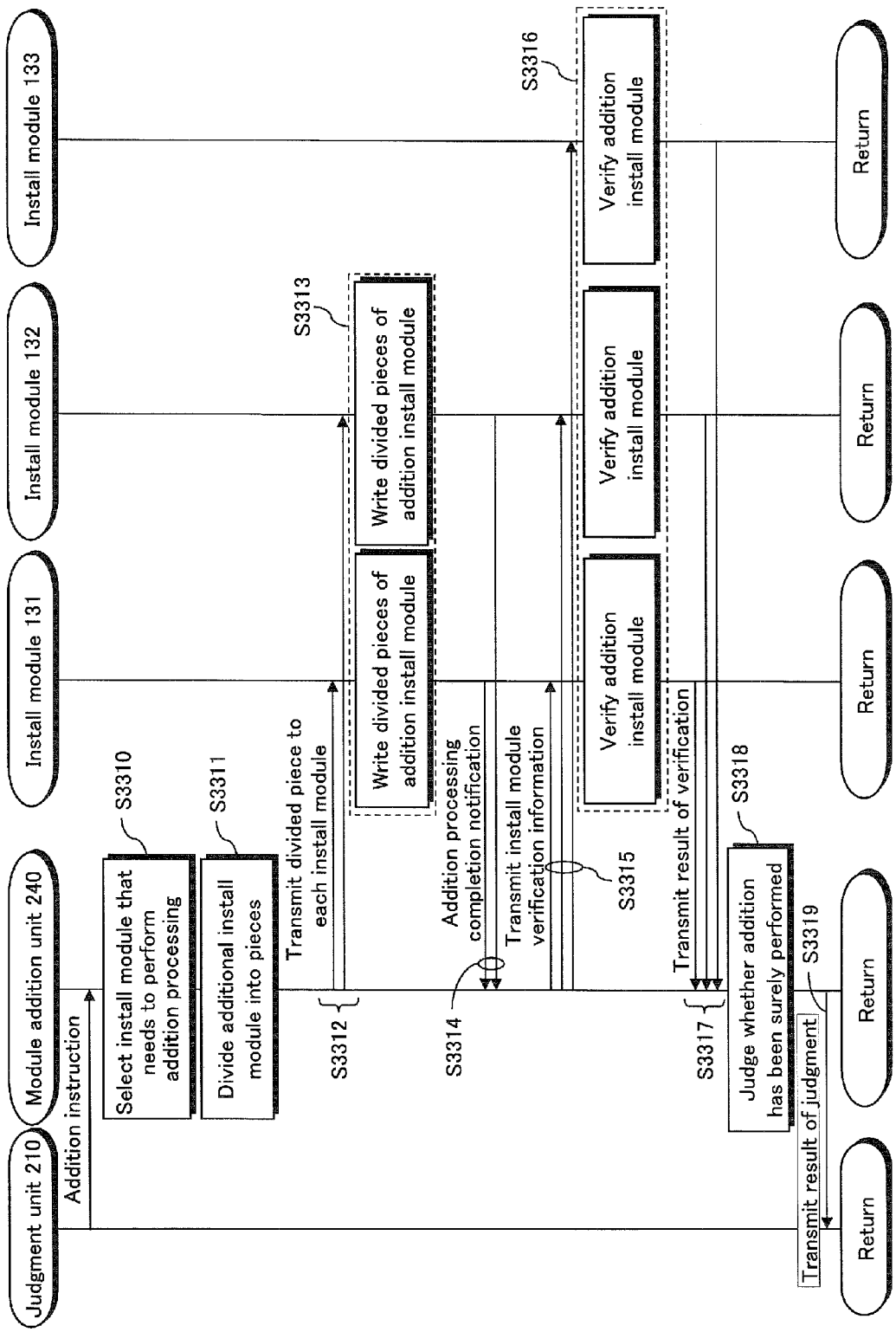
FIG. 27 is a sequence diagram of addition processing relating to the first embodiment of the present invention.

Next, the operations of the addition processing in the software update system 10 are described, with reference to the flow chart shown in FIG. 27. The addition processing is the details of S3302 shown in FIG. 26. In the addition processing, an install module is added so as to increase the number of install modules included in the apparatus 100.

Here, the description is given using an example of processing of adding a new install module, using the install modules 131 and 132.

If judging that an install module needs to be added to the install module group 130, the judgment unit 210 instructs the module addition unit 240 to add an install module. Here, a list of authorized install modules included in the apparatus 100 is transmitted together with the instruction of addition.

Upon receiving the instruction from the judgment unit 210, the install module selection unit 903 firstly selects an install module that is to perform addition processing among install modules included in the list received from the judgment unit 210 (S3310).

The install module that is to perform the addition processing may be selected at random, or in descending order in the list. Alternatively, it may be possible to select an install module monitored by most install modules. The install module selection unit 903 may select one install module, half of the install modules, or all of the install modules. A method of selection and the number of install modules to be selected may be determined in the system design processing. Alternatively, the judgment unit 210 may specify the method and the number for each time.

Next, the install module division unit 905 acquires an additional install module from the install module storage unit 904, and divides the additional install module into pieces whose number is the same as the number of install modules that are to perform the addition processing (S3311).

Then, the install module division unit 905 transmits the divided pieces of the additional install module respectively to the install modules selected by the install module selection unit 903 (S3312). Here, the install module division unit 905 transmits information indicating a region into which each of the divided pieces of the additional install module is to be written. Also, each of the additional install modules acquired from the install module storage unit 904 has attached thereto a verification certificate for verifying the additional install module.

As described above, not by causing one install module to monopolize the authority of addition, but by distributing the authority to a plurality of install modules, it is possible to reduce the risk of addition of an unauthentic install module due to tampering of an install module having the authority of addition.

Upon receiving the divided piece of the additional install module, each of the install modules writes the divided piece of the additional install module into the specified region (S3313). After completing the writing, each of the install modules transmits a completion notification of the addition processing to the module addition unit 240 (S3314).

Upon receiving the completion notification of the addition processing from each of the install modules to which the divided pieces of the additional install module have been transmitted, the control unit 906 included in the module addition unit 240 transmits verification information of the added install module to each of the install modules included in the install module group 130 to request for verification (S3315). The verification information includes a head address and a size of a region into which the added install module has been written.

Upon receiving the verification information, each of the install modules loads the added install module based on the verification information, and performs verification using a verification certificate having attached thereto the added install module (S3316). After performing the verification, each of the install modules transmits a result of the verification to the module addition unit 240 (S3317).

The control unit 906 included in the module addition unit 240 judges whether the additional install module has been surely added, based on the result of the verification transmitted from the install module (S3318). Then, the control unit 906 transmits a result of the judgment and a completion notification of the addition processing to the judgment unit 210 (S3319).

Note that in the case where an install module including the shared information storage unit 310 is added, shared information needs to be distributed to an install module that is to perform addition. The method of distributing shared information to the install module that is to perform addition is described in detail in pages 64 to 79 in the Patent Document 2. Here, by corresponding the secret key d and the shared information storage apparatus relating to the Patent Document 2 respectively to the encryption/decryption key and the install modules 131, 132, and 133 relating to the present embodiment, it is possible to use the same methods used in the Patent Document 2. Note that in the case where shared information is distributed to an install module that is to perform addition, at least three authentic install modules are necessary except the additional install module to be added. In the case where the protection control module 120 is used, it may be possible to generate again shared information by the same method as in the initial design processing, and distribute the generated shared information.

By adding an install module as described above, it is possible to maintain a constant number of install modules included in the apparatus 100, and thereby to stably perform tampering detection on the install module group 130. This can increase the reliability of the software update system.

21. Monitoring Pattern Update Processing

Here, the monitoring pattern update processing in the software update system 10 is described. The monitoring pattern update processing is processing of updating a monitoring pattern of the install module group 130 included in the apparatus 100 in the case where the monitoring pattern needs to be updated after invalidation processing or addition processing of an install module has been performed.

Figure 40:
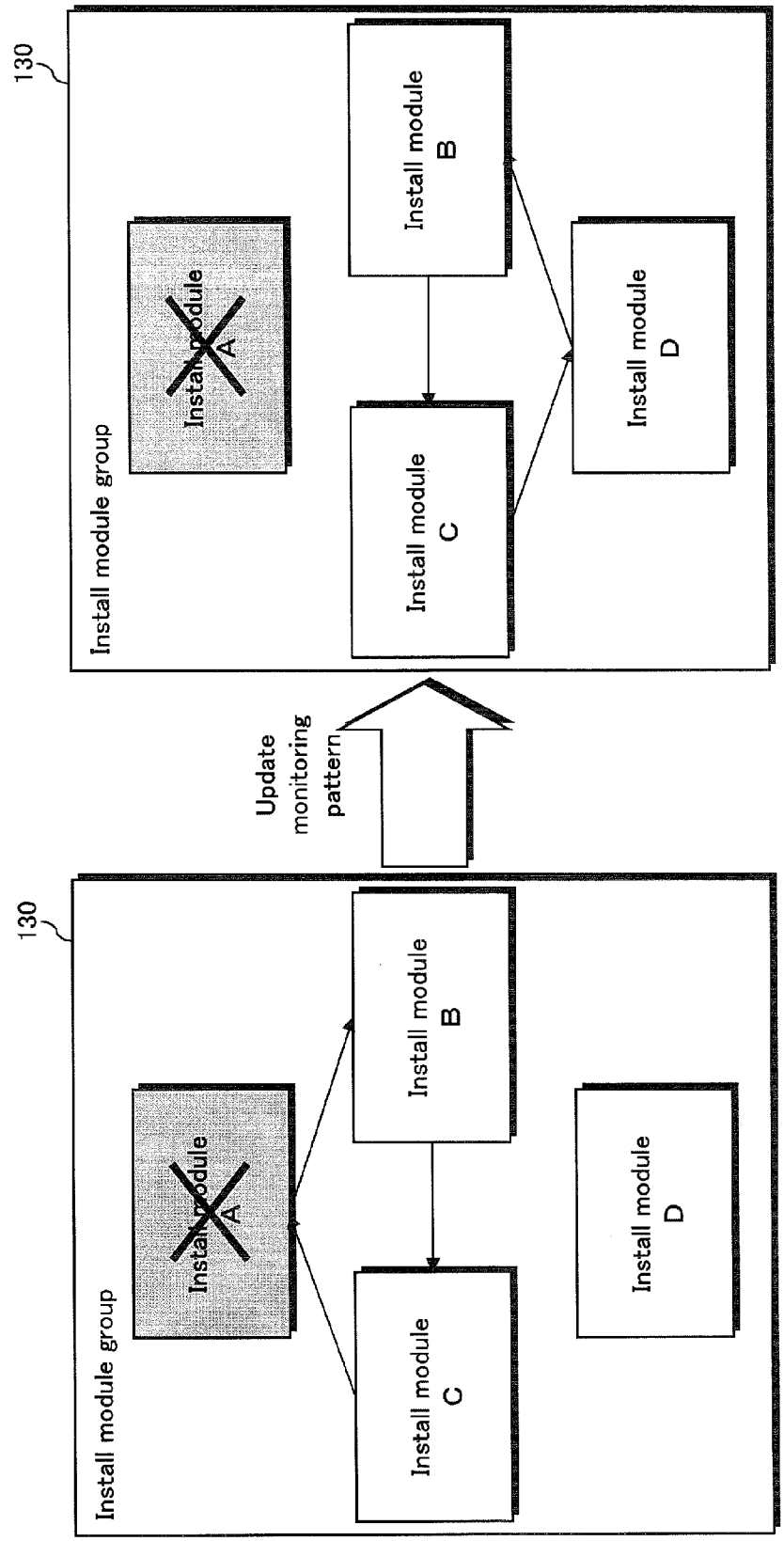
FIG. 40 shows an example of updating a monitoring pattern relating to the first embodiment of the present invention.

As a specific example, the following describes, with reference to FIG. 40, the case where when an install module A is invalidated and an install module D is added, a monitoring pattern is updated.

As shown in FIG. 40A, assume that the install module A monitors an install module B, the install module B monitors an install module C, and the install module C monitors the install module A.

In such a state, assume that the install module A is invalidated and the install module D is added. Since the install module A is invalidated, the install module B is monitored by no install module. Also, since the install module D is newly added, the install module D is monitored by no install module. Therefore, update processing of the monitoring pattern is necessary.

As shown in FIG. 40B for example of a monitoring pattern to be updated, a current monitoring pattern is updated with a monitoring pattern in which the install module B monitors the install module C, the install module C monitors the install module D, and the install module D monitors the install module B.

By updating the monitoring pattern after invalidation processing and addition processing in this way, it is possible to eliminate an install module monitored by no install module, and keep the state in which all the install modules are monitored.

Also, the update server 200 can change the monitoring pattern. This can prevent the monitoring pattern from being revealed, and as a result prevent an install module from being tampered with. Accordingly, it is possible to prevent an unauthentic install module from tampering with the protection control module 120, and prevent an unauthentic protection control module from attacking the applications (110 and 111).

22. Judgment Criterion Stored in Update Server 200

In the first embodiment, the procedure of processing performed by the apparatus 100 differs depending on the status of the apparatus 100. The judgment unit 210 of the update server 200 judges which processing needs to be performed preferentially, based on a judgment criterion stored therein.

Specifically, in the judgment criterion, a priority order of processing to be performed by the apparatus in the case where the protection control module 120 has been tampered with and a priority order of processing to be performed by the apparatus in the case where the protection control module 120 has not been tampered with are in correspondence with each other.

Figure 41:
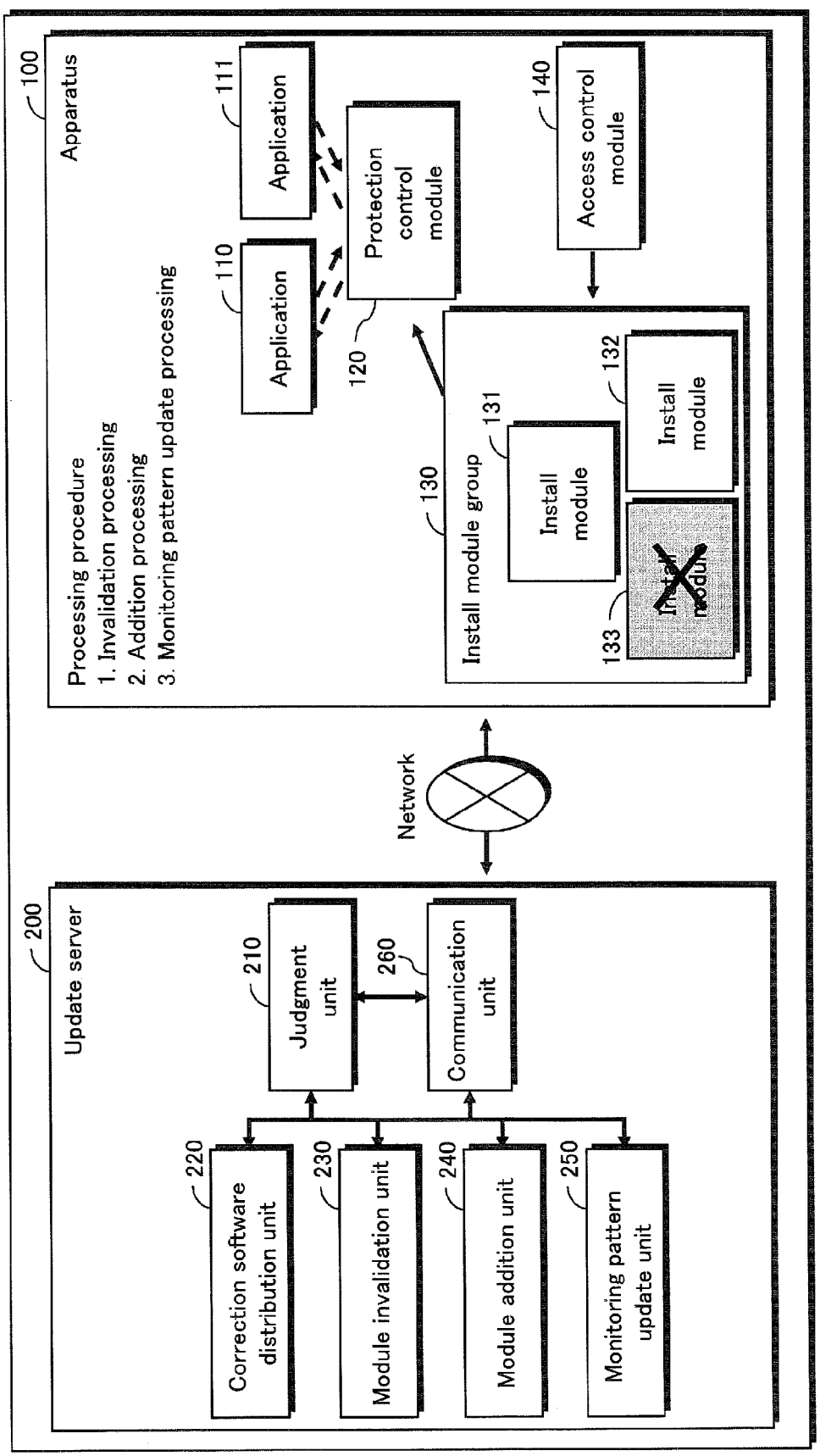
FIG. 41 shows the preference order of processing during normal processing relating to the first embodiment of the present invention.

FIG. 41 shows the procedure of processing in the case where the protection control module 120 has not been tampered with. In the case where the protection control module 120 has not been tampered with, the apparatus 100 performs, on an install module, invalidation processing, addition processing, and monitoring pattern update processing in this order.

For example, in the judgment processing during normal processing, if it is judged that the install module 133 has been tampered with, the apparatus 100 performs invalidation processing of the install module 133. If the number of install modules included in the install module group is no more than a predetermined value as a result of the invalidation of the install module 133, the apparatus 100 performs addition processing of an install module. Also, in order to monitor an install module that has been monitored by the invalidated install module 133 and a newly added install module, the apparatus 100 performs update processing of a monitoring pattern.

Figure 42:
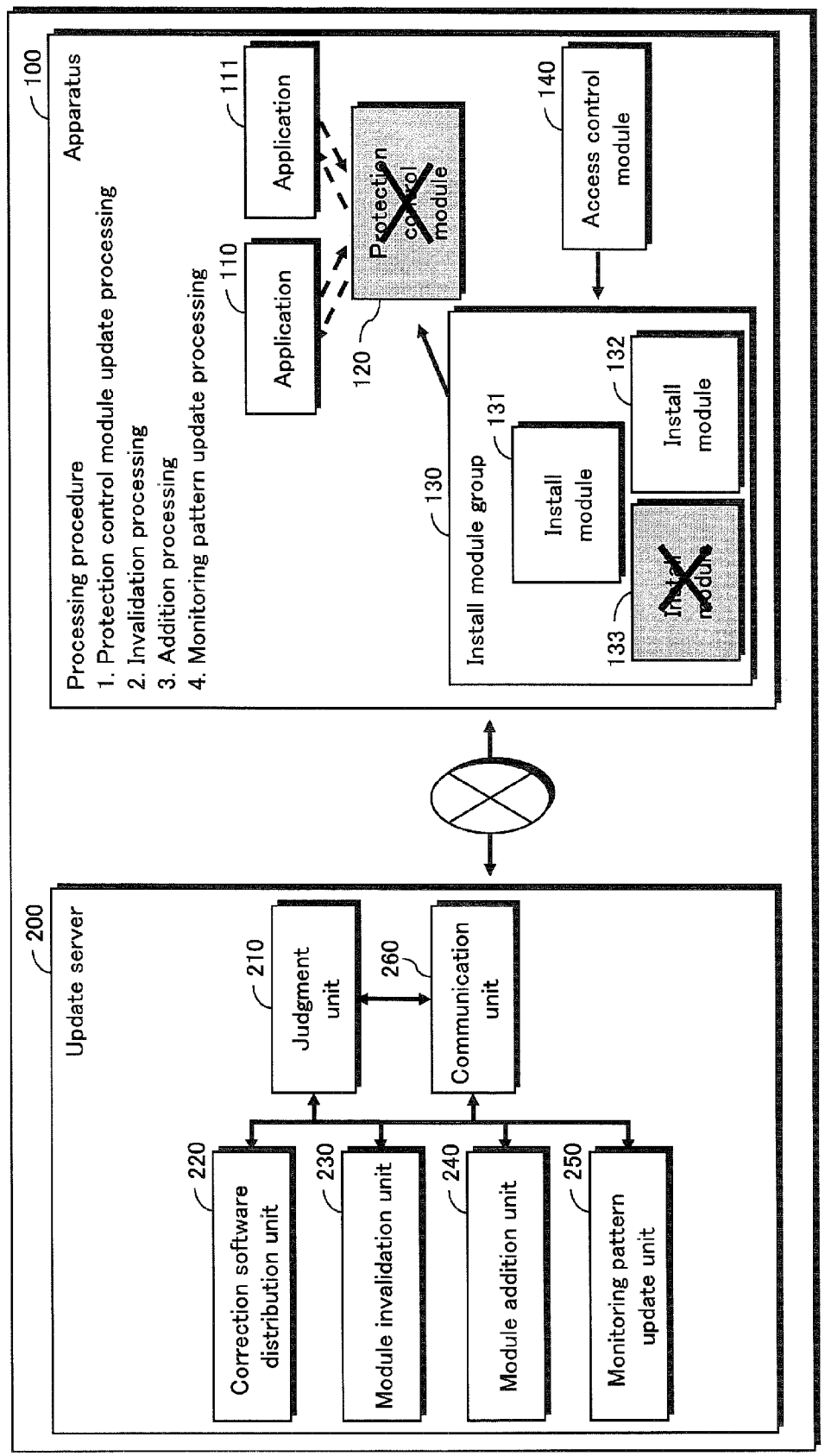
FIG. 42 shows a preference order of processing during the recovery processing relating to the first embodiment of the present invention.

FIG. 42 shows the procedure of processing in the case where the protection control module 120 has been tampered with. In the case where the protection control module 120 has been tampered with, even if it is judged that the install module 133 has been tampered with in mutual monitoring processing during recovery processing, the apparatus 100 performs recovery processing of the protection control module 120 in preference to invalidation processing of the install module 133.

By performing recovery processing of the protection control module 120 in preference to invalidation processing of the install module 133, it is possible to prevent the applications (110 and 111), which essentially need to be protected, from being attacked during invalidation processing of the install module 133 via the protection control module 120 that has been tampered with.

After completing recovery processing of the protection control module 120, the apparatus 100 performs invalidation processing of the install module 133. Furthermore, the apparatus 100 performs addition processing and monitoring pattern update processing of an install module, as necessary.

Second Embodiment

In the first embodiment, monitoring pattern update processing of (S3402) is performed, in order to avoid that invalidation of a certain install module results in an install module monitored by no install module. In the second embodiment, in addition to the processing of the first embodiment, verification as to whether an install module has surely performed update processing of a monitoring pattern is performed by other install module (monitoring module). Accordingly, it is ensured that a monitoring pattern after update is always used. This can prevent an install module, which has a possibility of performing malicious operations because of not being monitored by all other of the install modules based on a monitoring pattern before update for example, from performing such operations. Furthermore, in the second embodiment, the monitoring pattern update unit 250 of the update server 200 generates a monitoring pattern appropriate for the structure of each of the install modules 131 to 133. The following gives the detailed description. The compositional elements that are the same as those in the first embodiment have the same signs attached thereto. Also, the description of processing that has been already provided in the first embodiment is omitted here.

23. Structure of Compositional Elements

Firstly, the structure of the install modules 131 to 133 is described, and then the structure of the monitoring pattern update unit 250 is described.

Figure 43:
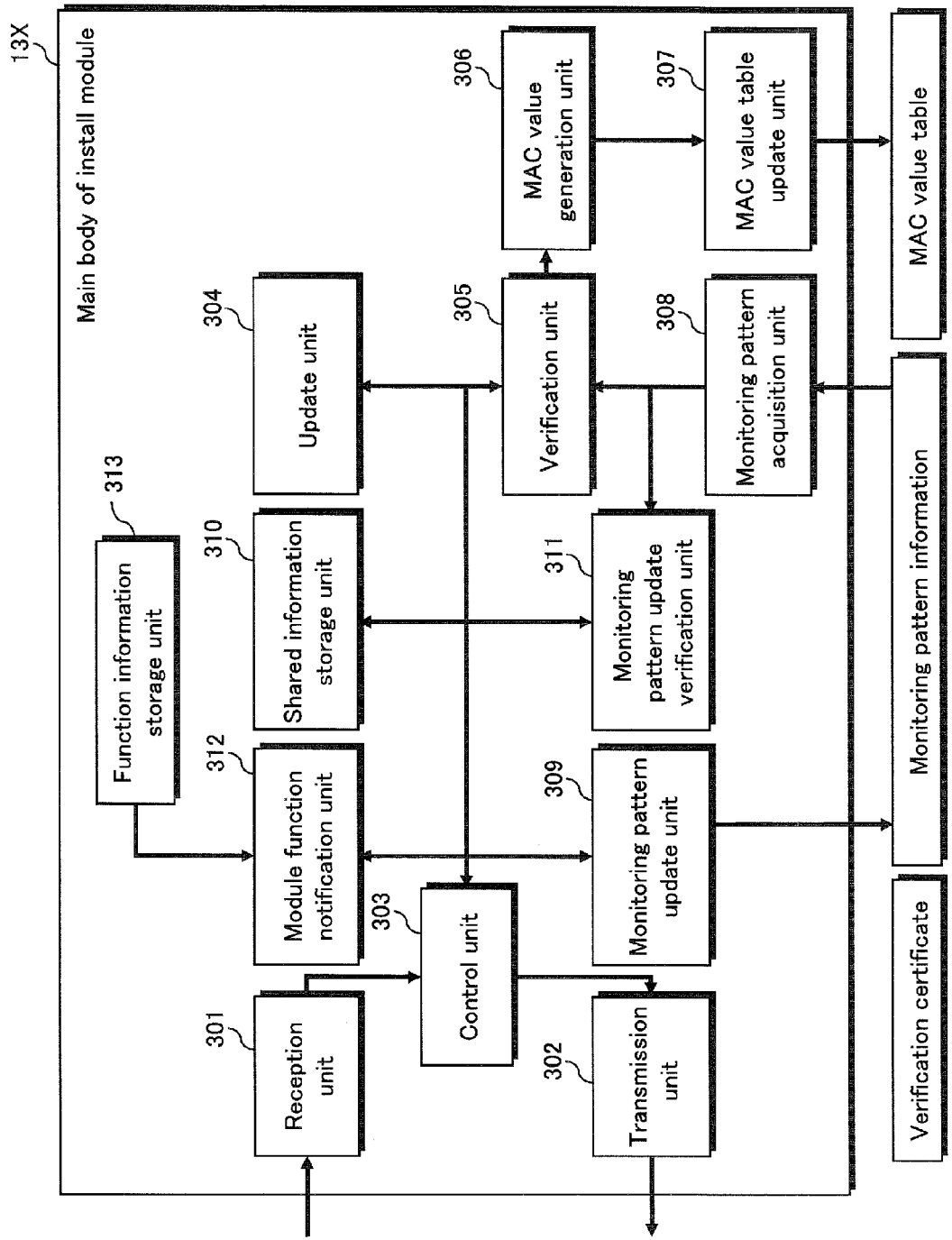
FIG. 43 shows the structure of an install module relating to the second embodiment of the present invention.

FIG. 43 shows the structure of the install modules 131 to 133 relating to the second embodiment of the present invention.

A main body of each of the install modules includes a monitoring pattern update verification unit 311, a module function notification unit 312, and a function information storage unit 313, in addition to the compositional elements included in the main body of the install module according to the first embodiment shown in FIG. 8.

The monitoring pattern update verification unit 311 of each of the install modules acquires a main body of a monitoring pattern of other install module, and verifies whether the other install module has updated its monitoring pattern to an authentic monitoring pattern, with use of the acquired monitoring pattern. Here, a verification target is a monitoring pattern of an install module that is written in a monitoring pattern of each of the install modules. Also, the verification is performed using a verification value list included in monitoring pattern information received from the update server 200. According to the second embodiment, the verification value list includes a verification value for verifying a main body of a monitoring pattern of each of the install modules and a verification value for a main body of a monitoring pattern of an install module that is a monitoring target that is written in the main body of the monitoring pattern of each of the install modules. The verification value is a hash value, a MAC value, or the like. Here, a hash value is used as an example.

Verification of a monitoring pattern of an install module that is a monitoring target is performed using a hash value in the following manner. Firstly, a certain install module acquires a main body of the monitoring pattern of an install module that is a monitoring target, and calculates a hash value of the target install module. Then, the certain install module compares the calculated hash value with a verification value for verifying the monitoring pattern of the target install module included in the monitoring pattern information of the certain install module. If the hash value matches the verification value, it is judged that the monitoring pattern has been updated to an authentic monitoring pattern.

The function information storage unit 313 stores therein function information showing which of three functions of a verification (monitoring) function, an update function, and a shared information storage function is included in each of the install modules. The main body of each of the install modules needs only to have at least one of the three functions.

The module function notification unit 312 notifies the update server 200 of the function information stored in the function information storage unit 313.

Figure 44:
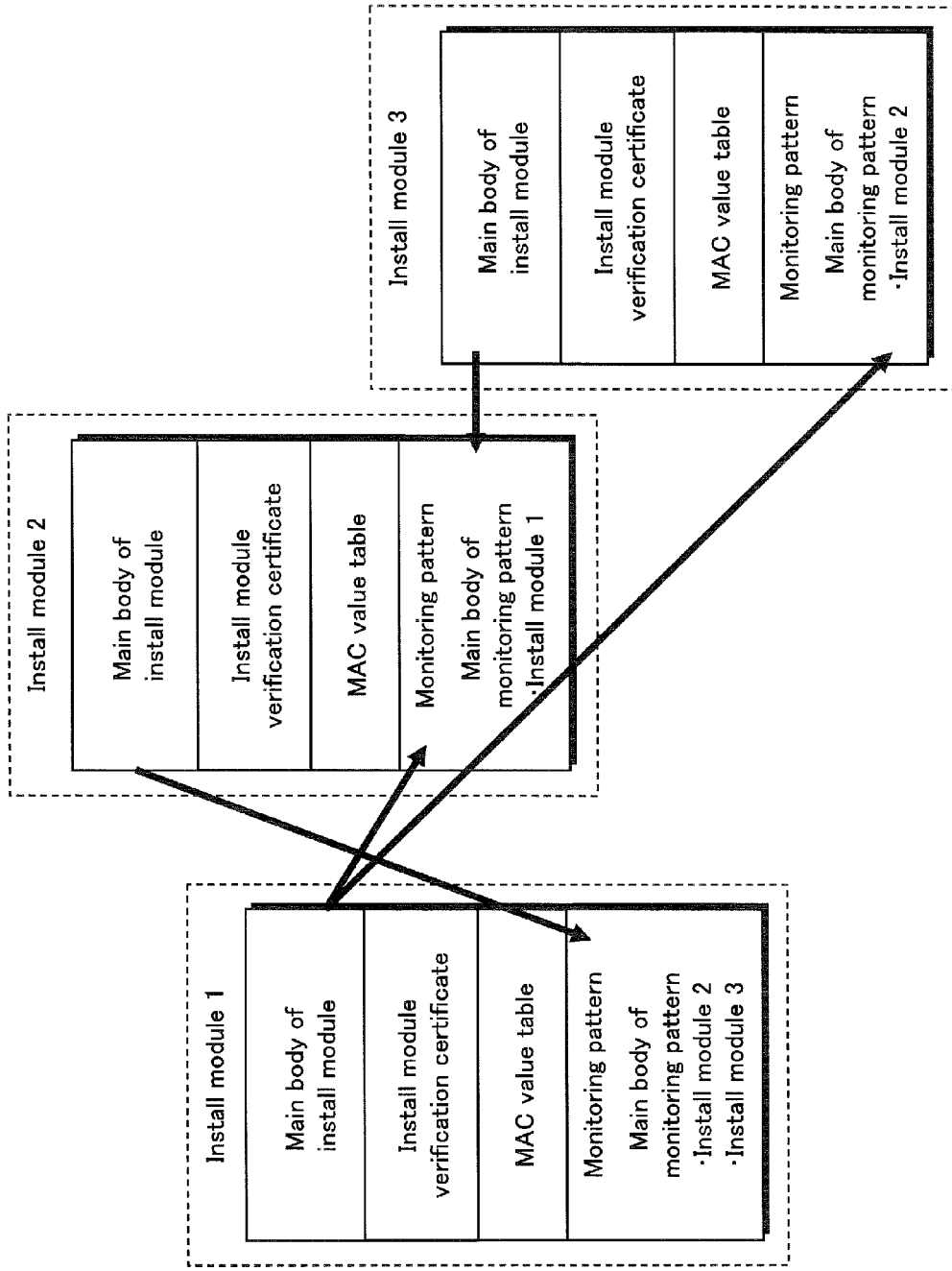
FIG. 44 shows a verification example of the monitoring pattern relating to the second embodiment of the present invention.

FIG. 44 is a diagram showing the correspondence among the install modules with respect to monitoring pattern update verification. FIG. 44 specifically shows a case where three install modules (install modules 1, 2, and 3) are included in the apparatus 100.

Each of the install modules updates a monitoring pattern thereof to a monitoring pattern transmitted from the update server 200. Then, each of the install modules verifies whether other install module has surely updated its monitoring pattern. Information on which install module is a monitoring target is written in a main body of a monitoring pattern of each of the install modules. In the example shown in FIG. 44, the monitoring pattern relating to the install module 1 after update shows that the install module 1 needs to monitor the install module 2 and the install module 3. Also, the monitoring pattern relating to the install module 2 after update shows that the install module 2 needs to monitor the install module 1. The monitoring pattern relating to the install module 3 after update shows that the install module 3 needs to monitor the install module 2.

Verification of the monitoring pattern is performed using a verification value list transmitted together with the main body of the monitoring pattern from the update server 200. A verification value list stores therein verification values to be used for verifying a monitoring pattern.

In the example shown in FIG. 44, a verification value list of the install module 1 stores therein verification values for verifying update of the monitoring patterns of the install modules 2 and 3. Also, a verification value list of the install module 2 stores therein verification values for verifying update of the monitoring patterns of the install module 1. Also, a verification value list of the install module 3 stores therein verification values for verifying update of the monitoring patterns of the install module 2.

Next, the monitoring pattern update unit 250 is described.

Figure 45:
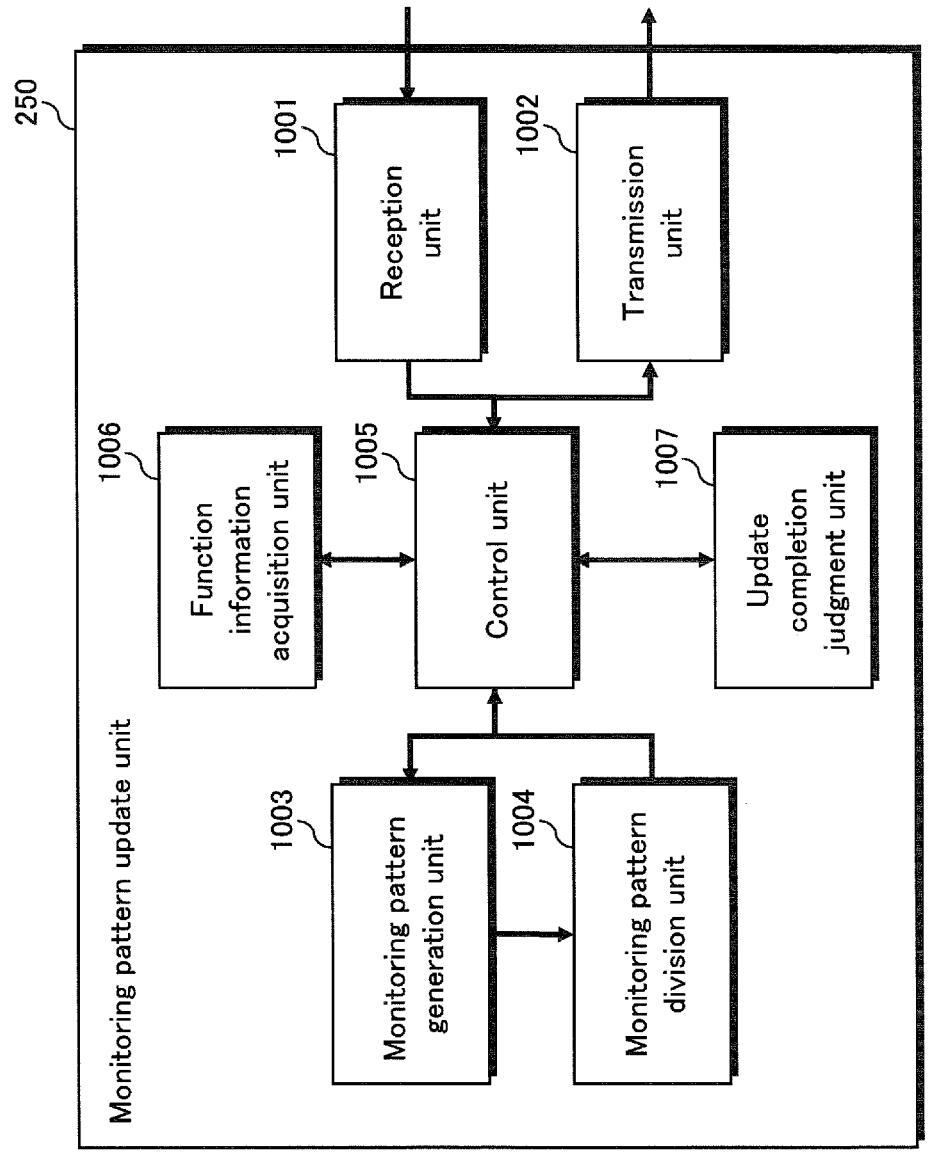
FIG. 45 shows the structure of a monitoring pattern update unit 250 relating to the second embodiment of the present invention.

FIG. 45 is a block diagram showing the structure of the monitoring pattern update unit 250.

As shown in FIG. 45, the monitoring pattern update unit 250 of the second embodiment includes a function information acquisition unit 1006 and an update completion judgment unit 1007, in addition to the compositional elements of the monitoring pattern update unit 250 of the first embodiment described using FIG. 15.

The function information acquisition unit 1006 acquires information (function information) showing what function each of the install modules 131 to 133 included in the apparatus 100 has from each of the install modules 131 to 133. The function information specifically shows at least one of a verification (monitoring) function, an update function, and a shared information storage function that may be included in each of the install modules.

The monitoring pattern generation unit 1003 generates a new monitoring pattern for the whole monitoring module group based on the function information acquired by the function information acquisition unit 1006. The monitoring pattern generation unit 1003 generates the new monitoring pattern such that each of the monitoring modules is monitored by at least another one of the monitoring modules. An example of the monitoring pattern is described with reference to FIG. 62.

Figure 62:
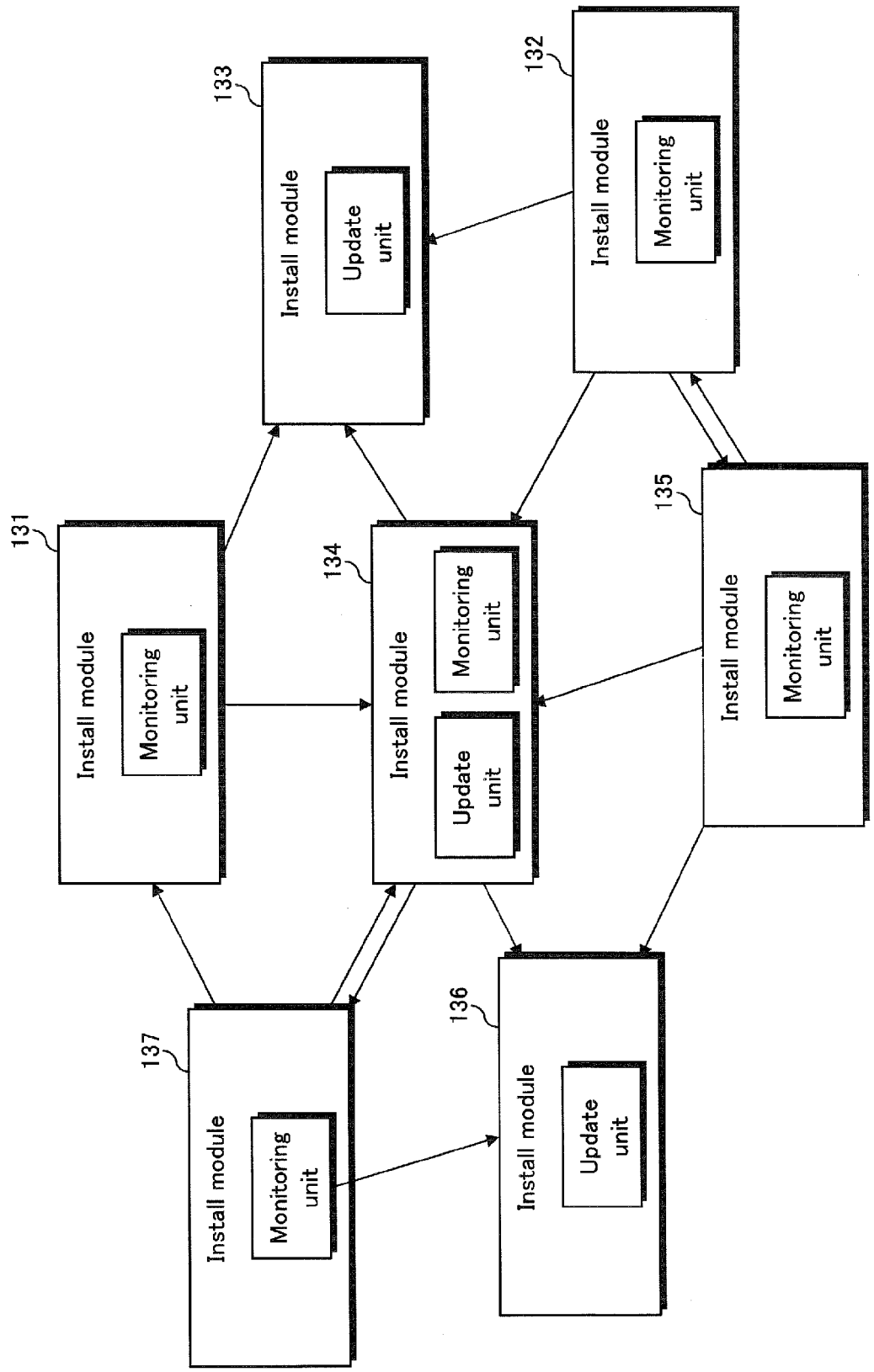
FIG. 62 is a pattern diagram showing which install module is monitored and which install module monitors in mutual monitoring relating to the second embodiment of the present invention.

FIG. 62 is a pattern diagram showing which install module is monitored by each of the install modules in accordance with a new monitoring pattern. The above description has been provided using the example where the number of install modules included in the install module group is three (the install modules 131 to 133). In FIG. 62, in order to increase the variation of install modules, description is given using a case where the number of install modules included in the install module group is seven (install modules 131 to 137). Here, in FIG. 62, an install module having a verification (monitoring) function includes a monitoring unit that realizes the verification (monitoring) function, and an install module having an update function includes an update unit that realizes the update function. Also, in FIG. 62, an install module having both the verification (monitoring) function and the update function includes the monitoring unit and the update function that realize the verification (monitoring) function and the update function, respectively. In the above description of the structure of install module, each of the install modules includes both the monitoring unit and the update unit. Alternatively, an install module that includes only one of the monitoring unit and the update unit may be included in the install module group.

The monitoring pattern shown in FIG. 62 is structured in accordance with the following rule.

Firstly, each of the install modules 131, 132, 135, and 137 including only the monitoring unit is monitored by at least another one of install modules each including the monitoring unit. Also, each of the install modules 133 and 136 each including only the update unit is monitored by at least two install modules each including the monitoring unit. The install module 134 including both the monitoring unit and the update unit is monitored by all other monitoring units except the monitoring unit included therein. This rule is based on that the necessity that an update unit of an install module that updates other install module needs to be managed more strictly than a monitoring unit of an install module that monitors whether other install module performs malicious operations. Furthermore, an install module that includes both the monitoring unit and the update unit (monitoring module) needs to be managed more strictly than an install module that includes only the update unit.

The more the number of install modules that monitor other install module increases, the more the security of an install module that is monitored improves. However, processing performed by each of the install modules becomes complicated, and processing load of hardware such as a processor increases. Accordingly, it is only necessary to generate the most appropriate monitoring pattern depending on the processing capability of the system, for example.

Also, since the update function needs to be surely operated during recovery processing, a monitoring pattern to be used in the recovery processing may be generated such that an install module having only the update function is monitored by more install modules, and an install module having both the verification (monitoring) function and the update function does not monitor other install module. In this way, by storing not one monitoring pattern but a plurality of monitoring patterns, the monitoring patterns may be separately used depending on processing, situation, or the like.

Next, the monitoring pattern division unit 1004 divides the (whole) new monitoring pattern generated by the monitoring pattern generation unit 1003 into monitoring patterns respectively corresponding to the install modules to generate a new monitoring pattern for each install module.

In the case shown in FIG. 62, since the install module 131 monitors the install modules 133 and 134, a new monitoring pattern relating to the install module 131 includes an identifier for identifying each of the install modules 133 and 134. Also, since the install module 134 monitors the install modules 133, 136, and 137, a new monitoring pattern relating to the install module 134 includes an identifier for identifying each of the install modules 133, 136, and 137.

The update completion judgment unit 1007 receives a result of mutual monitoring of the install modules 131 to 133 (result of monitoring pattern update verification or the like), and judges whether a monitoring pattern has been surely updated in each of the install modules. If judging that the monitoring pattern has been surely updated, the update completion judgment unit 1007 ends the monitoring pattern update processing. If judging that the monitoring pattern has not been surely updated, the update completion judgment unit 1007 again performs monitoring pattern update processing. Here, in the monitoring pattern update processing, each install module 13x may store a backup of a monitoring pattern that has not been updated. Then, when it is confirmed that a monitoring pattern of each of the install modules has been updated, the backup of the monitoring pattern may be deleted.

24. Operations of Monitoring Pattern Update Processing

Figure 46:
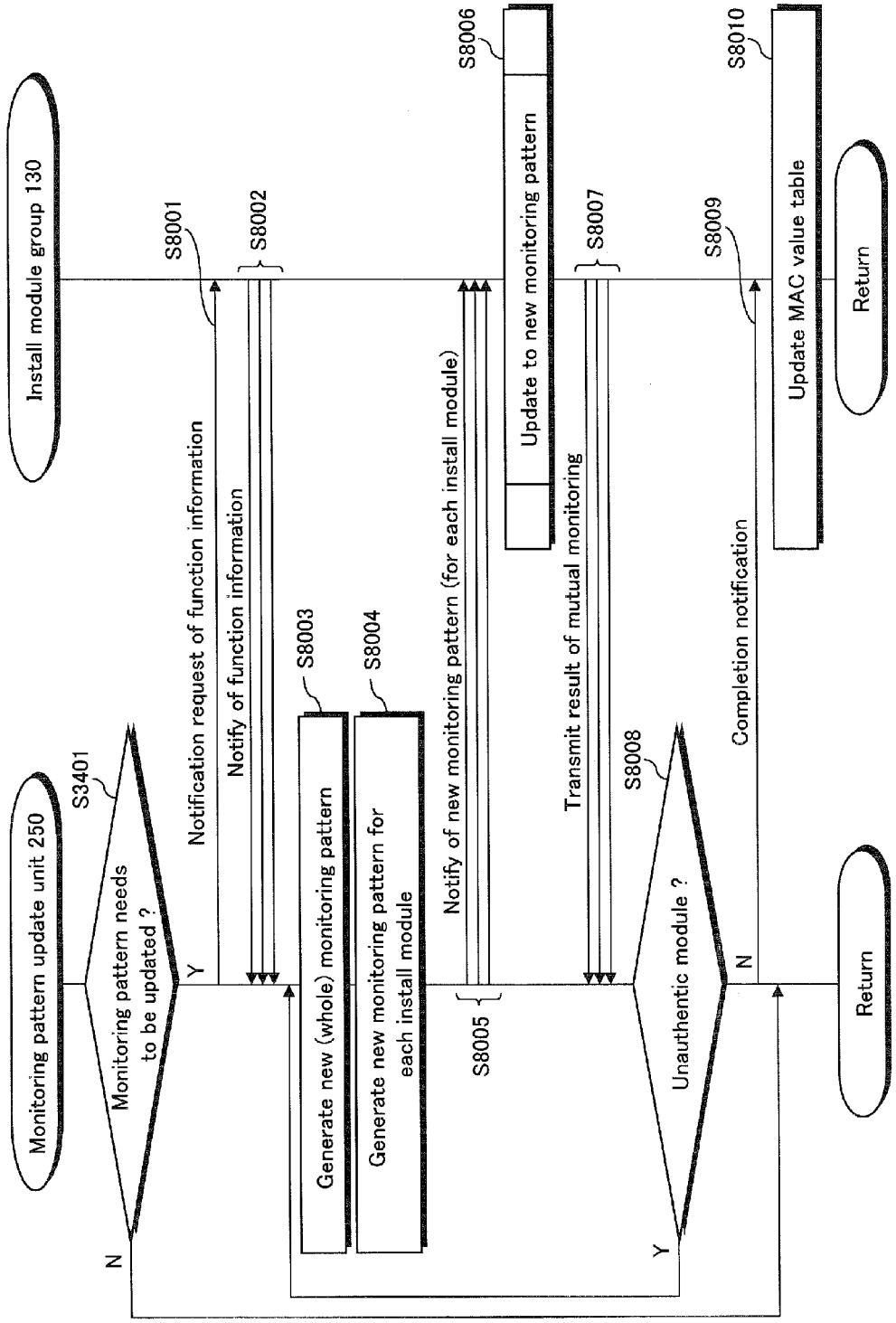
FIG. 46 is a sequence diagram of monitoring pattern update processing relating to the second embodiment of the present invention.

The following describes the operations of the monitoring pattern update processing in the software update system 10, with reference to the flow chart shown in FIG. 46.

If the judgment unit 210 included in the update server 200 judges that the monitoring pattern needs to be updated (S3401), the monitoring pattern update unit 250 of the update server 200 and the install modules 131 to 133 of the apparatus 100 each start update processing of the monitoring pattern.

Firstly, the function information acquisition unit 1006 included in the monitoring pattern update unit 250 of the update server 200 transmits a function information notification request to each of the install modules included in the apparatus 100, in order to acquire function information of the install module necessary for generating a monitoring pattern (S8001).

In each of the install modules 131 to 133, when the function information notification request is received, the module function notification unit 312 acquires the function information stored in the function information storage unit 313, and notifies the monitoring pattern update unit 250 of the function information (S8002).

Upon receiving the notification of the function information, the monitoring pattern update unit 250 generates a new (whole) monitoring pattern based on the function information, using the monitoring pattern generation unit 1003.

Next, the monitoring pattern division unit 1004 divides the new (whole) monitoring pattern generated by the monitoring pattern generation unit 1003 into monitoring patterns respectively for the install modules to generate a new monitoring pattern for each install module (S8004). The generated new monitoring pattern is transmitted to a corresponding one of the install modules (S8005).

Upon receiving the new monitoring pattern, each of the install modules updates a monitoring pattern thereof, and verifies whether other install module has surely updated its monitoring pattern (S8006), and transmits a result of the verification (result of mutual monitoring) to the monitoring pattern update unit 250 (S8007). The details of monitoring pattern update processing (S8006) in each of the install modules are described later.

Upon receiving the result of the mutual monitoring, the monitoring pattern update unit 250 judges whether monitoring pattern update processing completes based on a result of mutual monitoring, using the update completion unit 1007. As a result, if there is an unauthentic install module that has not surely updated its monitoring pattern, the monitoring pattern update unit 250 generates a new (whole) monitoring pattern in which monitoring targets are install modules except the unauthentic install module (S8003). If there is no unauthentic install module, the monitoring pattern update unit 250 transmits a completion notification of the monitoring pattern update processing to each of the install modules 131 to 133 (S8009).

Each of the install modules 131 to 133 receives the completion notification of the monitoring pattern update processing. Since a monitoring pattern of other install module has been updated, each of the install modules 131 to 133 re-calculates its MAC value, and updates its MAC value table (S8010).

Figure 47:
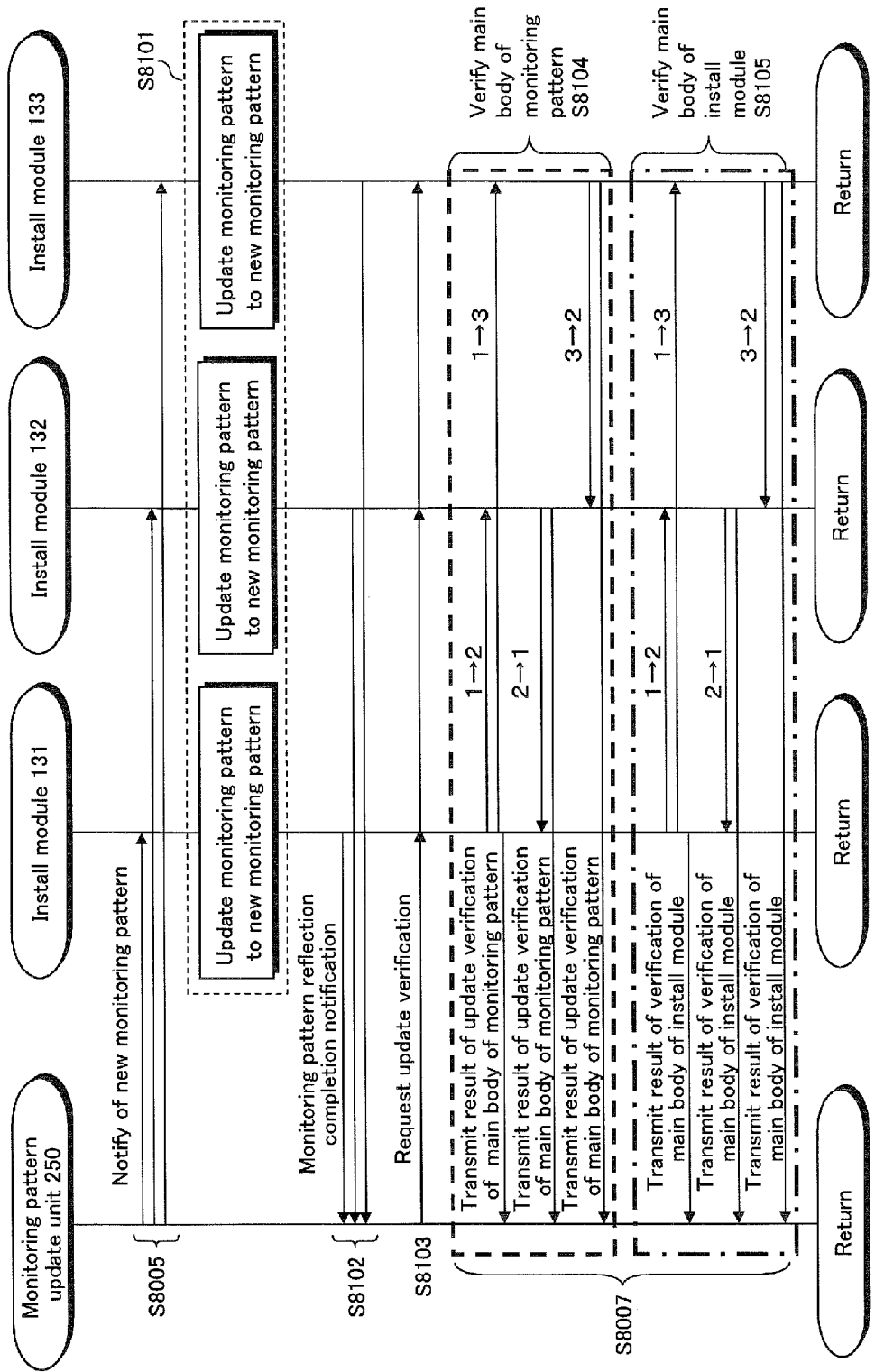
FIG. 47 is a sequence diagram of update processing to a new monitoring pattern relating to the second embodiment of the present invention.

Next, the details of monitoring pattern update processing (S8006) performed in each of the install modules are described, with reference to the flow chart shown in FIG. 47. Here, description is given with respect to the case where the number of install modules included in the install module group is three, in the same way as the case shown in FIG. 44. Note that in the case where the number of install modules and a monitoring pattern to be updated are different from those in the description, the method shown in the following description is also used.

Firstly, the monitoring pattern update unit 250 notifies each of the install modules of a new monitoring pattern. Upon receiving the new monitoring pattern, each of the install modules updates monitoring pattern information thereof to the received new monitoring pattern, using the monitoring pattern update unit 309 (S8101). After performing the update, each of the install modules verifies whether the monitoring pattern thereof has been surely updated using the verification list, and notifies the update server 200 of completion of verification of the monitoring pattern (S8102).

Upon receiving the completion of the verification of the monitoring pattern from the install module, the monitoring pattern update unit 250 of the update server 200 requests each of the install modules to perform update verification (S8103).

Upon receiving the update verification request, each of the install modules verifies a main body of a monitoring pattern of an install module that is written in the updated new monitoring pattern (S8104). For example, if the monitoring pattern is updated as shown in FIG. 44, the install module 1 verifies of update of the monitoring patterns of the install module 2 and the install module 3. The install module 2 verifies update of a monitoring pattern of the install module 1. The install module 3 verifies update of the monitoring pattern of the install module 2. Verification of the main body of the monitoring pattern is performed using a verification value stored in the verification value list of the monitoring pattern information received from the update server 200. After completing the verification, each of the install modules transmits a result of the verification to the update server 200.

After completing the verification of the monitoring pattern, each of the install modules verifies a main body of an install module written in a main body of the updated new monitoring pattern (S8105). Verification of the main body of the install module is performed using an install module verification certificate. After completing the verification, each of the install modules transmits a result of the verification to the update server 200.

This completes the monitoring pattern update processing in each of the install modules. Then, as described above, the monitoring pattern update unit 250 receives a result of update verification of the monitoring pattern and a result of verification of the main body of the install module, as a result of mutual monitoring. The update completion judgment unit 1007 performs processing of judging whether the update completes.

Third Embodiment

In the above first embodiment, shared information is generated for an encryption/decryption key based on the secret sharing scheme, and each of the install modules stores therein shared information allocated thereto. In the third embodiment, each of the install modules has additionally a function of storing therein not only shared information allocated thereto but also shared information allocated to other install module. With this function, if part of the install modules is invalidated, it is possible to recover an encryption/decryption key from any remaining of the install modules. Accordingly, even if an install module becomes tampered with due to recovery of an encryption/decryption key, it is possible to continue operations using only an authentic install module without invalidating the tampered install module. The following describes the details of the processing relating to the third embodiment.

Figure 48:
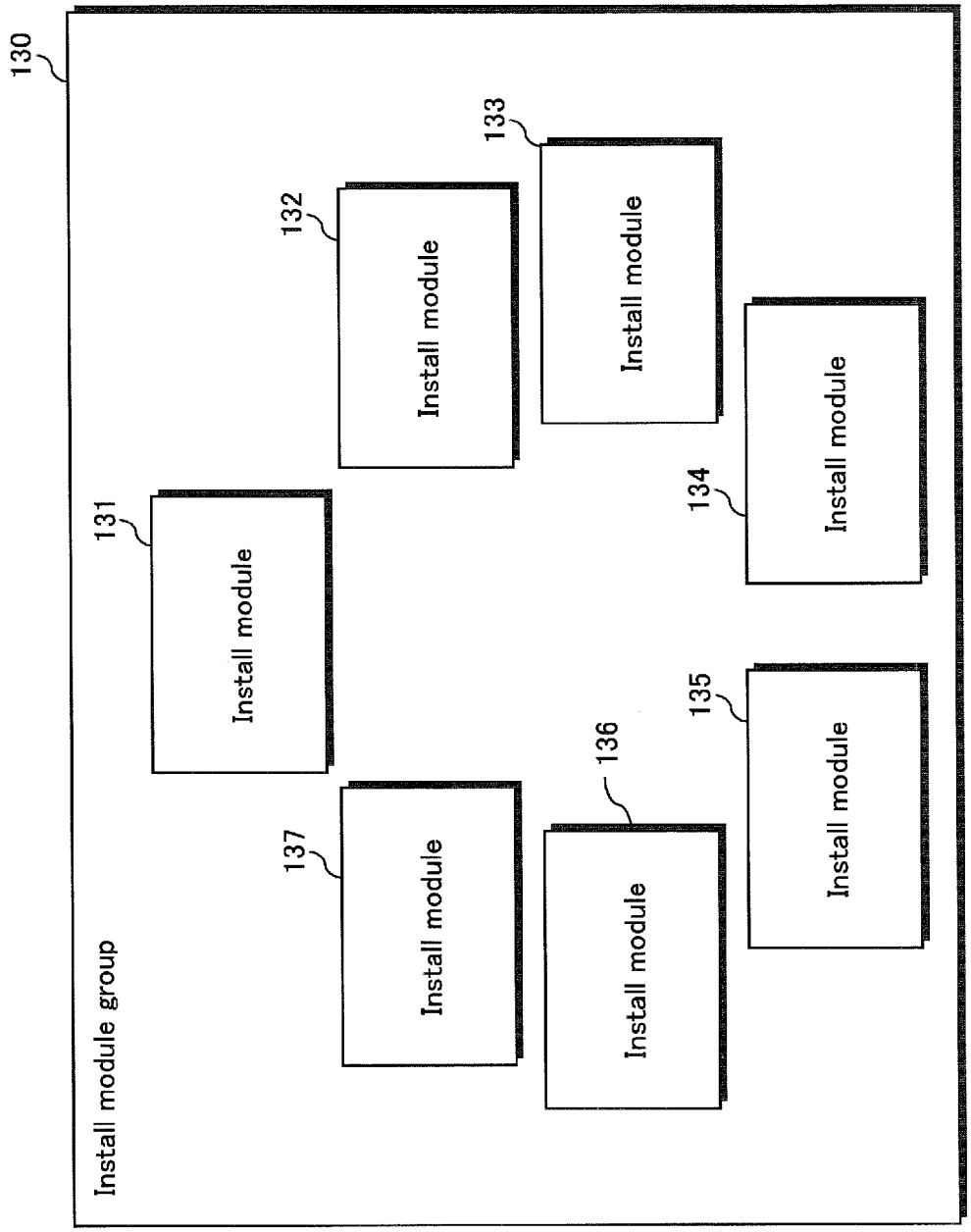
FIG. 48 shows the structure of an install module group 130 relating to a third embodiment of the present invention.

FIG. 48 shows the structure of the install module group 130.

Figure 49:
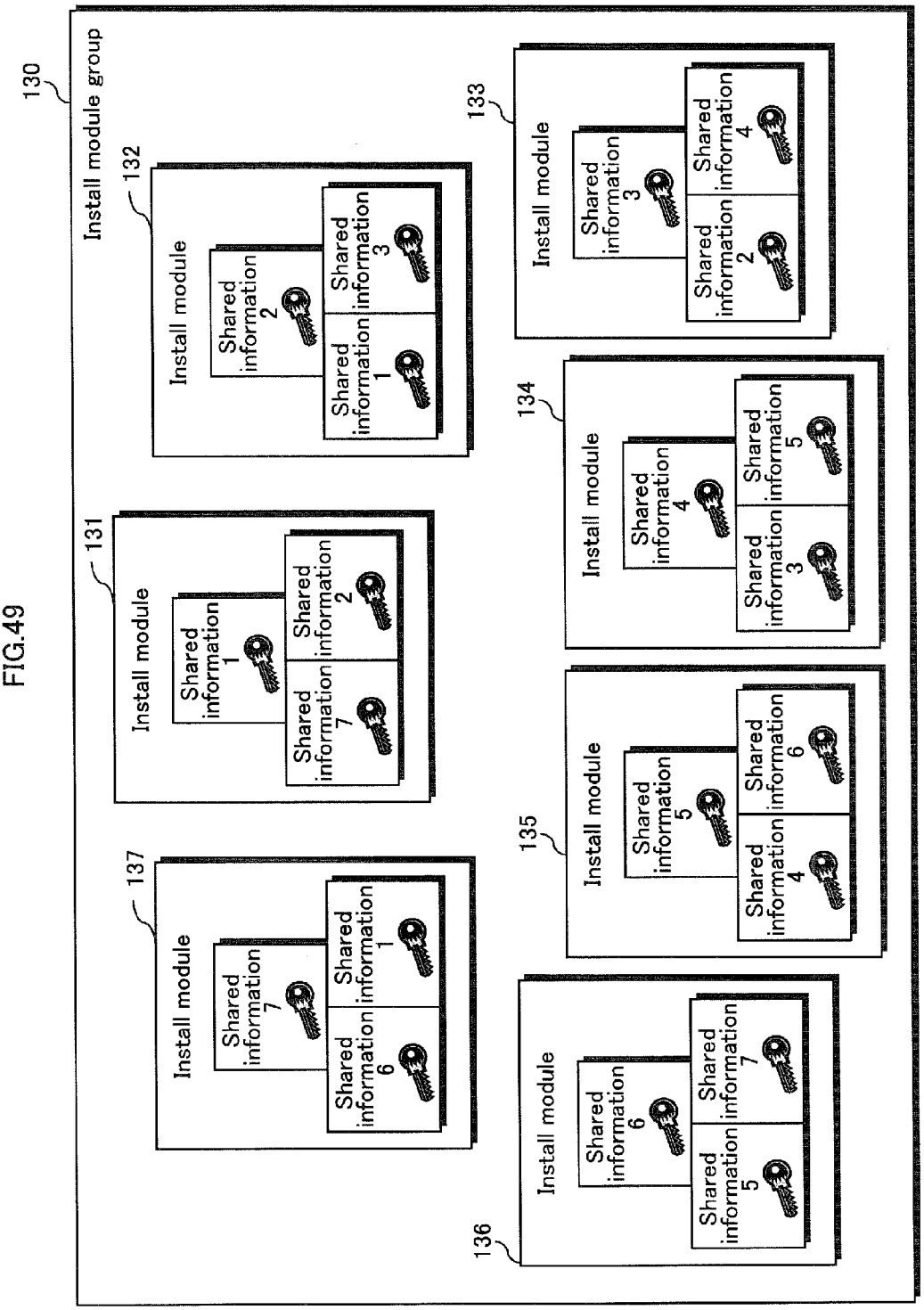
FIG. 49 shows an example of the structure of shared information stored in an install module relating to the third embodiment of the present invention.

FIG. 49 shows sharing of shared information among install modules in the case where each of the install modules stores therein not only its shared information but also shared information of install modules adjacent thereto.

In the third embodiment, the number of install modules included in the install module group is seven as an example, as shown in FIG. 48 and FIG. 49.

Although the initial design processing (FIG. 18) described in the first embodiment is also performed in the third embodiment, the difference from the first embodiment lies in that the protection control module 120 generates shared information from an encryption/decryption key based on the secret sharing scheme (S1002) in the initial design processing. Here, as shown in FIG. 49, shared information of each of the install modules is transmitted to the install module together with shared information of install modules adjacent to the install module. For example, the install module 131 stores therein shared information 1 that is shared information thereof and shared information 2 of an install module 2 adjacent to the install module 131 and shared information 7 of an install module 7 adjacent to the install module 131. By performing this processing, even if the install module 132 becomes tampered with, it is possible to recover the encryption/decryption key because the install module 131 stores therein the shared information 2.

Next, the following describes judgment processing in the case where an install module stores therein shared information of adjacent install modules, with reference to the drawing. In the following description, the processing that is the same as the processing according to the first embodiment has the same sign attached thereto, and the detailed description is omitted here.

25. Invalidation Judgment Processing During Normal Processing

Firstly, the invalidation judgment processing during normal processing is described.

Figure 50:
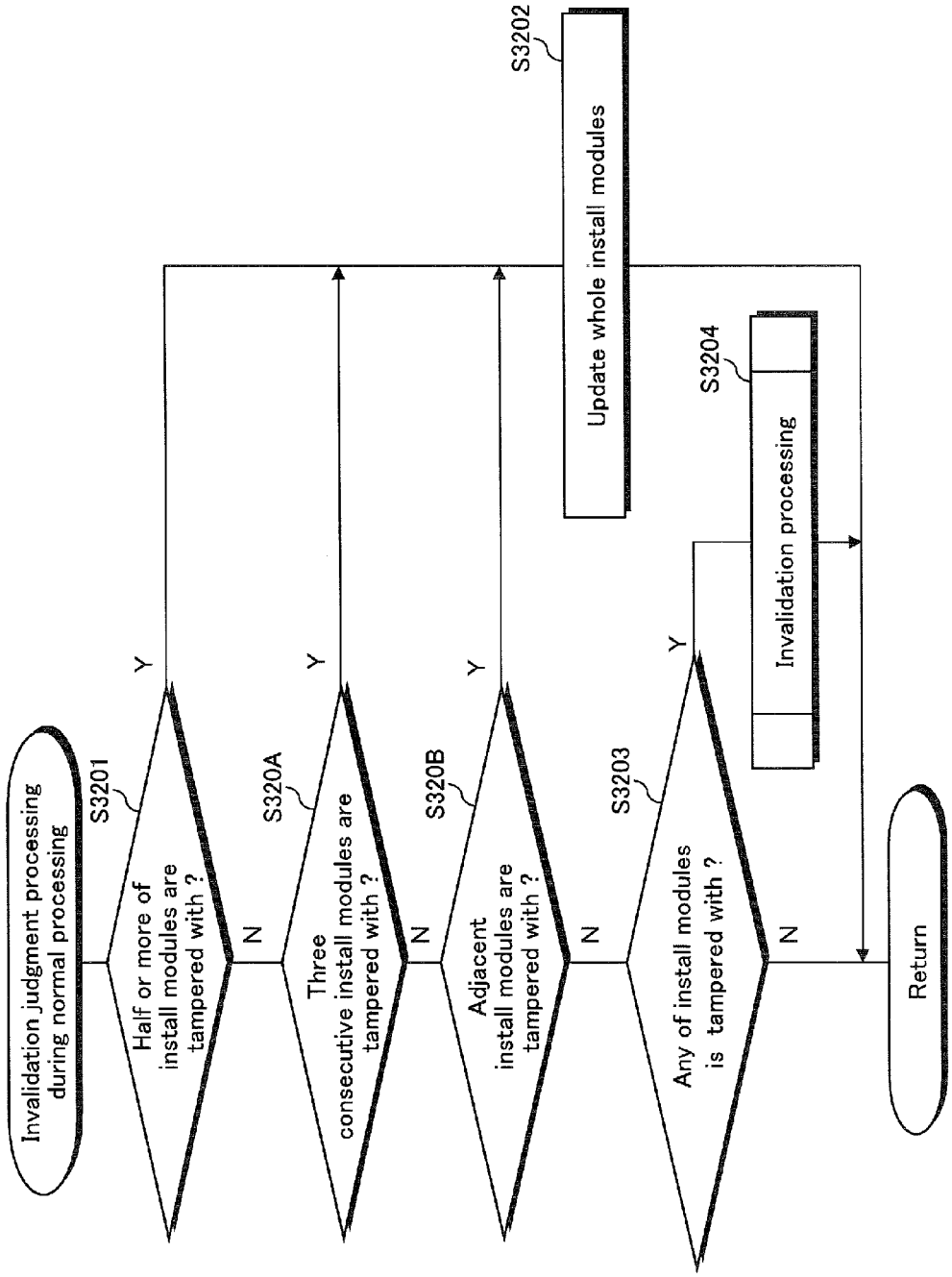
FIG. 50 is a flow chart of analysis/judgment processing (invalidation judgment processing during normal processing) relating to the third embodiment of the present invention.

FIG. 50 is a flow chart of invalidation judgment processing during normal processing of the judgment processing during normal processing.

In FIG. 50, the processing that is the same as the invalidation judgment processing during normal processing (FIG. 24) according to the first embodiment has the same sign attached thereto, and the detailed description is omitted here.

Figure 51:
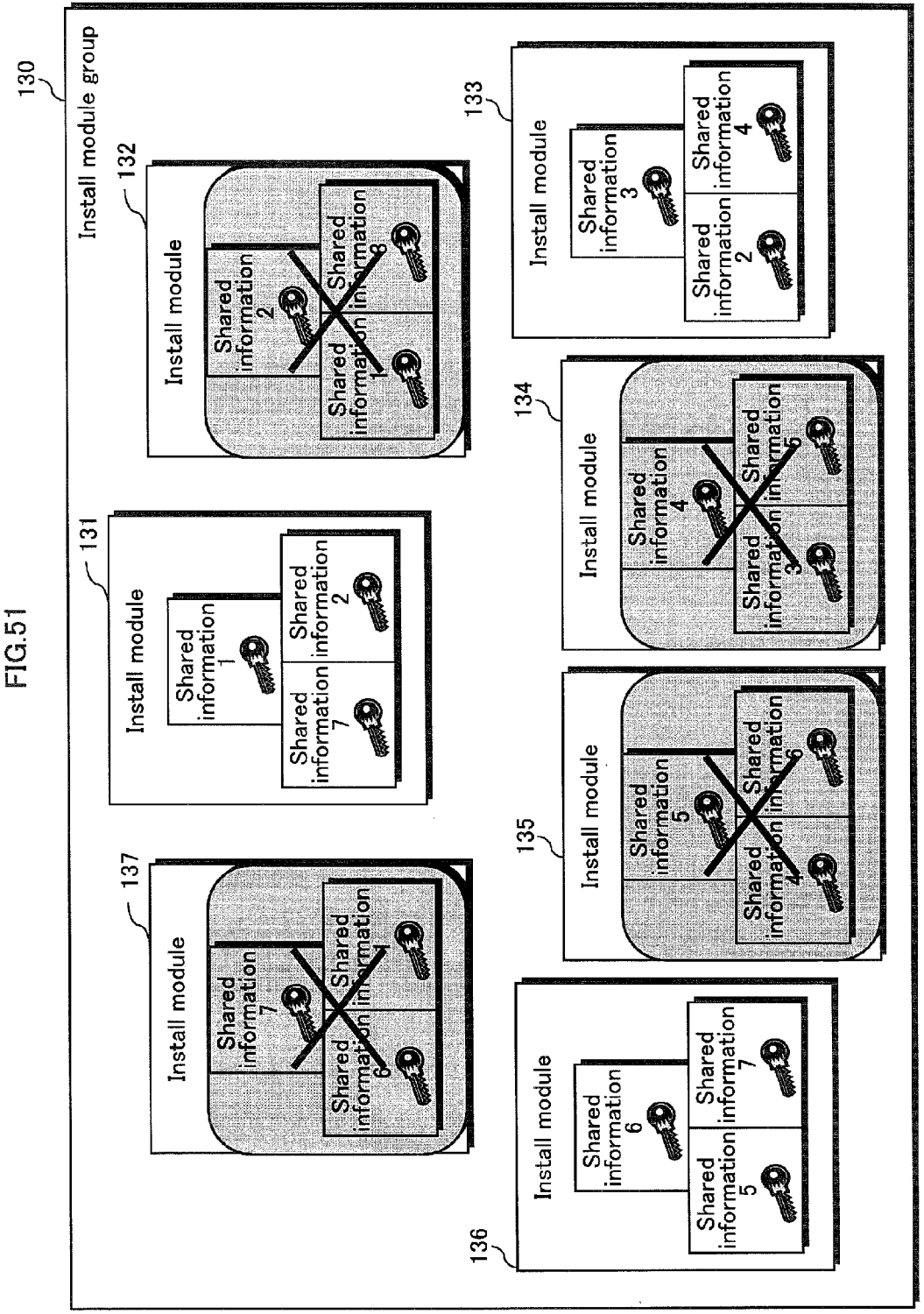

FIG. 51 shows an example where half or more of install modules included in the install module group 130 are tampered with.

In the invalidation judgment processing during normal processing, the judgment unit 210 judges whether half or more of install modules included in the install module group 130 are tampered with, as shown in FIG. 51 (S3201). If judging that half or more of install modules included in the install module group 130 are tampered with, the judgment unit 210 generates an instruction to update the whole install module group 130 using the instruction generation unit 603 included therein, and updates the install module (S3202).

Also, the judgment unit 210 judges whether three consecutive install modules are tampered with (S320A). If judging that three consecutive install modules are tampered with, the judgment unit 210 generates an instruction to update the whole install module group 130 using the instruction generation unit 603 included therein, to update the whole install modules.

Figure 52:
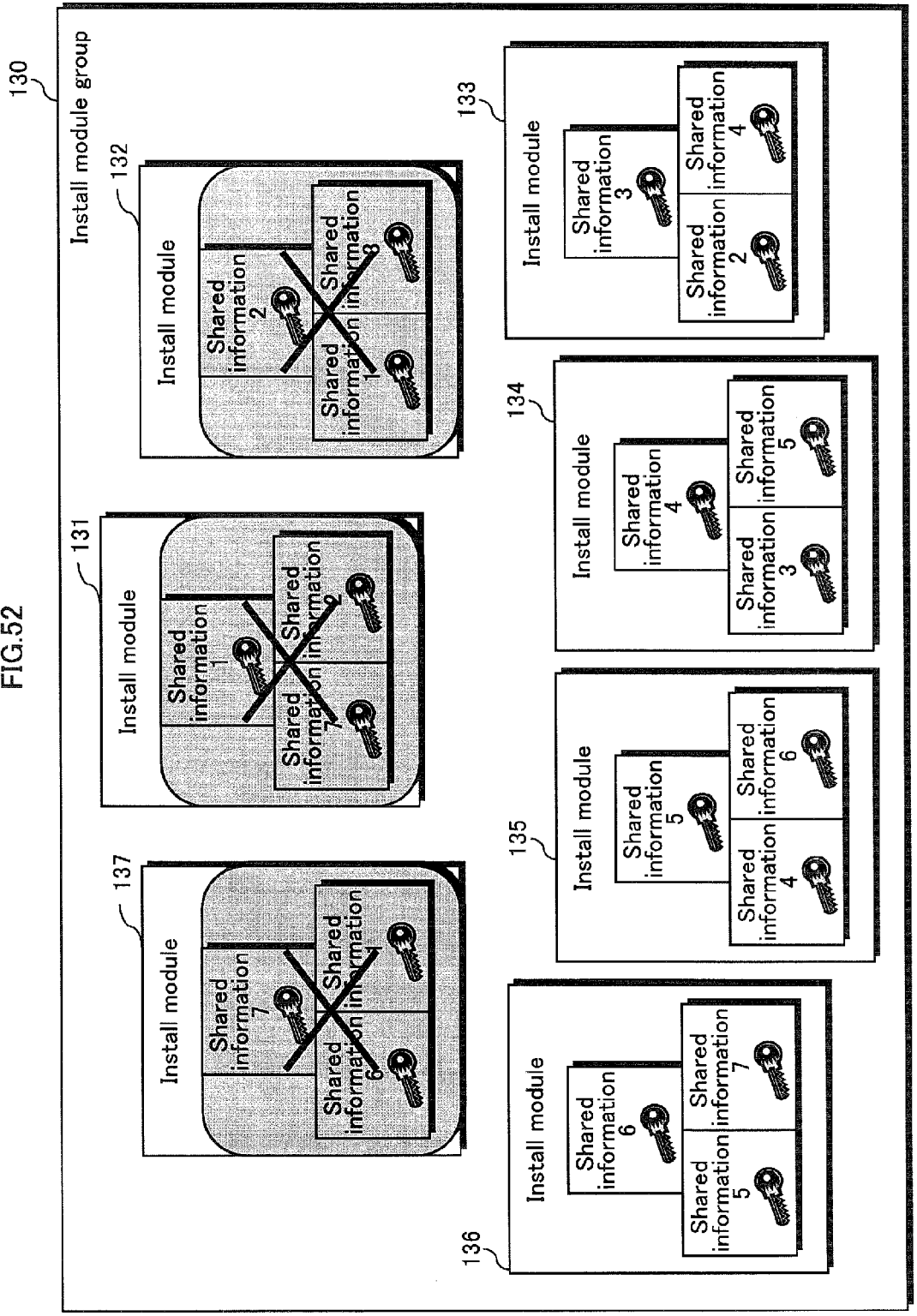

FIG. 52 shows an example where three install modules 131, 132, and 137 included in the install module group 130 are tampered with. Here, a relationship among three consecutive install modules means a relationship in which install modules have the same shared information, such as a relationship in which the install modules 131, 132, and 137 have the same shared information 1. In the case where the install modules 131, 132, and 137 have been tampered with and tampered with, it is impossible to acquire shared information 1 of the install module 131 and recover an encryption/decryption key. Accordingly, the protection control module 120 needs to update the whole install modules and re-distribute the encryption/decryption key. Specifically, after updating the whole install modules in the same way as in S3202, the judgment unit 210 notifies the protection control module 120 of updating of the whole install modules and re-distribution of the encryption/decryption key. Then, the protection control module 120 decrypts the applications (110 and 111) using the current encryption/decryption key, updates the encryption/decryption key, and encrypts the applications (110 and 111) using a new encryption/decryption key. Furthermore, the protection control module 120 generates shared information from the encryption/decryption key based on the secret sharing scheme, and further generates a certificate using the signature secret key (encryption/decryption key certificate) for checking whether the encryption/decryption key has been surely recovered (encryption/decryption key certificate). The judgment unit 210 transmits the shared information, the encryption/decryption key certificate, shared information of the adjacent install modules, and the encryption/decryption key certificate to each of the install modules 131 to 137.

Regarding the method of generating shared information from an encryption/decryption key based on the secret sharing scheme and the method of transmitting shared information to an install module, the detailed descriptions are found in pages 47 to 49 of the Patent Document 2. Accordingly, the description thereof is omitted here. Also, by corresponding the secret key d, the authentication device, and the shared information storage apparatus in the Patent Document 2 respectively to the encryption/decryption key, the protection control module 121, and the install modules 131, 132, and 133 in the third embodiment, it is possible to use the same methods used in the Patent Document 2.

Also, if judging that three consecutive install modules are not tampered with and adjacent install modules are tampered with, the judgment unit 210 updates the whole install modules (S320B).

Figure 53:
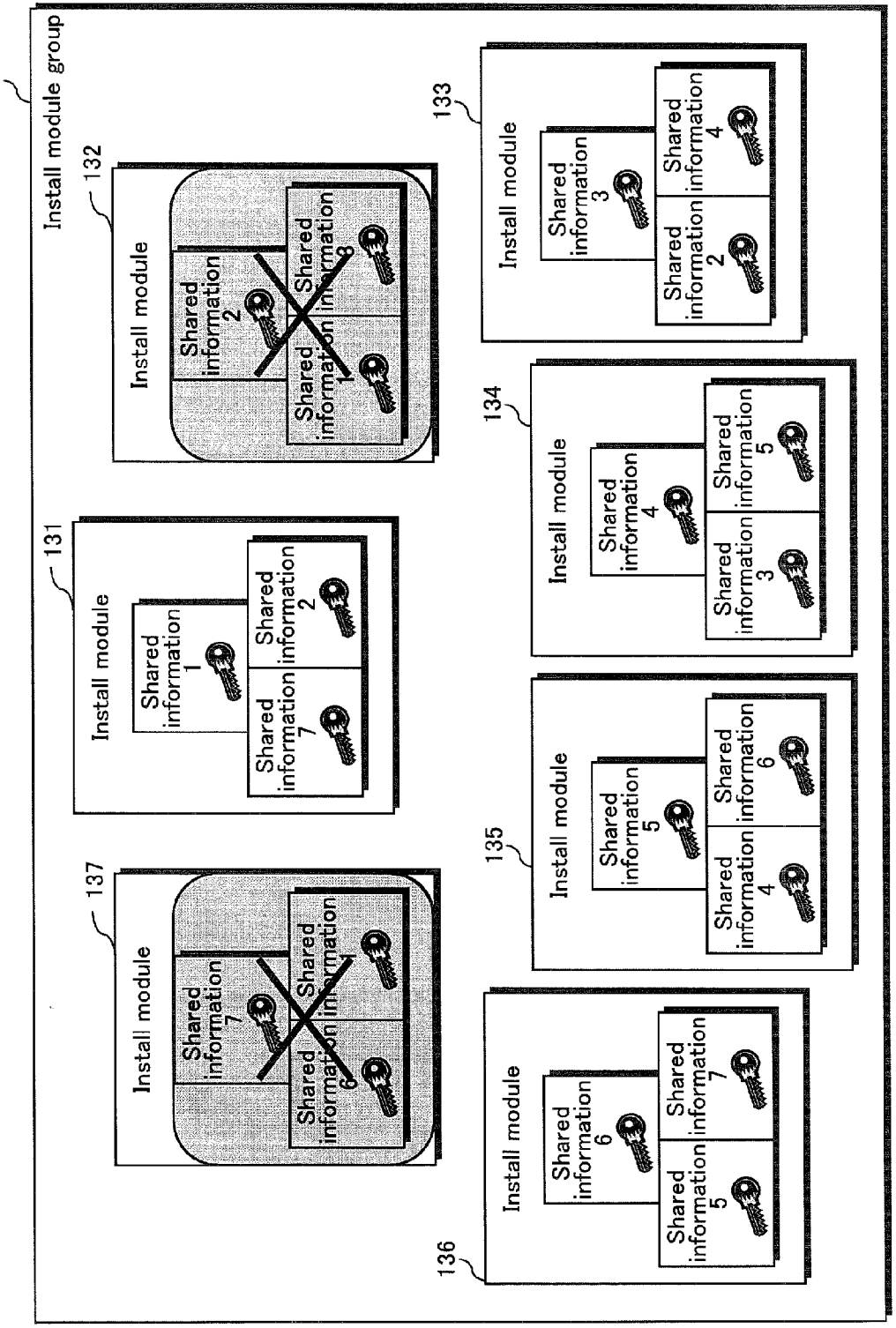

FIG. 53 shows an example where the install modules 132 and 137 included in the install module group 130 that are adjacent to the install module 131.

If the adjacent install modules are tampered with, it is impossible to perform the withdrawal processing disclosed in the Patent Document 2. In this case, after performing invalidation processing of the tampered with install modules, shared information of the whole install modules is updated. The method of updating the shared information is the same as that of updating shared information of the whole install modules as described above, and accordingly description thereof is omitted here.

26. Judgment Processing during Recovery Processing

The details of the judgment processing during recovery processing (S5103) are described with reference to FIG. 54.

Figure 54:
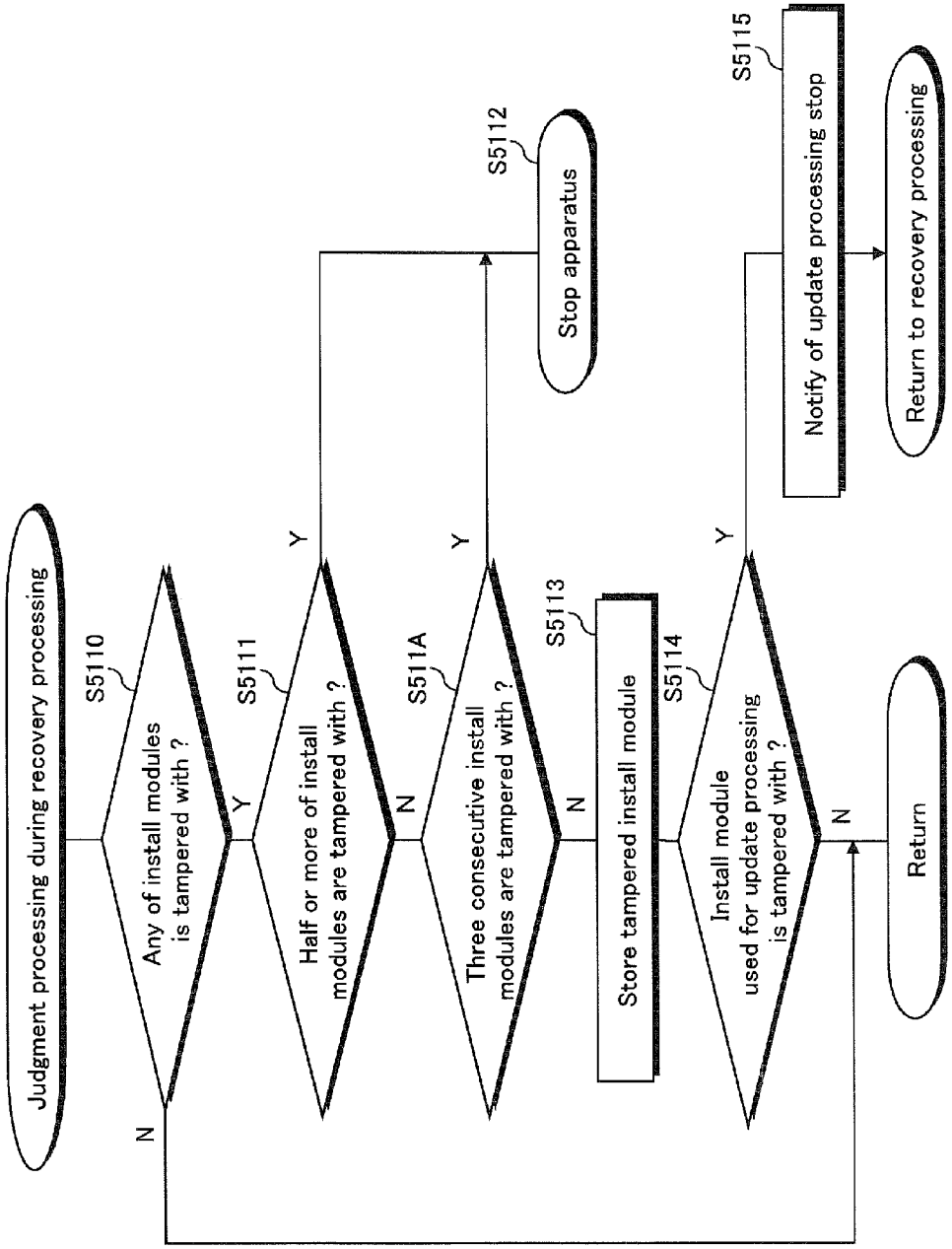
FIG. 54 is a flow chart of recovery processing (judgment processing during recovery processing) relating to the third embodiment of the present invention.

FIG. 54 is a flow chart showing the judgment processing during recovery processing of the mutual monitoring processing during recovery processing. In FIG. 54, the processing that is the same as the judgment processing during recovery processing (FIG. 36) according to the first embodiment has the same sign attached thereto, and the overlapped description is omitted here.

The judgment unit 210 judges whether half or more of the install modules included in the install module group 130 is tampered with (S5111). If judging that less than half of the install modules is tampered with, the judgment unit 210 further judges whether three consecutive install module are tampered with (S511A). If judging that three consecutive install modules are tampered with, the judgment unit 210 stops the apparatus 100 because the encryption/decryption key cannot be recovered.

As described above, both two install modules adjacent to the install module A are caused to store therein the shared information of the install module A. As a result, even if the install module A becomes tampered with during update processing of the protection control module 120, it is possible to recover the encryption/decryption key of the protection control module by acquiring the shared information of the install module A from the both two install modules adjacent to the install module A. Also, the judgment unit 210 judges whether three consecutive install modules are tampered with. If judging that three consecutive install modules are tampered with, the judgment unit 210 updates shared information of the whole install modules, thereby to prevent beforehand the case where the encryption/decryption key of the protection control module 120 cannot be recovered. As a result, it is possible to surely perform update processing of the protection control module.

Other Modification Examples

Although the present invention has been described based on the above embodiments, the present invention is of course not limited to the above embodiments. The following cases are also included in the present invention.

(1) In the above embodiments, the protection control module 120 is updated. Alternatively, a module other than the protection control module 120 such as an install module and an application may be updated. The following describes update processing of an install module, using an example where the install module 133 is updated.

In update processing of the install module, in the same way as the case of updating the protection control module, the correction software distribution module 210 super-encrypts the correction install module 133 using a plurality of keys, and transmits the super-encrypted correction install module 133 to an install module (except the install module 133) included in the install module group 130. The install module included in the install module group 130 updates the install module 133 to a new correction install module 133. At this time, the correction software distribution unit 220 controls a timing of transmitting a plurality of keys for decrypting the super-encrypted new install module 133 to the install module included in the install module group 130. This makes it impossible for an attacker to acquire the new install module 133 that has not been encrypted.

Figure 55:
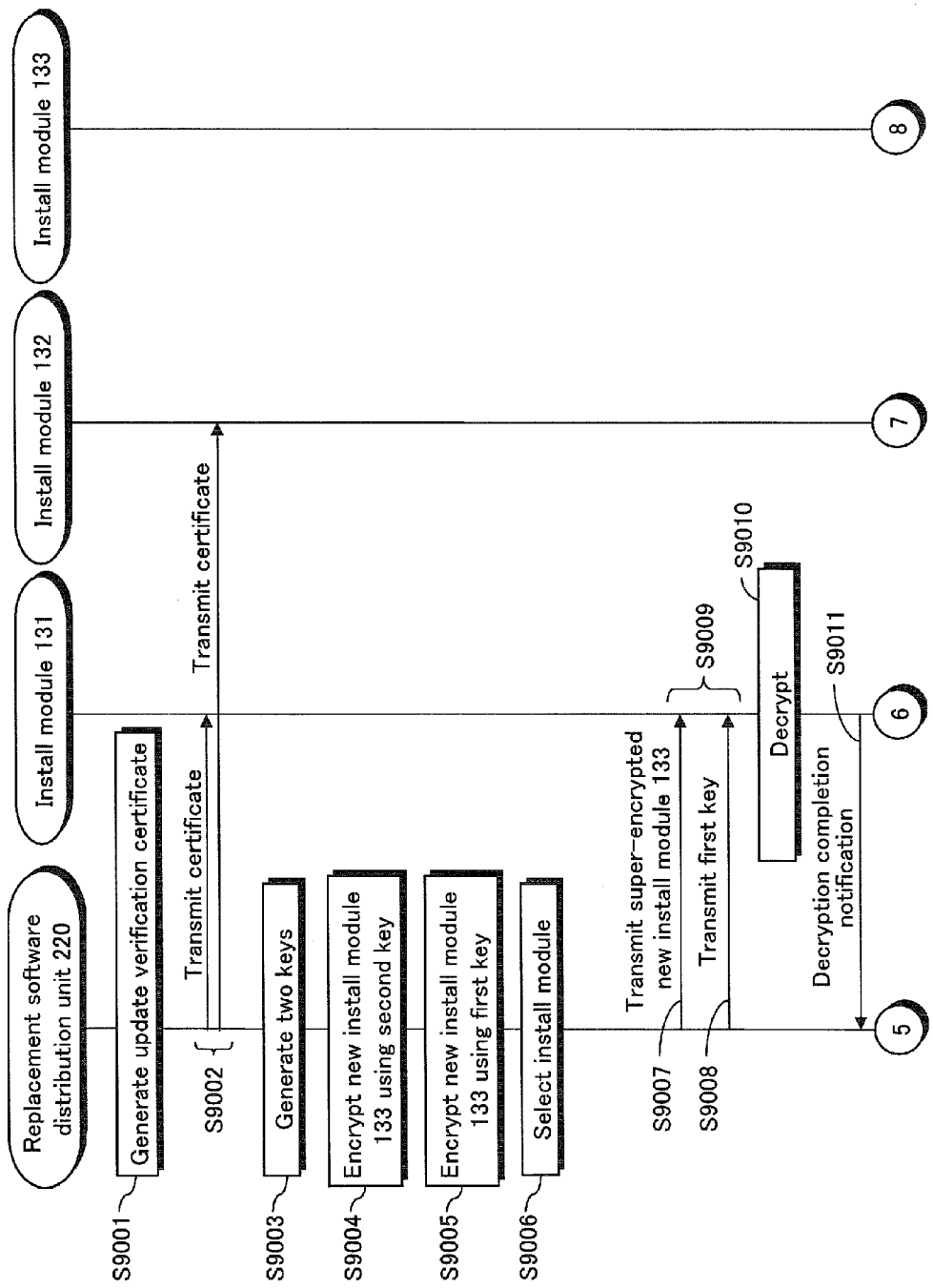
FIG. 55 is a sequence diagram of recovery processing (update processing) relating to a modification example 1 of the present invention.
Figure 56:
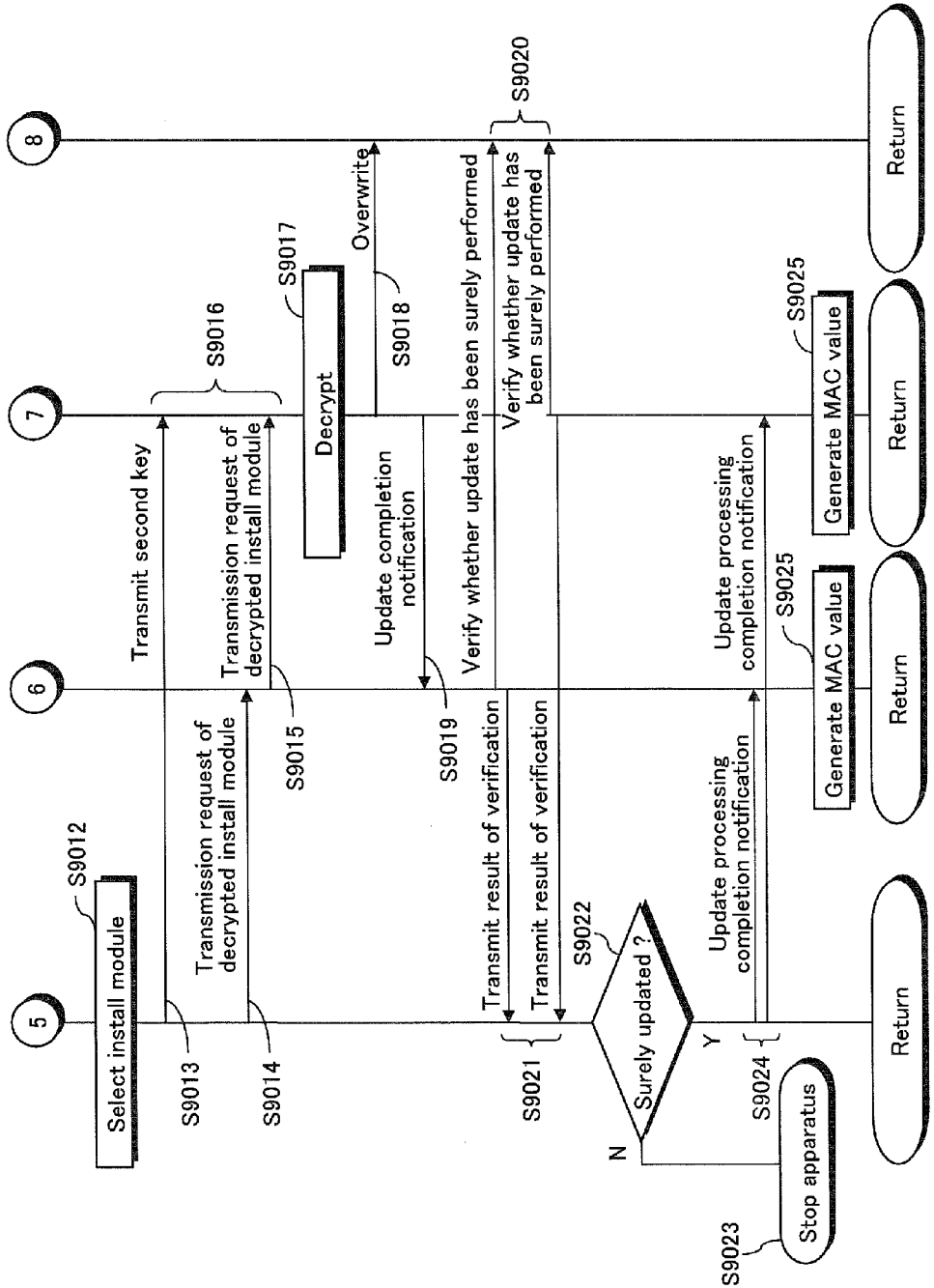
FIG. 56 is a sequence diagram of the recovery processing (update processing) relating to the modification example 1 of the present invention.

FIG. 55 and FIG. 56 are flow charts showing an example of update processing of an install module. Here, the install module 133 is updated, as described above. FIG. 55 and FIG. 56 are basically the same as FIG. 33 and FIG. 34. The difference from the FIG. 33 and FIG. 34 lies in that an update verification certificate, a decryption completion notification, and an update completion notification are not transmitted to the install module 133 that is an update target.

The following describes in detail processing of updating an install module, using an example where the install modules 131 and 132 updates the install module 133.

Firstly, the correction software distribution unit 220 generates a certificate (update verification certificate) for the new install module 133 using the certificate generation unit 408 (S9001), and transmits the generated certificate to each of the install modules 131 and 132 (S9002). Each of the install modules 131 and 132 can check whether the new install module 133 has been surely installed, using this certificate. The update verification certificate is generated using a signature secret key. Each of the install modules receives the update verification certificate.

Next, the correction software distribution unit 220 generates two encryption keys (first key and second key) for super-encrypting the new install module 133 using the encryption key generation unit 403 (S9003). Then, the correction software distribution unit 220 encrypts the new install module 133 using the second key by the encryption unit 404, to generate the encrypted new install module 133 (S9004). Furthermore, the correction software distribution unit 220 further encrypts the encrypted new install module 133 using the first key to generate a super-encrypted encrypted new install module 133 (S9005).

The correction software distribution unit 220 selects one install module from the install module group 130 (the install module 131, here) (S9006). The install module selected here is an install module other than a tampered with install module stored in the unauthentic module specification unit 604 of the judgment unit 210. Also, the correction software distribution unit 220 transmits an identifier of the selected install module to the judgment unit 210. The correction software distribution unit 220 transmits the super-encrypted new install module 133 to the selected install module (S9007). Furthermore, the correction software distribution unit 220 transmits the first key to the install module 131 (S9008).

The install module 131 receives the super-encrypted new install module 133 and the first key (S9009), and decrypts the super-encrypted new install module 133 using the first key to acquire an encrypted new install module 133 (S9010). After completing the decryption, the install module 131 transmits a decryption completion notification to the correction software distribution unit 220 (S9011).

Upon receiving the decryption completion notification, the correction software distribution unit 220 selects one install module (the install module 132, here) from the install module group 130, which is different from the install module selected in the above (S9012). In the same way as described above, the install module selected here is an install module other than the tampered with install module stored in the unauthentic module specification unit 604 of the judgment unit 210. The correction software distribution unit 220 transmits the second key to the selected install module (S9013). Furthermore, the correction software distribution unit 220 requests the install module 131 to transmit the encrypted new install module 133 to the install module 132 (S9014).

Upon receiving the request from the correction software distribution unit 220, the install module 131 transmits the encrypted new install module 133 to the install module 132 (S9015).

The install module 132 receives the second key from the correction software distribution unit 220, and receives the encrypted new install module 133 from the install module 131 (S9016). Then, the install module 132 decrypts the encrypted new install module 133 using the second key to acquire the new install module 133 (S9017).

The install module 132 overwrites the install module 133 with the acquired new install module 133, thereby to update to a new install module 133 (S9018). Then, the install module 132 transmits an update completion notification to other install module other than the install module 133 (S9019).

Each of the install modules 131 and 132 verifies whether the install module 133 has been surely updated using the update verification certificate received beforehand (S9020), and transmits a result of the verification to the correction software distribution module 220 (S9021).

Upon receiving the result of the verification transmitted from each of the install modules, the correction software distribution module 220 judges whether the install module 133 has been surely updated based on the received results of the verifications (S9022). If judging that the install module 133 has not been surely updated, the correction software distribution module 220 stops the apparatus 100 (S9023).

If judging that the install module 133 has been surely updated, the correction software distribution module 220 transmits an update processing completion notification to the install modules other than the install module 133 (S9024).

Upon receiving the update processing completion notification, each of the install modules 131 and 132 generates a MAC value of the install module 133, and stores a pair of an identifier of the install module 133 and the generated MAC value in the MAC value table (S9025).

Also, the install module is overwritten. Alternatively, an install module that has been tampered with may be invalidated and then overwritten.

An install module is overwritten. Alternatively, a module other than an install module such as the protection control module 120 and an application may be overwritten. The applications 100 and 110 each may be software supplying a function other than the above-described functions.

Also, in the case even one install module has been tampered with, an install module that has not been tampered with may update or overwrite all of the install modules and the protection control module 120.

Also, upon receiving a notification from each of the install modules, the correction software distribution unit 220 judges whether the install module 133 has been surely updated based on a result of detection (S9022). If judging that the install module 133 has not been surely updated, the correction software distribution unit 220 stops the apparatus 100 (S9023). Alternatively, the correction software distribution unit 220 may again perform install module update processing.

(2) In the above embodiments, the install module 13$x$ ($x$ is 1 to 7) includes the reception unit 301, the transmission unit 302, the control unit 303, the update unit 304, the verification unit 305, the MAC value generation unit 306, the MAC value table update unit 307, the monitoring pattern acquisition unit 308, the monitoring pattern update unit 309, and the shared information storage unit 310. The structure of the install module 13$x$ is not limited to this. Alternatively, the install module 13$x$ may include, for example, only compositional elements necessary for performing monitoring processing (the control unit 303, the verification unit 305, the monitoring pattern acquisition unit 308, and the monitoring pattern update unit 309). Alternatively, the install module 13$x$ may include only compositional elements necessary for performing update processing (the control unit 303 and the update unit 304). Alternatively, the install module 13$x$ may include only compositional elements necessary for performing invalidation processing (the control unit 303 and the update unit 304). Further alternatively, the install module 13$x$ may include any combination of the above compositional elements.

Here, the install modules included in the install module group 130 as a whole may include the compositional elements necessary for performing the monitor processing and the update processing.

(3) In the above embodiments, the verification unit 305 included in each of the install modules 13$x$ performs tampering check of other install module and the protection control module 120. The tampering check target is not limited to all the modules. The tampering check target may be part of a module, such as a particular capability, a function, and data such as a key. Further alternatively, tampering check may be performed on not a tampering check target all at once, but a part of the tampering check target. In this case, the tampering check may be performed on each of pieces having a predetermined size obtained as a result of division of the tampering check target, or each of pieces obtained as a result of division of the tampering check target in units of a capability or a function. Further alternatively, tampering check may be performed on part of the tampering check target for each time in order. Further alternatively, on which part of the tampering check target the tampering check is to be performed may be determined at random each time. Further alternatively, on which part of the tampering check target the tampering check is to be performed may be determined by other module, outside of the apparatus 100, or the like.

(4) In the above embodiments, an install module having a high importance may operate in a region protected against an attacker's attack, such as a tamper-resistant region. For example, the install module 13$x$ or the protection control module 120 may operate in a protected region as described above. In the case where an install module composed of only the compositional elements necessary for performing the monitor processing operates in a region protected against an attacker's attack, when other install module and the judgment unit 210 each receive a notification of that attack of other install module or the protection control module 120 is detected from the install module operating in the protected region, the other install module, the correction software distribution module 210, and the access information acquisition key distribution module 220 each may unconditionally receive the notification and perform update processing or invalidation processing, or each may treat the notification more important than a notification transmitted from other module and judge to perform update processing or invalidation processing.

Furthermore, the protection control module and the install module respectively may operate in a protection mode (in a tamper-resistant region or the like) and in a normal mode (in a region that is not tamper-resistant or the like).

(5) In the above embodiments, the module invalidation unit 230 is included in the update server 200, and the access control module 140 is included in the apparatus 100. Alternatively, the a module invalidation unit 230 and the access control module 140 may be included in the apparatus 100, or may be included in the update server 200, or may be separately included in install modules. Also, the module invalidation unit 230 and the access control module 140 may be structured as not separate modules but a single module. In the case where the module invalidation unit 230 and the access control module 140 are structured as a single module, access information may be directly transmitted to the install module, instead of transmitting an access information acquisition key and encrypted access information. Furthermore, in the case where the module invalidation unit 230 and the access control module 140 are included in the apparatus 100, access information may be stored in a region protected against an attack, such as a tamper-resistant region.

(6) In the above embodiments, the update server 200 is composed of the judgment unit 210, the correction software distribution unit 220, the module invalidation unit 230, the module addition unit 240, the monitoring pattern update unit 250, and the communication unit 260. Alternatively, the judgment unit 210, the correction software distribution unit 220, the module invalidation unit 230, the module addition unit 240, the monitoring pattern update unit 250, and the communication unit 260 may be structured as a single module, or as only either one of these modules. Further alternatively, the update server 200 may be any combination of these modules.

(7) In the above embodiments, according to the software update system 1000, the initial design processing is performed during manufacture of the apparatus 100 in the factory. Alternatively, the initialization processing may be performed at any time after the shipping from the factory, such as a time after the sale of the apparatus 100. Also, the initialization processing may be performed not once but twice or more times.

(8) In the above embodiments, in the operations during the initial design processing, the tampering detection certificate and the authentication key certificate are generated using the signature secret key stored in the correction software distribution module 220. Alternatively, each of the certificates may be generated using a different key. Further alternatively, the certificates each may be a certificate issued by a certificate issuing apparatus other than the correction software distribution module 220.

(9) In the above embodiments, in the operations during the initial design processing or the next-round preparation processing, shared information generated from an encryption/decryption key is transmitted to the install modules 131, 132, and 133, and the install modules 13x each store therein the shared information. Alternatively, an application may store therein the shared information. Further alternatively, the install modules 13x and an application each may store therein the shared information.

(10) In the above embodiments, in the operations during the detection processing, the install modules 13x each perform tampering detection processing of the protection control module 120 using a MAC value calculated using a verification key. Alternatively, the verification may be performed using a tampering detection certificate of the protection control module 120. Further alternatively, the verification may be performed by checking log, instead of using a hash value like the case of the MAC value or the certificate.

(11) In the above embodiments, in the operations during the detection processing, when the install modules 13x each detect that the protection control module 120 has been tampered with, the install modules 13x each notify the correction software distribution module 210 and other install modules of detection that the protection control module 120 has been tampered with. Alternatively, at least any one of the correction software distribution module 210 and other install modules may be notified. Further alternatively, when it is detected that the protection control module 120 has been tampered with, the install module, the apparatus 100, or the protection control module 120 may be stopped. Furthermore, the protection control module that has been tampered with may be deleted. Furthermore, when the install modules 13x each do not detect that the protection control module 120 has been tampered, the install modules 13x each do not notify the correction software distribution module 210 of detection that the protection control module 120 has not been tampered. Alternatively, as a result of the tampering detection processing, it may be notified of that tampering has not been detected.

(12) In the above embodiments, in the operations during the detection processing, the install modules 13x each do not transmit a result of tampering detection of the protection control module to other install module. Alternatively, the install modules may share the results of the tampering detection. Further alternatively, when one of the install modules does not share the results of the tampering detection, it may be possible to judge the install module as an unauthentic install module and invalidate the install module.

(13) In the above embodiments, in the operations during the analysis/judgment processing, whether to update the protection control module 120 is judged based on tampering information. Alternatively, the judgment may be performed based on the number of install modules that has notified of that the protection control module has been tampered with. Furthermore, in the operations of the analysis/judgment processing, it is judged on whether to update the protection control module 120 and whether to invalidate the protection control module 120. Alternatively, whether to stop the apparatus 100 may be judged.

(14) In the above embodiments, in the operations during the mutual authentication processing, the install modules 131, 132, and 133 each perform authentication processing of the correction software distribution module 220, and then the correction software distribution module 220 performs authentication processing of each of the install modules 131, 132, and 133. Alternatively, the correction software distribution module 220 may perform authentication processing of each of the install modules 131, 132, and 133, and then the install modules 131, 132, and 133 each may perform authentication processing of the correction software distribution module 220. Further alternatively, each of the install modules 131, 132, and 133 and the correction software distribution module 220 may separately perform authentication processing of each other.

(15) In the above embodiments, in the operations during the mutual authentication processing, when the correction software distribution module 220 performs authentication processing of each of the install modules 13x, challenge data has a different value for each of the install modules. Alternatively, challenge data has the same value among all the install modules. Further alternatively, the install modules 13x may be divided into a plurality of groups, and challenge data has a different value for each of the groups.

(16) In the above embodiments, in the operations during the mutual authentication processing, the install modules 13x separately perform authentication processing of the correction software distribution module 220. Alternatively, the install modules 13x each may notify other install module of a result of signature verification, share the results of the verification among the install modules, and judge whether the correction software distribution module 220 is an authentic module based on an authentication result of the install module itself and an authentication result received from the other install modules. The judgment may be performed using the following method, for example: when a constant number of install modules (for example, a majority of install modules) succeed in authentication, the correction software distribution module 220 is judged to be authentic. When the constant number of install modules fail in authentication, the correction software distribution module 210 is judged to be unauthentic.

(17) In the above embodiments, as operations of the mutual authentication processing, the update server 200 performs mutual authentication processing using the signature secret key and the signature public key. Alternatively, an authentication key pair to be used for mutual authentication may be used, in addition to the signature secret key and the signature public key. At this time, an authentication public key included in the authentication key pair of the update server 200 may be stored in the install module 13x beforehand, or may be transmitted from the update server 200 to the install module 13x during the mutual authentication processing.

(18) In the above embodiments, in the operations during the mutual authentication processing, whether to perform the subsequent recovery processing is judged depending on whether the number of install modules verified as authentic is no less than the number of install modules necessary for performing the recovery processing. Alternatively, the judgment may be performed depending on whether the number of unauthentic install modules is less than the predetermined allowable number of unauthentic install modules. Further alternatively, in the mutual authentication processing, if it is judged that the number of the install modules is less than the number of install modules necessary for performing the recovery processing, the apparatus 100 is stopped. Alternatively, the install module may be invalidated.

(19) In the above embodiments, in the operations during the mutual authentication processing, when the correction software distribution unit 220 performs authentication processing of the install modules 131, 132, and 133, the install modules 131, 132, and 133 each transmit an authentication public key and an authentication key certificate to the correction software distribution unit 220 together with response data. Alternatively, the authentication public key, the authentication key certificate, and the response data may be transmitted in accordance with a different timing. Further alternatively, the authentication public key and the authentication key certificate each may be transmitted only when requested by the correction software distribution unit 220. In this case, the correction software distribution unit 220 may receive authentication public keys and authentication key certificates of all the install modules. Alternatively, the correction software distribution unit 220 may receive the number of authentication public keys and authentication key certificates of no less than a predetermined number of install modules necessary for performing recovery processing or no more than a predetermined allowable number of unauthentic install modules.

(20) In the above embodiments, in the operations during the recovery processing, monitor processing is performed twice during one-time decryption (Mutual Monitoring 3-1, 3-2, 5-1, and 5-2). Alternatively, it may be possible to perform the monitor processing three times or more in accordance with the time period of decryption processing. Monitor processing may be performed during reception processing of a key and a correction protection control module and mutual authentication processing. Also, the monitor processing is regularly performed at constant intervals. Alternatively, the update processing may be divided into a plurality of blocks, and monitor processing may be performed each time the divided block is performed. Further alternatively, the monitor processing may be performed at random time intervals or time intervals specified by the update server 200.

Also, the install modules each may acquire synchronization information indicating a timing of performing monitor processing from an external server, and perform the monitor processing in accordance with the timing indicated by the synchronization information. As a result, the install modules each can perform the monitor processing in accordance with the same timing when the other install module performs the monitor processing. This can improve the accuracy of detecting an unauthentic install module.

Furthermore, it may be possible to change the frequency of detection during normal processing and recovery processing. For example, by setting the frequency of detection during the recovery processing higher than the frequency of detection during the normal processing, it is possible to ensure complete protection of the protection control module during the recovery processing. The frequency of detection may be changed during the recovery processing.

(21) In the above first and second embodiments, in the operations during the recovery processing, a pattern of monitor processing is employed in which the install module 131 performs tampering detection of the install module 132, the install module 132 performs tampering detection of the install module 133, and the install module 133 performs tampering detection of the install module 131. Alternatively, tampering detection may be performed in accordance with a predetermined pattern. For example, the install module 131 may perform tampering detection of the install module 133, the install module 132 may perform tampering detection of the install module 131, and the install module 133 may perform tampering detection of the install module 132. Further alternatively, it may be possible to determine at random which install module is a target of tampering detection. Alternatively, other module or outside of the apparatus 100 may determine which install module is a target of tampering detection. Alternatively, the install modules each may verify whether the install module itself has been tampered with. Alternatively, when the install modules each detect that the install module itself has been tampered with, the install module may invalidate itself. Further alternatively, in the case where a plurality of monitoring patterns are stored, each of the install modules does not need to be monitored by all other install modules, and some of the install modules may not be monitored by other install module in accordance with a certain monitoring pattern, or some of the install modules may be monitored by a plurality of install modules. Further alternatively, each of the install modules may be monitored by a plurality of install modules. Furthermore, when the pattern of the monitor processing may be changed at regular intervals, such as for each time tampering detection is performed, or in accordance with a random timing. The pattern may be changed in accordance with a timing given from other module or outside of the apparatus 100. Further alternatively, a plurality of install modules each may transmit a result of tapering detection to the update server in the order specified by the update server 200.

(22) Also, in the above first and second embodiments, the install module 131 performs tampering detection of the install module 132, the install module 132 performs tampering detection of the install module 133, and the install module 133 performs tampering detection of the install module 131. In this way, the loop system is used as the monitor structure. Alternatively, the structure may be employed in which a plurality of install modules monitor one another, or the combination of these structures may be employed. By realizing the structure in which a plurality of install modules monitor one another, the accuracy of the tampering verification can be increased further.

(23) In the above embodiments, in the operations of recovery processing, the install module 132 updates the protection control module 120, by overwriting the protection control module 120 with the acquired correction protection control module 121. Alternatively, it may be possible to acquire the difference between the protection control module 120 and the correction protection control module 121 from the correction software distribution module 210, and update the protection control module 120 by only the difference. Further alternatively, it may be possible to write the correction protection control module 121 in a region different from a region in which the protection control module 120 is written, such that the correction protection control module 121 is executed instead of the protection control module 120.

(24) In the above embodiments, in the operations of recovery processing, when an install modules 13x is detected as being tampered with in the monitor processing, the judgment unit 210 having received the tampering detection notification immediately stops the recovery processing. Alternatively, the recovery processing may be stopped when data such as a key is transmitted next from the correction software distribution unit 220 to the install module 13x. Alternatively, instead of stopping the recovery processing, recovery processing may be performed using not a tampered install module but a normal install module. Also, not only with respect to an updated module detected as being tampered with in monitor processing, but also with respect to an install module detected as being tampered with by the protection control module 120 in detection processing and an install module that fails in authentication in mutual authentication processing, recovering processing may be performed without using the install module. Further alternatively, when there is an install module that has been tampered with, the protection control module may not be updated.

(25) In the above embodiments, in the operations of recovery processing, the correction software distribution module 210 selects one install module to be used for decryption in update processing among the install modules included in the install module group 130. In this case, a predetermined install module may be selected, or an install module may be selected at random. Alternatively, an install module may be determined based on information provided from the apparatus 100, or an install module may be selected in accordance with the order of the install modules on which mutual authentication is performed.

(26) In the above embodiments, in the operations of recovery processing, the correction software distribution module 210 super-encrypts the correction protection control module 121 using a plurality of keys in the update processing. Alternatively, it may be possible to divide the correction protection control module 121 into a plurality of pieces thereby to generate a plurality of divided modules, encrypt the divided modules separately, and transmit the encrypted divided modules respectively to the install modules, in one-to-one correspondence with the install modules. In this case, as update processing, an encrypted divided module and a key used for the encryption are not transmitted all at once. Instead, transmission to the install module is controlled such that until decryption processing of one encrypted divided module completes, other encrypted divided module and a key used for the encryption are not transmitted. Alternatively, encrypted divided modules may be transmitted to the install module all at once, and only transmission timing of keys for decrypting the encrypted divided modules are controlled. Further alternatively, the keys may be transmitted to the install module all at once, and only transmission timing of the encrypted divided modules may be controlled. Further alternatively, all the keys and all the encrypted divided modules may be transmitted to the install module all at once. Also, the divided modules each may be super-encrypted using a plurality of keys instead of using a single key. In this case, transmission control of the keys and the super-encrypted divided modules is performed in the same way as where the correction protection control module 121 is super-encrypted using a plurality of keys. Furthermore, the encrypted divided modules and the keys for the decryption may be transmitted to a single install module. Alternatively, the encrypted divided modules and the keys may be transmitted to different install modules, and the install modules may perform cooperative operations within the apparatus 100. In this case, monitor processing may be performed before or after reception of divided modules. Furthermore, when an unauthentic install module tampered with is detected in monitor processing, update processing may be stopped in accordance with a next transmission timing of a divided module. Furthermore, when there is an install module tampered with, a plurality of install modules may notify the update server of the tampered install module, and the update server may not transmit a decryption key to the tampered install module. The divided modules may be encrypted using different encryption keys.

(27) In the above embodiments, in the operations of recovery processing, the applications 110 and 111 encrypted using an encryption/decryption key (old encryption/decryption key) are re-encrypted using a new encryption/decryption key. Alternatively, re-encryption processing may not be performed. In this case, the old encryption/decryption key may be continuously used without generating a new encryption/decryption key. Alternatively, the structure may be employed in which the old encryption/decryption key and the new encryption/decryption key are stored, and a key to be used is switched depending on an application. Alternatively, when the old encryption/decryption key is necessary, the old encryption/decryption key may be generated again from shared information. When the old encryption/decryption key is continuously used, the number of old encryption/decryption keys increases each time the protection control module 120 is updated. Also, each install module needs to store therein shared information of the new encryption/decryption key and the old encryption/decryption key.

(28) In the above embodiments, when the protection control module 121 is not normally updated, the apparatus 100 is stopped. Alternatively, mutual authentication processing and recovery processing may be performed again.

(29) In the above embodiments, in the operations of invalidation processing, the access information is a driver exclusively for deleting an install module. Alternatively, the access information may be a program exclusively for deleting an install module, a procedure manual in which a procedure for deleting an install module is written, an address of an install module to be deleted, an address of a program for deleting an install module, an address of a register or a memory for operating a function of deleting an install module, or a value to be set for the register or the memory. Alternatively, the access information may be information in which a code part is to be deleted is described. In this case, positions of code parts may be stored in a header, and a code part to be deleted may be judged with reference to the header. Furthermore, the access control module itself may be encrypted using an encryption key. In this case, an install module that has not been tampered with may acquire, from the update server, a decryption key corresponding to an encryption key used for encrypting the access control module. An install module that has not been tampered with may decrypt the access control module using the acquired decryption key, and acquire access information corresponding to the tampered install module from the access control module. Then, the tampered install module may be invalidated based on the acquired access information.

(30) In the above embodiments, in the operations of invalidation processing, all parts of an install module that has been tampered with are deleted. Alternatively, part of an unauthentic install module that has been tampered with may be deleted. For example, the part of the unauthentic tampered install module includes a particular capability such as a loading capability of loading other module, a function, data such as information (ticket, token, and socket) for accessing a key or other module. Alternatively, access to the part of the unauthentic tampered install module may be forbidden, or the part of the unauthentic tampered install module may be inactivated or updated. Also, after invalidating the unauthentic tampered install module, an install module having performed invalidation processing may delete access information stored in the access control module, which corresponds to the invalidated install module.

(31) In the above embodiments, an unauthentic install module that has been tampered with is invalidated. Alternatively, the unauthentic tampered install module may not be invalidated. In this case, whether to invalidate the unauthentic tampered install module may be judged depending on how much part of the unauthentic install module has been tampered with, which part of the unauthentic install module has been tampered with, and the like. Alternatively, the number of install modules to be invalidated may be determined based on the number of unauthentic install modules that have been tampered with.

(32) In the above first and second embodiments, the description is given based on the assumption that the number of install modules is three. Alternatively, the number of install modules may be any plural number.

(33) In the above embodiments, the access control module 140 and the install module group 130 are incorporated in the OS 150. Alternatively, in the case where each install module has a function of updating the OS, for example, the install module may be stored as a program beyond the management of the OS. Further alternatively, the protection control module may be incorporated in the OS.

(34) The apparatus 100 may be specifically any apparatus capable of performing interactive data communication. For example, a mobile terminal such as a mobile telephone and a digital television may be employed.

(35) In the above embodiments, access information is encrypted using a different access information acquisition key for each install module. Alternatively, the access information may be encrypted using the same access information acquisition key. In this case, the following may be employed. A normal install module accesses an update server to acquire a decryption key corresponding to the access information acquisition key, and decrypts an access control module using the acquired decryption key, and acquires access information corresponding to an install module that has been tampered with from the access control module, and invalidates the tampered install module based on the acquired access information.

(36) In the above embodiments, if the protection control module has been tampered with, the protection control module is updated and each of a plurality of install modules included in the install module group performs tampering verification of other install module. Alternatively, tampering verification may be performed regardless of whether other install module has been tampered with. For example, tampering verification may be performed when the version of the protection control module is upgrade.

(37) In the above embodiments, the correction protection control module is encrypted using a plurality of encryption keys. Alternatively, the correction protection control module may be encrypted using a single encryption key. In such a case, a decryption key corresponding to the encryption key is divided into a plurality of pieces. All the divided pieces may be transmitted to an install module that has not been tampered with, and the install module that has not been tampered with may decrypt the correction protection control module using all the divided pieces.

(38) In the above embodiments, the install modules 131, 132, and 133 each perform tampering detection of the protection control module 120. Furthermore, the protection control module 120 may perform tampering detection of each of the install modules.

The following describes processing of performing tampering detection of each of the install modules performed by the protection control module 120.

The protection control module 120 verifies whether each of the install modules 131, 132, and 133 has been tampered with, using a tampering detection certificate. If detecting that any of the install modules 131 to 133 has been tampered with, the protection control module 120 notifies the judgment unit 210 of the tampering. If detecting that no install module has been tampered with, the protection control module 120 does not notify the judgment unit 210.

If receiving a notification of tampering detection from the protection control module 120, the judgment unit 210 requests each of the install modules 131, 132, and 133 to perform tampering detection of the protection control module 120 in order to check whether the protection control module 120 itself has been tampered with.

Upon receiving the request from the judgment unit 210, each of the install modules performs tampering detection of the protection control module 120, and transmits a result of the tampering detection to the judgment unit 210. Note that if the protection control module 120 has been tampered with, other install module is not notified of a result of the tampering detection. The subsequent processing is the same as the detection processing according to the first embodiment, and accordingly the description thereof is omitted.

Next, the following describes an example where judgment is made on whether the protection control module 120 has been tampered with based on a result of tampering detection on each of the install modules performed by the protection control module 120.

As described above, in detection processing, the protection control module 120 detects whether each of the install modules 131, 132, and 133 has been tampered with. If detecting that an install module has been tampered with, the protection control module 120 notifies the judgment unit 210 of the tampering.

Upon receiving the notification, the judgment unit 210 requests the install modules 131, 132, and 133 to perform mutual monitoring. The install modules perform mutual tampering processing.

Upon receiving results of the mutual monitoring from the install modules, the judgment unit 210 judges whether an install module, which is detected as having been tampered with by the protection control module 120, has been tampered with, has been tampered with based on the result of the mutual monitoring.

If judging that the install module has been tampered with based on the result of the mutual monitoring, the judgment unit 210 judges the protection control module 120 to be authentic. On the other hand, if judging that the install module has not been tampered with, the judgment unit 210 judges the protection control module 120 to be unauthentic.

For example, assume that the protection control module 120 detects that the install module 132 has been tampered with. If a result of mutual monitoring also shows that the install module 132 has been tampered with, it is proved that the result of the detection performed by the protection control module 120 is correct, and accordingly it is proved that the protection control module 120 has not been tampered with. On the other hand, if the result of mutual monitoring shows that the install module 132 has not been tampered with, it is proved that the result of the detection performed by the protection control module 120 is incorrect, and accordingly it is proved that the protection control module has been tampered with.

(39) In the above embodiments, each of the install modules beforehand has a function of updating the protection control module 120. Alternatively, when it is detected that the protection control module 120 has been tampered with and needs to be updated, it may be employed to add a function of updating the protection control module 120 to each of the install modules, by acquiring access information for updating the protection control module 120. Here, in addition to the access information key storage unit 803, the module invalidation unit 230 stores therein an access information acquisition key for updating the protection control module 120. Also, the access control module 140 stores therein not only access information of each of the install modules but also encrypted access information of the protection control module 120.

The following describes processing of adding, to each of the install modules, a function of updating the protection control module 120. In the following descriptions, the processing that is the same as the processing according to the first embodiment has the same sign attached thereto.

In the update processing, the correction software distribution unit 220 super-encrypts the correction protection control module 121 using a plurality of keys, and transmits the super-encrypted correction protection control module 121 and the first key to the install module 131 included in the install module group 130 (S5001 to S5009). The install module included in the install module group 130 receives a second key from the correction software distribution unit 220, decrypts the super-encrypted correction protection control module, and acquires the correction protection control module (S5012 to S5016).

Then, the install module 132 requests the module invalidation unit 230 to transmit an access information acquisition key for updating the protection control module 120 to the install module 132, in order to update the protection control module 120 to the correction protection control module 121. Furthermore, the install module 132 requests the access control module 140 to transmit access information for updating the protection control module 120 to the install module 132.

Upon receiving the transmission request of the access information acquisition key, the module invalidation unit 230 inquires of the correction software distribution unit 220 about whether the install module that has issued the transmission request is an install module that is to update the protection control module 120. If a result of the inquiry is affirmative, the module invalidation unit 230 transmits the access information acquisition key for updating the protection control module 120 to the install module that has issued the transmission request.

Upon receiving a transmission request of access information from the install module 132, the access information module 140 transmits encrypted access information corresponding to the protection control module 120 to the install module 132.

Upon receiving the access information acquisition key from the module invalidation unit 230, and receiving the encrypted access information from the access control module 140, the install module 132 decrypts the encrypted access information using the received access information acquisition key to acquire access information. The acquired access information is a driver exclusively for updating the protection control module 120. The install module 132 updates the protection control module 120 to the correction protection control module 121 using the driver. Then, install module 132 transmits an update completion notification to other install module.

Each of the install modules included in the install module group 130 verifies whether the protection control module 120 has been surely updated to the correction protection control module 121. If a result of the verification is affirmative, each of the install modules generates a MAC value of the protection control module 121.

(40) In the above embodiments, the judgment criterion is stored in the criterion storage unit 606 included in the judgment unit 210. Alternatively, the judgment criterion may be stored in an apparatus or a server outside of the update server 200. Further alternatively, when the judgment criterion is loaded, the judgment criterion may be acquired from outside each time.

(41) In the above embodiments, the judgment criterion is stored beforehand in the criterion storage unit 606 included in the judgment unit 210. Alternatively, a judgment criterion stored beforehand may be modified within the update server 200. Further alternatively, a judgment criterion may be acquired from an external apparatus or server, and the acquired judgment criterion may be modified.

(42) In the above embodiments, each install module has one piece of monitoring pattern information. Alternatively, each install module may have a plurality of pieces of monitoring pattern information. Also, in the case where each install module has a plurality of pieces of monitoring pattern information, the install module group 130 may change monitoring patterns all at once, or each of the install modules may separately make a judgment and change its monitoring pattern. A timing of the change may be determined within the apparatus 100, or may be transmitted from the update server 200. Alternatively, it may be possible that an algorithm for judging the timing is transmitted from the update server 200 beforehand, and the apparatus 100 judges the timing based on the algorithm. Alternatively, each of the install modules may store therein a timing of changing monitoring patterns or information on when and which monitoring pattern needs to be used, together with a plurality of pieces of monitoring pattern information. As a result, even in a situation where the apparatus 100 and the update server 200 cannot communicate with each other, the apparatus 100 can separately perform monitoring by combining various types of monitoring patterns. Also, when a monitoring pattern needs to be updated, it is only necessary for the update server 200 to issue an instruction to change monitoring pattern. This can reduce the amount of communication between the apparatus 100 and the update server 200.

(43) In the above embodiments, the monitoring frequency included in the monitoring pattern information is composed of information relating to a timing of monitoring a monitoring target. Alternatively, the monitoring frequency may be composed of information on which one among a plurality of monitoring patterns is to be used or a selection algorithm of a monitoring pattern. This makes it possible to select different monitoring patterns even at the same monitoring frequency. As a result, it is difficult for an attacker to predict an install module to be monitored.

(44) In the above embodiments, a main body of a monitoring pattern has the structure in which the number of monitoring patterns and the size thereof are written as header information at the head thereof, and pairs of a monitoring pattern identifier and a monitoring pattern are subsequently written. Alternatively, the main body of the monitoring pattern may have the structure in which one monitoring pattern is simply written. Further alternatively, the size of the monitoring pattern may be a fixed length, and the main body of the monitoring pattern may not include the size. Further alternatively, the main body of the monitoring pattern may have the structure in which the number of monitoring patterns is written as header information, and sets of a size, a monitoring pattern identifier, and a monitoring pattern are subsequently written. Furthermore, the arrangement order of a plurality of monitoring patterns may be determined based on information relating to a module that is a monitoring target (such as a module identifier, a position on the memory, a size, an address, and a file name), the size of the monitoring pattern, or a monitoring pattern identifier. Alternatively, the arrangement order may be determined independently of these information. In the case where the size is written as header information, the order of the size needs to conform to the order of a corresponding pair of a monitoring pattern identifier and a monitoring pattern.

(45) In the above embodiments, as the operations of addition processing, the install module division unit 905 divides an additional install module into pieces whose number is the same as the number of install modules that are to perform addition processing. Alternatively, the number of pieces into which the additional install module is divided may be less than or greater than the number of the install modules that are to perform processing. For example, if the number of the pieces is less, part of the divided pieces of the additional install module (partial divided additional install module) may be transmitted to at least two install modules. If the number of the pieces is greater, part of the install modules may receive a plurality of partial divided additional install modules. With such a structure, it is possible to divide an additional install module into pieces whose number is different from the number of install modules that are to perform addition processing. Also, by transmitting one partial divided additional install module to a plurality of install modules, even in the case where any one of the plurality of install modules is attacked and becomes unauthentic, any another of the install modules that has received the same one partial divided additional install module performs addition processing. This makes it possible to continue to perform addition processing of an install module. Furthermore, since one of the install modules can receive a plurality of partial divided additional install modules, it is possible to make an attacker difficult to perform attack, by dividing an additional install module into small pieces and transmitting different partial divided additional install modules that are inconsecutive to the install modules, respectively.

Furthermore, the install module storage unit 904 may store therein beforehand partial divided additional install modules. Even in this case, the module addition unit 240 can perform addition processing independent from the number of install modules included in the apparatus 100. Also, even in the case where the division method and the number of divided pieces are determined beforehand, it is possible to perform addition processing independent from the number of install modules that are to perform addition processing.

(46) In the above embodiments, upon receiving a partial divided additional install module, each of the install modules separately performs addition processing. Alternatively, the install modules may perform addition processing in order in cooperation with one another. In this case, according to the sequence diagram of addition processing shown in FIG. 27, when completing addition processing, each of the install modules notifies only the module addition unit of an "addition processing completion notification". Each of the install modules needs to notify also other install module of this "addition processing completion notification" such that other module can recognize what number addition processing completes. Or each of the install modules needs to notify an install module that is to perform addition processing next such that addition processing can be performed in order.

The order of performing addition processing may be determined in the following manner, for example. A priority order of performing addition processing is attached to each of the install modules. In accordance with the priority order, install modules selected by the update server 200 perform addition processing in order. Here, the priority order may be determined during the system design processing, may be informed beforehand by the server, or may be randomly determined within the apparatus each time. Alternatively, instead of using the priority order, the order of performing processing may be transmitted to each of the install module together with a partial divided additional install module. The order of performing addition processing may be determined, for example, in accordance with the order of install modules selected by the install module selection unit 903, or may be determined at random, or may be determined such that an order of processing with respect to an install module that is monitored by more install modules is lower. Also, the order of addition processing may be determined such that when the install module division unit 905 divides an additional install module into pieces, an order of processing with respect to a piece that includes information important in terms of security is lower. Alternatively, addition processing may be performed in descending order of size of pieces.

Furthermore, instead of recognizing the order of addition processing within the apparatus 100, the update server 200 may recognize the order of addition processing and control the order and a timing of transmission to the apparatus 100.

Figure 57:
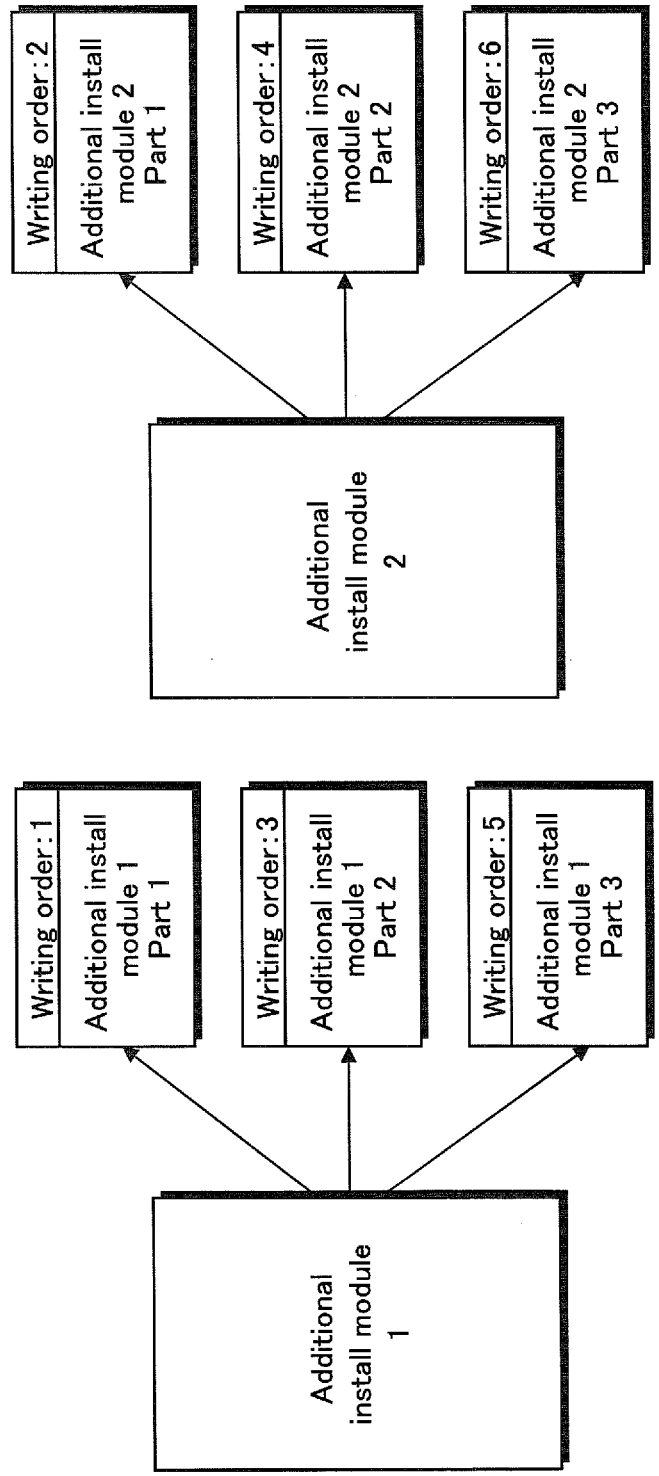
FIG. 57 shows a division example of an additional install module relating to a modification example 47 of the present invention.

(47) In the above embodiments, processing of adding one install module is performed. Alternatively, a plurality of install modules may be added simultaneously. FIG. 57 shows an example of a division method in a case where a plurality of install modules are added simultaneously. In FIG. 57, addition processing is performed using three install modules. Firstly, each of additional install modules 1 and 2 is divided into three pieces. This number three is the same as the number of install modules that are to perform addition processing. A writing order is attached to each of the three pieces. Then, a part 1 of the additional install module 1 and a part 1 of the additional install module 2 are transmitted to the install module 131. A part 2 of the additional install module 1 and a part 2 of the additional install module 2 are transmitted to the install module 132. A part 3 of the additional install module 1 and a part 3 of the additional install module 2 are transmitted to the install module 133. Each of the additional install modules 1 and 2 performs addition processing in accordance with the writing order attached to the received part of the additional install module. Here, a plurality of additional install modules are each divided into pieces whose number is the same as the number of install modules that are to perform addition. Alternatively, each of additional install modules may be divided into pieces such that the total division number with respect to all of the additional install modules is no less than a predetermined value. Also, a plurality of install modules are added simultaneously. Alternatively, an install module and a dummy module may be added. This makes it possible to add a plurality of install modules all at once, and improve the security intensity of the apparatus 100. Also, parts of a plurality of additional install modules in a group are transmitted from the update server 200 to the apparatus 100, and then addition processing is performed. This makes it difficult for an attacker to perform analysis. Furthermore, by including a dummy module in addition, it is possible to make the analysis further difficult.

(48) In the above embodiments, the apparatus 100 receives an additional install module from the update server 200. Alternatively, a partial divided additional install module may be stored beforehand in each of the install modules during initial design processing. Alternatively, instead of a partial divided additional install module, a program for generating the partial divided additional install module may be stored beforehand in each of the install modules. Then, the install module may generate the partial divided additional install module when addition processing needs to be performed. In this case, the module addition unit 240 does not need to include the install module storage unit 904 and the install module division unit 905, and only needs to select an install module that is to perform addition processing and instruct the selected install module to start the processing.

(49) In the above embodiments, when the apparatus 100 receives an additional install module, addition processing is performed. Alternatively, the following may be employed. The apparatus 100 receives beforehand divided pieces of an additional install module and install module verification information from the update server 200. When detecting that the number of authentic install modules is no more than a predetermined value based on a result of mutual monitoring performed by the install module group 130 or a result of tampering detection on an install module performed by the protection control module 120, the apparatus 100 performs addition processing using the additional install module that has been received beforehand, without performing communication with the update server 200. As a result, even in the case where the apparatus 100 is disconnected from the network, it is possible to perform addition processing of an install module and maintain the security intensity.

(50) In the above embodiments, the monitoring pattern update unit 250 generates a monitoring pattern. Alternatively, the monitoring pattern update unit 250 may store therein beforehand the monitoring pattern. Further alternatively, the monitoring pattern may be provided from an apparatus or a server outside of the update server 200. This can reduce processing performed by the monitoring pattern update unit 250, and accordingly it is possible to promptly perform update processing of the monitoring pattern.

(51) In the above embodiments, the monitoring pattern update unit 250 transmits a generated new monitoring pattern to the apparatus 100. Alternatively, the monitoring pattern update unit 250 may transmit a monitoring pattern generation program to the apparatus 100. Here, upon receiving the monitoring pattern generation program, the apparatus 100 executes the monitoring pattern generation program to generate a monitoring pattern, and performs monitoring in accordance with the generated monitoring pattern. This makes it possible to generate the most appropriate monitoring pattern depending on the status of the apparatus 100, and easily detect an unauthentic install module.

(52) In the above embodiments, as the operations of the initial design processing, it may be possible to install beforehand a monitoring pattern during manufacture of the apparatus 100 in the factory, or acquire the monitoring pattern from the update server 200. Further alternatively, in the case where the monitoring pattern is not installed, a default monitoring pattern may be used. The default monitoring pattern may be, for example, a monitoring pattern in which each of the install modules monitors all other of the install modules. Also, in the case where the install module group includes three install modules in the same way as in the first embodiment, the default monitoring pattern may be a monitoring pattern in which monitoring is performed in the cyclic order such that the install module 131 monitors the install module 132, the install module 132 monitors the install module 133, and the install module 133 monitors the install module 131.

(53) In the above embodiments, as the operations of the initial design processing, the user may set the security level. The user may set the number of install modules and the monitoring frequency, depending on the set security level. Also, in the security level set by the user, if the number of install modules is insufficient, it may be employed to acquire an install module from the update server 200. Alternatively, it may be employed to acquire the monitoring pattern depending on the security level. Accordingly, it is possible to appropriately set the security level and maintain the security strength.

(54) In the above embodiments, as the operations of the install module initialization processing, each of the install modules may verify whether there is a monitoring pattern thereof. Alternatively, if there is not the monitoring pattern, the install module may inquire of the update server 200 to acquire the monitoring pattern.

(55) In the above embodiments, as the operations of the analysis/judgment processing, it is judged that the protection control module 120 has been tampered with based on a result of detection processing, and it is judged on whether recovery is necessary. Alternatively, it may be judged on whether the protection control module 120 needs to be recovered based on information showing that a protection control module included in a third apparatus like the apparatus 100 has been tampered with. Further alternatively, it may be employed to acquire protection control module tampering information from outside. The protection control module tampering information is, for example, information showing that a protection control module mounted by the same mounting method has been tampered with.

(56) In the above third embodiment, as the operations of the invalidation judgment processing during normal processing, if it is judged that half or more of the install modules are tampered with, the whole install modules are updated. Alternatively, the apparatus 100 may be stopped.

(57) In the above embodiments, as the operations of the invalidation judgment processing during normal processing, if it is judged that half or more of the install modules are tampered with, the whole install module group 130 is updated. Alternatively, it may be possible to perform invalidation processing on all of the tampered with install modules, and then perform addition processing of an install module.

(58) In the above embodiments, as the operations of the addition judgment processing, if the number of install modules is no more than the predetermined value, addition processing is performed. Alternatively, it may be possible to judge whether invalidation processing has been performed, and if it is judged affirmatively, addition processing may be performed. Also, addition processing may be performed not once but a plurality of times. Furthermore, it may be employed to increase the predetermined value, and add an install module such that the number of install modules included in the install module group after addition is greater than the original number of install modules included in the install module group. Furthermore, instead of performing addition processing, the whole install modules may be updated. This can maintain constant the number of install modules included in the install module group, and maintain the security intensity of the apparatus 100.

(59) In the above embodiments, as the operations of the monitoring pattern update judgment processing, it is judged on whether a monitoring pattern needs to be updated as a result of change of the structure of an install module due to invalidation processing or addition processing. Alternatively, judgment on whether to update a monitoring pattern may be performed after elapse of a predetermined time period, or may be performed depending on the internal status of the apparatus 100 such as a status in normal processing and a status in recovery processing. Alternatively, the judgment on whether to update a monitoring pattern may be performed by acquiring information showing that a monitoring pattern of a third apparatus has been updated, or by acquiring the information from an apparatus or a server outside of the update server 200. Further alternatively, if an unauthentic install module is detected as a result of mutual monitoring, it may be judged that a monitoring pattern needs to be performed. With this structure, it is possible to update the monitoring pattern before an attack by an attacker or immediately after the attack. This can make the attack difficult to be performed.

(60) In the above embodiments, as the operations of the addition processing, an install module that has received verification information of other install module performs verification of an additional install module (S3316). The control unit 960 of the module addition unit 240 judges whether the additional install module has been surely added based on a result of the verification (S3318). Alternatively, the following may be employed. Verification information is transmitted, which is different from verification information of an install module added by the control unit 960 of the module addition unit 240. Then, the install module is caused to perform verification using the different verification information, thereby to confirm that a result of verification transmitted from the install module is unauthentic. Accordingly, it is verified as to whether verification of the additional install module has been surely performed. Further alternatively, the install module division unit 905 divides an unauthentic install module into pieces, and transmits the divided pieces to the install modules. Since the control unit 960 transmits verification information of an authentic install module, it is checked that verification information transmitted by the unauthentic install module is unauthentic, thereby to verify whether verification of an additional install module has been surely performed. Accordingly, it is possible to check whether the verification of additional install module (S3316) is surely operated. Since the verification function surely operates, it is possible to prevent an unauthentic install module from being added to the apparatus 100.

(61) In the above embodiments, as the operations of the invalidation judgment processing during normal processing, if it is judged that half or more of the install modules are tampered with, the whole install modules are updated. Alternatively, it may be employed to judge whether the monitoring function exceeds the limits, and if it is judged affirmatively, the whole install module may be updated. For example, it may be judged that the monitoring function exceeds the limits if half or more of the install modules exceeds a predetermined value. Also, assume that the install module group includes an install module that does not have the monitoring function. If no more than half of install modules each having the monitoring function included in the install module group become tampered with, the monitoring function is judged to exceed the limits even if the number of the tampered with install modules is less than the number of all install modules included in the install module group.

(62) In the above embodiments, as the operations of the monitoring pattern update judgment processing, it is judged on whether a monitoring pattern needs to be updated based on the change of the structure of install module as a result of invalidation processing or addition processing. Alternatively, it may be judged that a monitoring pattern needs to be updated if some type of unauthentic act is detected. This can make it possible to perform minute check of the unauthorized act. For example, which install module is unauthentic and what type of unauthorized act has been performed.

(63) In the above embodiments, as the operations of the mutual monitoring processing, each of the install modules 131 to 133 included in the install module group 130 performs tampering detection on other of the install modules. If other install module has been tampered with by an attacker, each of the install modules detects the tampering. Alternatively, tampering may be detected depending on a position of tampering or the degree of amount of tampering. Further alternatively, tampering may be detected by checking a log of an install module.

(64) In the above embodiments, as the operations of the mutual authentication processing, it is judged on whether the number of install modules that have returned authentic response data is no less than the number of install modules necessary for performing recovery processing. If judging affirmatively, the flow proceeds to recovery processing. Here, it may be possible to add a function of storing an install module that does not return authentic response data. An install module that does not return authentic response data has a possibility of having been tampered with. By storing the install module having the possibility, an install module to be used for update processing is selected (S5006). Not by selecting the install module that does not return authentic response data, it is possible to prevent a case where the install module that does not return authentic response data has been tampered with and as a result update processing cannot be normally performed. Also, a monitoring pattern may be updated to a monitoring pattern that does not include information of the install module that does not return authentic response data. This makes it possible to perform mutual monitoring in an install module group including install modules that have returned authentic response data, in mutual monitoring processing (S5101) of mutual monitoring processing during recovery processing.

(65) In the above second embodiment, as the operations of the update processing of the monitoring pattern, the monitoring pattern division unit 1004 divides a new (whole) monitoring pattern, and transmits divided pieces of the new (whole) monitoring pattern to the install modules, respectively. Alternatively, the monitoring pattern division unit 1004 may transmit the new (whole) monitoring pattern to the apparatus 100, and each of the install modules may acquire a monitoring pattern corresponding thereto from the new (whole) monitoring pattern, and perform update processing.

(66) In the above second embodiment, as the operation of the update processing of the monitoring pattern, verification is performed on a main body of a monitoring pattern of an install module that is written in a main body of an updated new monitoring pattern. Alternatively, all of the install modules may be verified, or an install module determined beforehand within the apparatus 100 may be verified. Further alternatively, the update server 200 may notify of which install module to be verified. Alternatively, in the case where all of the install modules are verified, which install module is to be verified may be determined at random.

(67) In the above second embodiment, as the operations of update processing of the monitoring pattern, the monitoring pattern division unit 1004 divides a new (whole) monitoring pattern into pieces, and transmits the divided pieces to the install modules, respectively. Alternatively, it may be employed to acquire a monitoring pattern as follows, for example. Firstly, the update server 200 transmits a new (whole) monitoring pattern to a certain one of the install modules. Upon receiving the new (whole) monitoring pattern, the certain install module acquires only a monitoring pattern corresponding thereto from the new (whole) monitoring pattern, and transfers the new (whole) monitoring pattern to another one of the install modules. Furthermore, upon receiving the new (whole) monitoring pattern, another install module acquires only a monitoring pattern corresponding thereto from the new (whole) monitoring pattern, and transfers the new (whole) monitoring pattern to yet another one of the install modules that has not yet acquired a new monitoring pattern corresponding thereto. This processing is performed with respect to all of the install modules. As a result, each of the install modules can acquire a monitoring pattern corresponding thereto.

Also, the following may be employed. The update server encrypts a new monitoring pattern relating to each of the install modules such that the install module is separately decrypted, and transmits an encrypted new (whole) monitoring pattern to a certain one of the install modules. Upon receiving the encrypted new (whole) monitoring pattern, the certain install module decrypts only a new encrypted monitoring pattern corresponding thereto to acquire a monitoring pattern corresponding thereto, and updates an old monitoring pattern corresponding thereto.

(68) In the above third embodiment, as the operations of the initial design processing, each of the install modules stores therein shared information of install modules adjacent thereto. Alternatively, each of the install modules may store therein shared information of an install module other than the install modules adjacent thereto, in addition to shared information of the adjacent install modules. Specifically, suppose that an install module A is adjacent to an install module B, and an install module C is adjacent to the install module B on the opposite side of the install module A. Shared information of the install module C may be also stored in the install module A. In this case, the install module A stores therein four pieces of shared information including a piece of shared information thereof. Also, as the operations of invalidation judgment processing during normal processing, if it is judged that both two install modules adjacent to a certain install module have been tampered with, it is unnecessary to update the whole install modules. By performing invalidation processing of the tampered with install modules and performing withdrawal processing disclosed in the Patent Document 2, shared information is shared among install modules. Note that, in operations of recovering an encryption/decryption key of re-encryption processing, shared information verification processing disclosed in the Patent Document 2 is performed for verifying whether shared information stored in an install module that has not been tampered with is authentic. The detailed method of performing verification processing of shared information is described in page 57 of the Patent Document 2, and accordingly the description is omitted here. By performing the above processing, it is possible to perform shared information verification processing disclosed in the Patent Document 2. This is because even if an install module adjacent to the install module C becomes tampered with, the install module A stores therein the shared information of the install module C. As a result, it is possible to verify whether the shared information of the install module C is authentic, and prevent a case where an encryption/decryption key cannot be surely recovered in the recovery processing (S5204).

Figure 58:
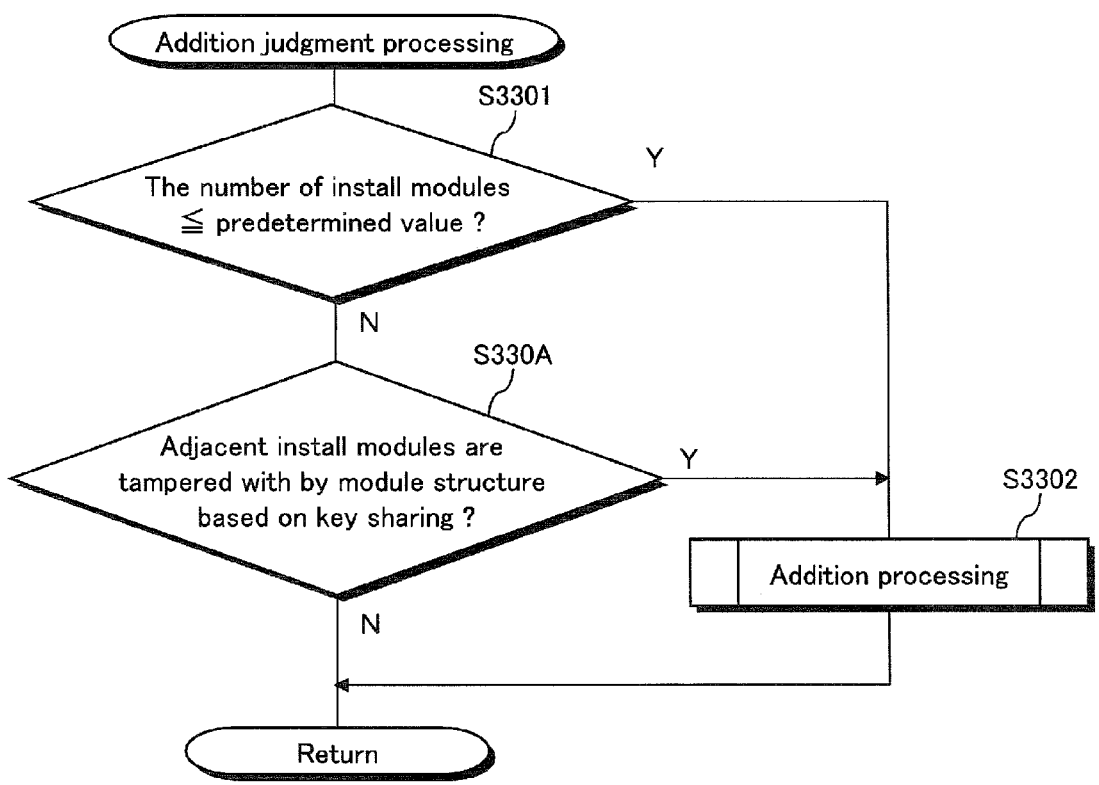
FIG. 58 is a flow chart of analysis/judgment processing (addition judgment processing) relating to a modification example 69 of the present invention.

(69) In the above third embodiment, as the operations of the invalidation judgment processing during normal processing, if it is judged that adjacent install modules are tampered with (S320B), the whole install modules are updated. Alternatively, it may be possible to perform invalidation processing of the tampered with install modules, and not update the whole install modules. However, as shown in FIG. 58, since other install module does not store therein the shared information 1 that is stored in the install module 131, addition processing is necessary. Addition judgment processing in this case is described with reference to FIG. 58. When adjacent install modules are tampered with, it is judged on whether and only invalidation processing is performed (S330A). If the adjacent install modules are invalidated, addition processing is performed. In the case where the install modules 132 and 137 adjacent to the install module 131 are invalidated, an install module that stores therein the shared information 1 is only the install module 131. If the install module 131 is attacked next, it is impossible to recover an encryption/decryption key. In this case, by adding an install module and causing the added install module to store therein the shared information 1, it is possible to avoid the case where the encryption/decryption key cannot be recovered even if the install module 131 is attacked. Here, instead of causing the added install module to store therein the shared information 1, the protection control module 120 may update shared information of the whole install modules. The method of updating the shared information of the whole install modules is the same as the method of updating shared information of the whole install modules in the invalidation judgment processing during normal processing, and accordingly description thereof is omitted here. By structuring as described above, a plurality of install modules can store therein the shared information 1. This can prevent the impossibility of recovery of the encryption/decryption key even if the install module 131 has been tampered with.

(70) In the above third embodiment, as the operations of the invalidation judgment processing during normal processing, in the case where either of install modules (the install module 13 here) adjacent to an install module 13A is tampered with, it may be possible to perform invalidation processing of the install module 13B, instead of performing the withdrawal processing disclosed in the Patent Document 2. As a result, since shared information A of the install module 13A is stored in either of the adjacent install modules, it is unnecessary to perform addition processing. Also, since addition processing is not performed, it is possible to perform other processing instead. For example, it is possible to continue to verify whether a plurality of install modules have possibility of performing malicious operations.

Also, after the protection control module 120 verifies whether the applications (110 and 111) have been tampered with, addition processing of an install module may be performed such that the added install module is adjacent to the install module 13A. In this way, after completing processing of verifying whether an application that essentially needs to be protected has been tampered with, an install module is added so as to be adjacent to the install module 13A. Addition processing of an install module so as to be adjacent to the install module 13A on one side is preferentially performed, such that the decryption key can be recovered without adding an install module so as to be adjacent to the install module 13A. Accordingly, it is possible to prevent the predetermined application from being attacked during the addition processing.

Figure 59:
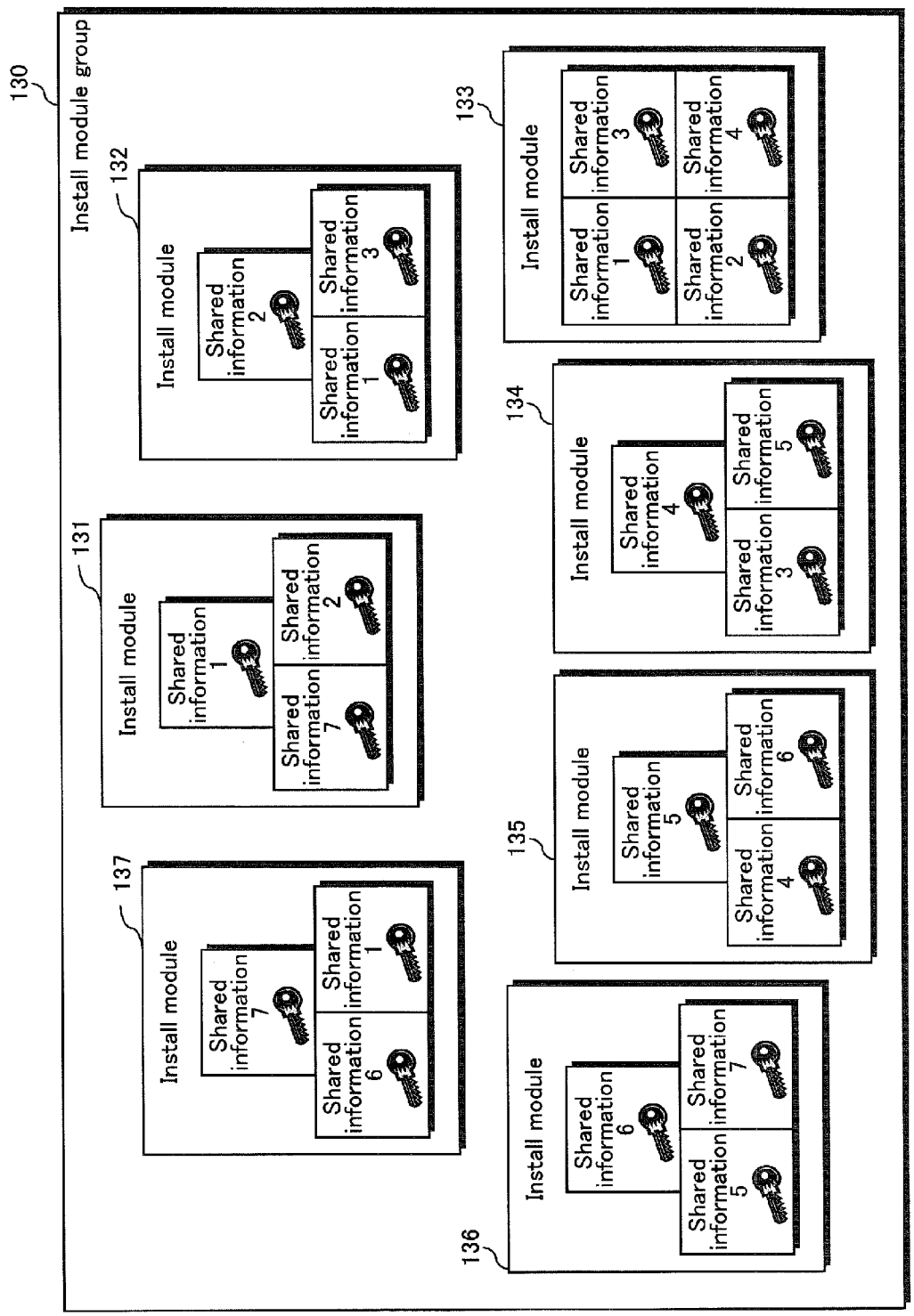
FIG. 59 shows a structure example of shared information stored in an install module relating to a modification example 71 of the present invention.

(71) In the above third embodiment, as the operations of the initial design processing, each of the install modules stores therein shared information of install modules adjacent thereto. Alternatively, shared information of a certain install module may be stored in install modules adjacent to the certain install module and other install module. The following gives a specific description with reference to FIG. 59. In the third embodiment, since each of the install modules stores therein shared information of install modules adjacent thereto, the shared information 1 is stored in the install modules 131, 132, and 137. Accordingly, in the case where the three consecutive install modules 131, 132, and 137 become tampered with in operations of invalidation judgment processing during normal processing or judgment processing during recovery processing, the shared information 1 cannot be recovered. As a result, processing is necessary such as processing of stopping the apparatus. As shown in FIG. 59, each of the install modules 131, 132, 133, and 137 is caused to store therein the shared information 1. With this structure, even in the case where the three consecutive install modules 131, 132, and 137 become tampered with in operations of invalidation judgment processing during normal processing or judgment processing during recovery processing, it never occurs that the shared information 1 cannot be recovered. Accordingly, with respect to the shared information 1, judgment is performed on whether four consecutive install modules are tampered with, as operations of invalidation judgment processing during normal processing or judgment processing during recovery processing. With respect to the shared information 2 to 7, judgment is performed on whether three consecutive install modules are tampered with since the shared information is stored in only adjacent install modules. In this way, in the case where the number of install modules that store therein shared information is different, the judgment needs to be performed in consideration of the number of install modules that store therein shared information for each shared information. In the third embodiment, since the sharing number of install modules that store therein shared information is three, the judgment does not need to be performed in consideration of the sharing number of install modules that store therein shared information for each shared information.

Figure 60:
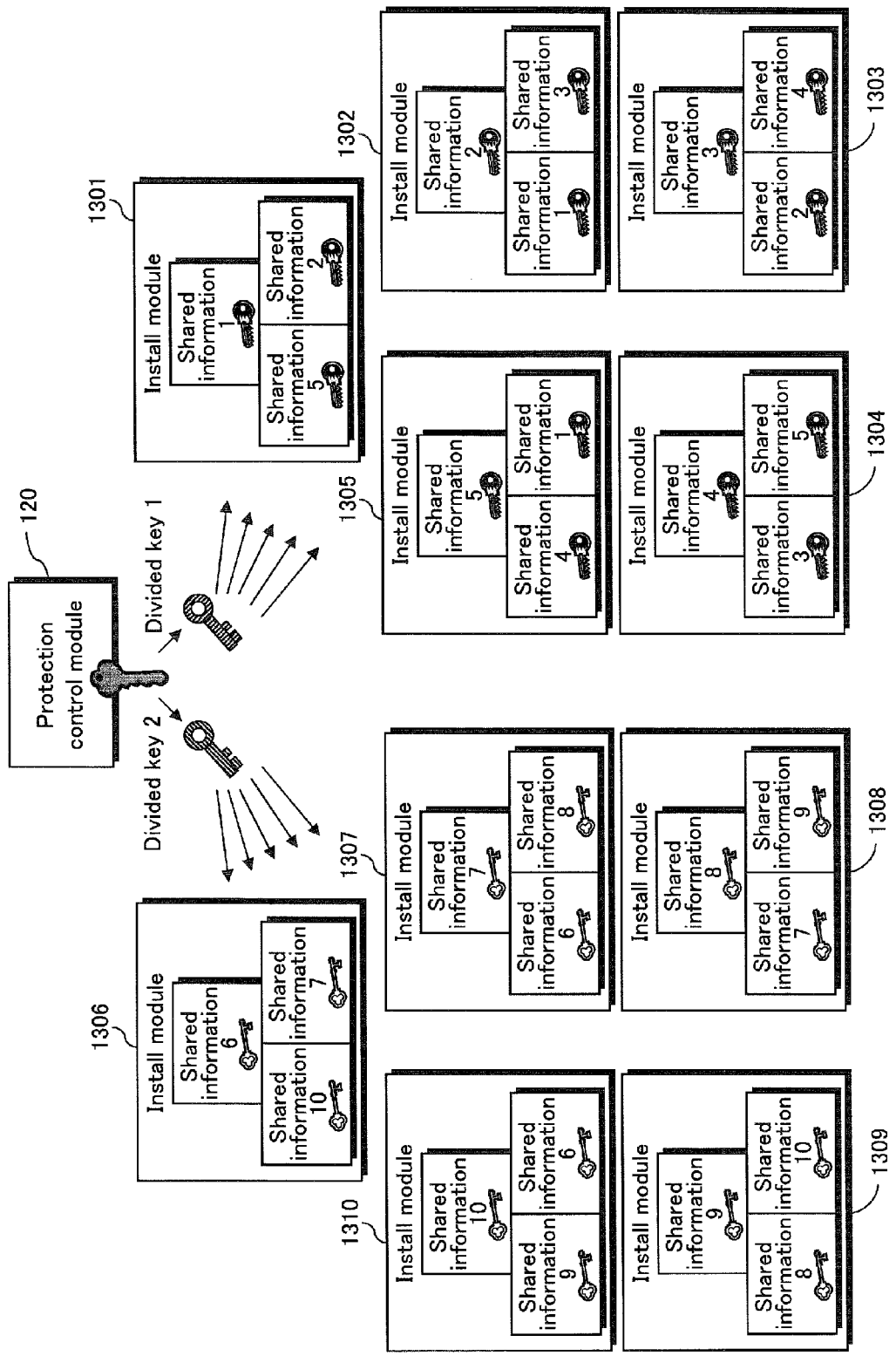
FIG. 60 shows the structure of shared information stored in an install module relating to a modification example 72 of the present invention.
Figure 61:
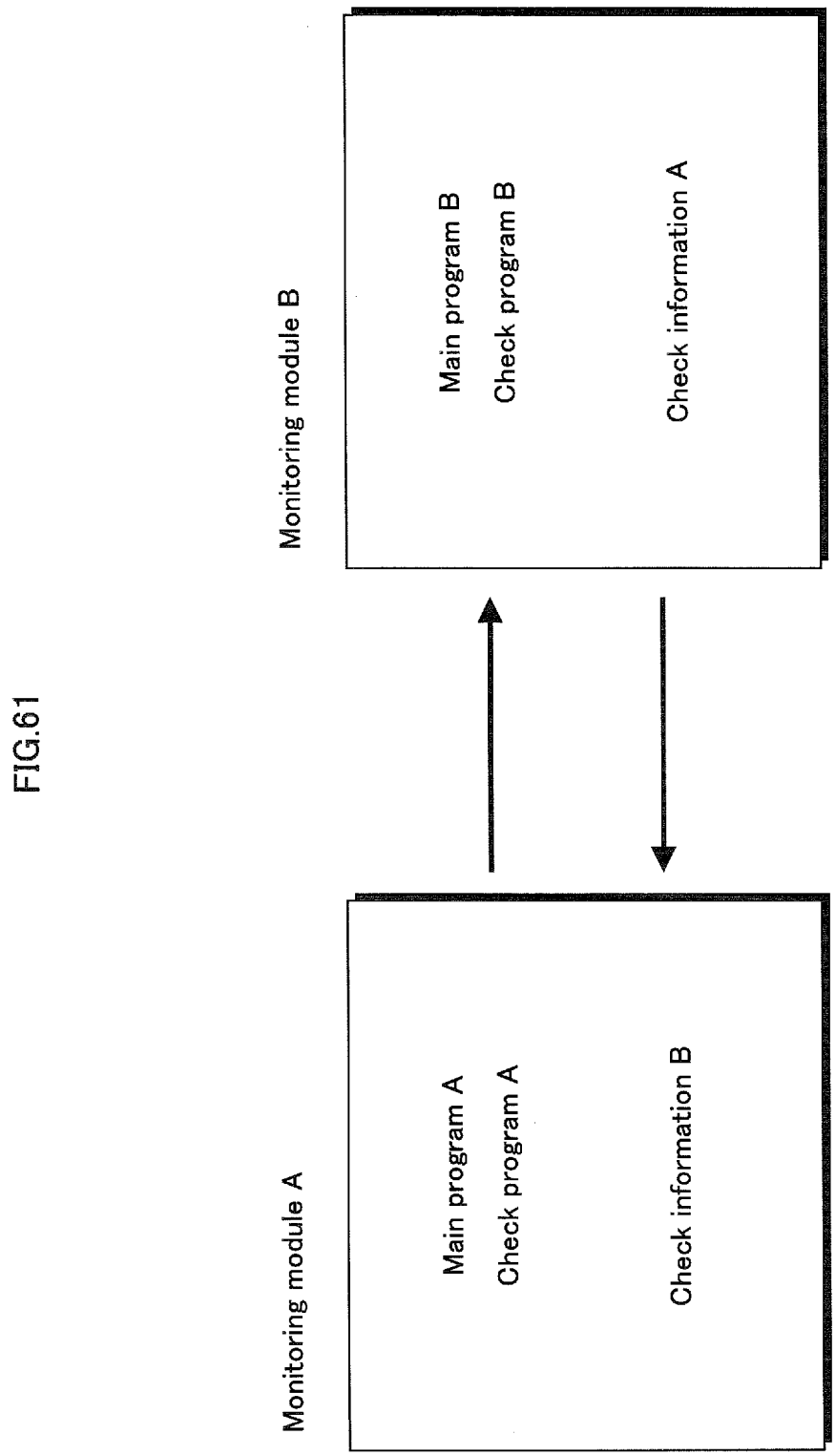
FIG. 61 shows the structure of a detection module described in the Patent Literature 1.

(72) In the above third embodiment, as the operations of the initial design processing, all of the install modules uniformly store therein the encryption/decryption key of the protection control module 120. Alternatively, it may be employed to divide the encryption/decryption key into pieces, and generate shared information for one of the divided pieces of the encryption/decryption key based on the secret sharing scheme. As a specific example, description is given with reference to FIG. 60. The protection control module 120 divides an encryption/decryption key into divided keys 1 and 2. In the same way as in the initial design processing, the protection control module 120 generates shared information based on the secret sharing scheme such that the divided key 1 corresponds to shared information 1 to shared information 5 and the divided key 2 corresponds to shared information 6 to shared information 10. The protection control module 120 transmits the shared information of the divided key 1 to the install modules 1301 to 1305, respectively, and transmits the shared information of the divided key 2 to the install modules 1306 to 1310, respectively. In order to recover the encryption/decryption key, the protection control module 120 receives the shared information from each of the install modules, recovers the divided keys, and recovers the encryption/decryption key from the recovered divided keys. Also, in the operations of invalidation judgment processing during normal processing or judgment processing during recovery processing, the protection control module 120 judges whether three consecutive install modules are tampered with, using the structure of an install module having shared information corresponding to a divided key. Also, the protection control module 120 performs withdrawal processing and addition processing disclosed in the Patent Document 2 for performing invalidation processing and addition processing, using the structure of an install module having shared information corresponding to a divided key.

(73) In the above third embodiment, the protection control module 120 generates arrangement information of shared information of an encryption/decryption key. Alternatively, the update server 200 may generate arrangement information, and transmit the generated arrangement information to the protection control module 120, or may acquire arrangement information from an external apparatus or server. Further alternatively, the update server 200 may input the number of install modules that store therein shared information. Here, with respect to install modules included in the update server 200 that perform invalidation judgment processing during normal processing or judgment processing during recovery processing, it may be employed to determine the number how many install modules consecutively become tampered with, depending on the sharing number.

(74) In the above third embodiment, the protection control module 120 stores therein arrangement information of shared information of an encryption/decryption key. Alternatively, the protection control module 120 may transmit the arrangement information of the shared information to the update server 200, and the update server 200 may store therein the arrangement information. Further alternatively, the update server 200 may transmit a notification request of arrangement information to the install module group 130, and receive the arrangement information from the install module group 130. Further alternatively, the protection control module 120 may acquire arrangement information from an apparatus or a server outside of the update server 200.

(75) In the above second embodiment, each of the install modules that has received a new monitoring pattern in S8101 updates monitoring pattern information thereof to the received new monitoring pattern, using the monitoring pattern update unit 309. Alternatively, each of the install modules may store therein a monitoring pattern before update. Then, when receiving a monitoring pattern update completion notification from each of the install modules in S8102, that is, if update of all of the update patterns completes, the monitoring pattern update unit 250 transmits an instruction to discard the monitoring pattern before update to each of the install modules. Upon receiving the instruction to discard the monitoring pattern before update, each of the install modules discards the monitoring pattern before update. If update of all of the update patterns does not complete, each of the install modules discards the new monitoring pattern.

Here, the judgment on whether update of all of the monitoring patterns completes may be performed by either the monitoring pattern update unit 250 or each of the install modules. In the case where the monitoring pattern update unit 250 performs the judgment, it is judged that update of all of the monitoring patterns does not complete if the monitoring pattern update unit 250 does not receive an update completion notification from each of the install modules in a predetermined time period since transmission of a new monitoring pattern to each of the install modules. In this case, the monitoring pattern update unit 250 instructs each of the install modules to discard the monitoring pattern before update.

Also, in the case where each of the install modules judges whether update of all of the monitoring patterns completes, when receiving an update completion notification from all of the install modules, the monitoring pattern update unit 250 transmits a notification that update of all of the monitoring patterns completes to each of the install modules. If receiving, in a predetermined time period after receiving a new monitoring pattern, the notification that update of all of the monitoring patterns completes, each of the install modules discards the monitoring pattern before update. If not receiving, in the predetermined time period after receiving the new monitoring pattern, the notification that update of all of the monitoring patterns completes, each of the install modules discards the new monitoring pattern.

(76) In the above first embodiment, each of the install modules detects whether other install module has been tampered with, using a MAC value stored in the MAC value table. Here, in the case where the MAC value table itself has been tampered with, there is a possibility that tampering detection of the install module is not surely performed. For example, assume that an install module has been tampered with by an attacker. If a MAC value stored in a MAC value table also has been tampered with by the same attacker, it is verified that there is no tampering despite the install module has been actually tampered with.

Also, in the above first embodiment, each of the install modules verifies whether monitoring pattern and a monitoring frequency have been surely updated using a verification value stored in the verification value list. Here, if the verification value list itself has been tampered with, there is a possibility that the detection of the monitoring pattern and the monitoring frequency might not be surely performed.

In order to solve this problem, in the first embodiment, each of the install modules may have installed therein a protection program for protecting the MAC value table and the verification value list.

In this case, the install modules may mutually perform tampering detection of a protection program installed in other install module in mutual monitoring processing.

Then, if a result of detection shows that a protection program has not been tampered with, it can be regarded that an install module having installed therein the protection program has a MAC value table and a verification value list that have not been tampered with. If a result of detection shows that a protection program has been tampered with, it can be regarded that an install module having installed therein the protection program has a MAC value table and a verification value list that have been tampered with.

Also, the protection program for protecting the MAC value table and the verification value list may be, for example, a program for encrypting/decrypting the MAC value table and the verification value list, or a signature generation program. At this time, padding data may be added to the MAC value table and the verification value list. As a result, by judging whether the padding data is authentic in decryption processing or signature verification processing, it is possible to detect whether the MAC value table and the verification value list have been tampered with.

Also, whether a MAC value table has been tampered with may be detected by generating a MAC value of the MAC value table itself. At this time, obfuscation may be performed on a key for verifying the MAC value. Similarly, tampering verification of the verification value list may be performed by generating a MAC value of the verification value list.

Verification of the MAC value table and the verification value list may be performed regularly or irregularly. If the verification is performed irregularly, the verification may be performed before mutual monitoring processing performed by the install module group 130, for example.

(77) Each of the above modules may be specifically a separate computer program, a module incorporated in an OS, a driver called from an OS, or an application program.

(78) Each of the above described apparatuses is specifically a computer system composed of a microprocessor, a ROM, a RAM, a hard disk unit, a display unit, a keyboard, a mouse, and so on. The RAM or the hard disk unit has stored therein a computer program. Functions of each of the devices are achieved by the microprocessor operating in accordance with the computer system. Here, the computer program is composed of combinations of instruction codes each indicating an instruction to a computer so as to achieve predetermined functions.

(79) Part or all of the compositional elements of each of the above devices may be composed of one system LSI (Large Scale-integration). The system LSI is a super-multifunctional LSI on which a plurality of compositional units are integrated on one chip, and is specifically a computer system composed of a microprocessor, a ROM, a RAM, and so on. The RAM has stored therein a computer program. The LSI achieves its functions by the microprocessor operating in accordance with the computer program.

Also, the compositional elements of each of the above devices may be separately integrated into one chip, or integrated into one chip including part or all of the compositional elements.

Also, although the system LSI is used here, the system LSI may be called an IC, an LSI, a super LSI, and an ultra LSI, depending on the integration degree. Also, a method of forming integrated circuits is not limited to LSIs, and may be realized using a dedicated circuit or a general-purpose processor. Furthermore, it may be possible to use an FPGA (Field Programmable Gate Array) programmable after manufacturing LSIs or a reconfigurable processor in which connection and setting of a circuit cell inside an LSI can be reconfigured.

Furthermore, when a new technology for forming integrated circuits that replaces LSIs becomes available as a result of progress in semiconductor technology or semiconductor-derived technologies, functional blocks may be integrated using such technology. One possibility lies in adaptation of biotechnology.

(80) Part or all of the compositional elements of each of the above devices may be composed of a removable IC card or a single module. The IC card or the single module is a computer system composed of a microprocessor, a ROM, a RAM, and the like. The IC card or the module may include the above-described super-multifunctional LSI. Functions of the IC card or the module are achieved by the microprocessor operating in accordance with the computer program. The IC card or the module may be tamper-resistant.

(81) The present invention may be the above method. Also, the present invention may be a computer program that realizes the method by a computer or a digital signal composed of the computer program.

Furthermore, the present invention may be a computer-readable recording medium such as a flexible disk, a hard disk, a CD-ROM, an MO, a DVD, a DVD-ROM, a DVD-RAM, a BD (Blu-ray Disc), and a semiconductor memory, which stores the computer program or the digital signal. Furthermore, the present invention may be the computer program or the digital signal stored in the storage medium.

Furthermore, the present invention may be the computer program or the digital signal transmitted via an electric communication network, a wireless or wired communication network, a network such as the Internet, data broadcasting, and the like.

Furthermore, the present invention may be a computer system that includes a microprocessor and a memory, the memory storing the computer program, and the microprocessor operating in accordance with the computer program.

Furthermore, the present invention may be implemented by another computer system, by transmitting the computer program or digital signal stored in the storage medium to the other computer system, or by transmitting the computer program or digital signal to the other computer system via the network.

(82) The present invention may be any combination of the above embodiments and modification examples.

INDUSTRIAL APPLICABILITY

According to the monitoring system, the program execution apparatus, and so on relating to the present invention, modules in execution perform mutual monitoring as to malicious operations. This enables the maintenance of high security intensity. Accordingly, the monitoring system, the program execution apparatus, and so on relating to the present invention are suitable for consumer appliances such as interne appliances using secure applications. The monitoring system, the program execution apparatus, and so on relating to the present invention are manufactured, distributed, and so on by manufactures, distributors, and so on treating consumer appliances.

REFERENCE SIGNS LIST

10: software update system
100: apparatus
110 and 111: application
120: protection control module
121: new protection control module
130: install module group
131, 132, 133, 134, 135, 136, and 137: install module
140: access control module
150: OS
160: boot loader
171: CPU
172: EEPROM
173: RAM
174: NIC
200: update server
210: judgment unit
220: correction software distribution unit
230: module invalidation unit
240: module addition unit
250: monitoring pattern update unit
301: reception unit
302: transmission unit
303: control unit
304: update unit
305: verification unit
306: MAC value generation unit
307: MAC value table update unit
308: monitoring pattern acquisition unit
309: monitoring pattern update unit
310: shared information storage unit
311: monitoring pattern update verification unit
312: module function notification unit
313: function information storage unit
401: reception unit
402: transmission unit
403: control unit
404: decryption loading unit
405: tampering detection unit
406: analysis tool detection unit
407: encryption/decryption key storage unit
408: encryption/decryption key generation unit
409: encryption/decryption key sharing unit
410: certificate generation unit
411: encryption/decryption key recovery unit
501: reception unit
502: transmission unit
503: access information storage unit
601: receiving unit
602: instruction unit
603: instruction generation unit
604: unauthentic module specification unit
605: criterion reading unit
606: criterion storage unit
701: reception unit
702: transmission unit
703: encryption key generation unit
704: encryption processing unit
705: authentication unit
706: install module selection unit
707: control unit
708: certificate generation unit
709: signature secret key storage unit
710: correction software storage unit
711: encryption key storage unit
801: reception unit
802: transmission unit
803: access information acquisition key storage unit
804: install module selection unit
901: reception unit
902: transmission unit
903: install module selection unit
904: install module storage unit 905: install module division unit
906: control unit
1001: reception unit
1002: transmission unit
1003: monitoring pattern generation unit
1004: monitoring pattern division unit
1005: control unit
1006: function information acquisition unit
1007: update completion judgment unit
1301, 1302, 1303, 1304, 1305, 1306, 1307, 1308, 1309, and 1310: install module

The invention claimed is:

1. A monitoring system comprising a program execution apparatus and a server apparatus,
wherein the program execution apparatus includes a plurality of modules including at least three monitoring modules, the monitoring modules each monitoring at least another one of the plurality of modules as to whether the at least another one module performs malicious operations and (ii) being monitored by at least another one of the monitoring modules, and each of the monitoring modules including:
a holding unit operable to hold therein a piece of monitoring target information indicating at least another one of the plurality of modules as a monitoring target;
a monitoring unit operable to monitor the at least another one module indicated by the piece of monitoring target information;
a transmission unit operable to transmit a result of the monitoring to the server apparatus; and
an update unit operable, when acquiring a new piece of monitoring target information for update from the server apparatus, to update the held piece of monitoring target information with the new piece of monitoring target information, and
wherein the server apparatus includes:
an acquisition unit operable to acquire the results of the monitoring performed by the respective monitoring modules;
a specification unit operable to specify, based on all the acquired results of the monitoring, which of the plurality of modules performs malicious operations; and
a transmission unit operable to (i) hold therein pieces of monitoring target information that are the same as the pieces of monitoring target information held in the respective monitoring modules, (ii) when the specified module is any of the monitoring modules, restructure the pieces of monitoring target information held therein such that the monitoring modules except the specified module are each monitored by at least another one of the monitoring modules except the specified module, and (iii) transmit, to any of the monitoring modules whose piece of monitoring target information needs to be updated as a result of the restructuring, one of the restructured pieces of monitoring target information to the corresponding monitoring module.

2. The monitoring system of claim 1, wherein
each of the monitoring modules further comprise a deletion unit operable to delete at least another one of the modules that performs malicious operations.

3. A program execution apparatus comprising at least three monitoring modules including a first monitoring module and a second monitoring module, the monitoring modules each (i) monitoring at least another one of the monitoring modules and (ii) being monitored by at least another one of the monitoring modules,
wherein the first monitoring module includes:
a holding unit operable to hold therein monitoring target information indicating at least another one of the monitoring modules as a monitoring target; and
an update unit operable, when acquiring new monitoring target information for update from a server apparatus, to update the monitoring target information held in the holding unit with the new monitoring target information, and
wherein the second monitoring module includes:
a check unit operable, when the first monitoring module performs the update of the monitoring target information, to check whether the update has been normally performed; and
a transmission unit operable to transmit a result of the check to the server apparatus.

4. The program execution apparatus of claim 3, wherein
the check unit holds therein beforehand an expected value of a summary value that is to be generated based on the monitoring target information held in the first monitoring module, generates a summary value based on the monitoring target information held in the first monitoring module, and performs the check by comparing the generated summary value with the expected value.

5. The program execution apparatus of claim 4,
wherein when acquiring the new monitoring target information, the first monitoring module stops monitoring the at least another one monitoring module indicated by the monitoring target information, and
wherein when receiving an execution instruction issued by the server apparatus based on a result of the check, the first monitoring module monitors at least another one of the monitoring modules that is indicated by the new monitoring target information.

6. The program execution apparatus of claim 5,
wherein before performing the update, the first monitoring module makes a backup of the monitoring target information held in the holding unit, and
wherein when receiving the execution instruction, the first monitoring module discards the backup.

7. The program execution apparatus of claim 6, wherein
when not receiving the execution instruction, the first monitoring module performs rollback processing using the backup.

8. The program execution apparatus of claim 3,
wherein the second monitoring module further includes:
a holding unit operable to hold therein monitoring target information indicating at least another one of the monitoring modules that is to be monitored; and
an update unit operable, when acquiring new monitoring target information for update from the server apparatus, to update the monitoring target information held in the holding unit of the second monitoring module with the new monitoring target information, and
wherein the first monitoring module further includes:
a check unit operable, when the update unit of the second monitoring module performs the update of the monitoring target information, to check whether the update has been normally performed; and
a transmission unit operable to transmit a result of the check to the server apparatus.

9. The program execution apparatus of claim 8, wherein
the new monitoring target information is structured such that the monitoring modules are each monitored by at least another one of the monitoring modules.

10. The program execution apparatus of claim 3, wherein the update unit acquires integrated monitoring target information that includes pieces of new monitoring target information for update one-to-one corresponding to the monitoring modules, and extracts a corresponding one of the pieces of new monitoring target information from the integrated monitoring target information.

11. The program execution apparatus of claim 3,
wherein when a monitoring target performs malicious operations, any of the monitoring modules that monitors the monitoring target deletes the monitoring target, and
wherein when any of the monitoring modules is deleted, the monitoring modules except the deleted monitoring module are each monitored by at least another one of the monitoring modules except the deleted monitoring module.

12. A non-transitory computer readable recording medium that records therein a monitoring program comprising at least three monitoring modules including a first monitoring module and a second monitoring module, the monitoring modules each (i) monitoring at least another one of the monitoring modules and (ii) being monitored by at least another one of the monitoring modules,
wherein the first monitoring module includes:
a holding step of holding monitoring target information indicating at least another one of the monitoring modules as a monitoring target; and
an updating step of, when acquiring new monitoring target information for update from a server apparatus, updating the monitoring target information held in the holding step with the new monitoring target information, and
wherein the second monitoring module includes:
a checking step of, when the first monitoring module performs the update of the monitoring target information, checking whether the update has been normally performed; and
a transmitting step of transmitting a result of the check to the server apparatus.

13. The non-transitory computer readable recording medium of claim 12, wherein
wherein when a monitoring target performs malicious operations, any of the monitoring modules that monitors the monitoring target deletes the monitoring target, and
wherein when any of the monitoring modules is deleted, the monitoring modules except the deleted monitoring module are each monitored by at least another one of the monitoring modules except the deleted monitoring module.

14. An integrated circuit comprising at least three monitoring modules including a first monitoring module and a second monitoring module, the monitoring modules each (i) monitoring at least another one of the monitoring modules and (ii) being monitored by at least another one of the monitoring modules,
wherein the first monitoring module includes:
a holding unit operable to hold therein monitoring target information indicating at least another one of the monitoring modules as a monitoring target; and
an update unit operable, when acquiring new monitoring target information for update from a server apparatus, to update the monitoring target information held in the holding unit with the new monitoring target information, and
wherein the second monitoring module includes:
a check unit operable, when the first monitoring module performs the update of the monitoring target information, to check whether the update has been normally performed; and
a transmission unit operable to transmit a result of the check to the server apparatus.

15. The integrated circuit of claim 14,
wherein when a monitoring target performs malicious operations, any of the monitoring modules that monitors the monitoring target deletes the monitoring target, and
wherein when any of the monitoring modules is deleted, the monitoring modules except the deleted monitoring module are each monitored by at least another one of the monitoring modules except the deleted monitoring module.

* * * * *